United States Patent
Ashizaki et al.

(10) Patent No.: US 7,337,957 B2
(45) Date of Patent: Mar. 4, 2008

(54) AUTHENTICATION SYSTEM AUTHENTICATION METHOD AUTHENTICATION MEDIUM MANUFACTURING DEVICE AND AUTHENTICATION TERMINAL DEVICE

(75) Inventors: Koji Ashizaki, Tokyo (JP); Akira Shirakura, Tokyo (JP); Takaharu Kitada, Tokyo (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 10/505,457

(22) PCT Filed: Mar. 4, 2003

(86) PCT No.: PCT/JP03/02479

§ 371 (c)(1),
(2), (4) Date: Jan. 25, 2005

(87) PCT Pub. No.: WO03/075217

PCT Pub. Date: Sep. 12, 2003

(65) Prior Publication Data

US 2005/0129281 A1 Jun. 16, 2005

(30) Foreign Application Priority Data

Mar. 4, 2002 (JP) .............................. 2002-057962

(51) Int. Cl.
*G06K 5/00* (2006.01)
(52) U.S. Cl. .................... 235/382; 235/382.5; 235/380
(58) Field of Classification Search ................ 235/380, 235/382, 382.5, 375
See application file for complete search history.

(56) References Cited

FOREIGN PATENT DOCUMENTS

| JP | 2001-312595 | 11/2001 |
| JP | 2001-338295 | 12/2001 |
| JP | 2002-24386 | 1/2002 |

*Primary Examiner*—Karl D Frech
(74) *Attorney, Agent, or Firm*—Oblon, Spivak, McClelland, Maier & Neustadt, P.C.

(57) ABSTRACT

A certification system includes a photographing unit 10 which generates looks image data LI whose object is an individual person P, a holographic stereogram manufacturing unit 20 which makes a holographic stereogram HL in accordance with the looks image data LI, a two dimensional photo printing unit 30 which prints the looks image data LI as a two dimensional photograph PIC, an image server 40 which stores the looks image data LI, an information recoding unit 50 which records connection information in a recording member RM, and a manufacturing unit 60 which integrates the recording member RM, the two dimensional photograph PIC, and the holographic stereogram HL to make a certification card CC.

69 Claims, 29 Drawing Sheets

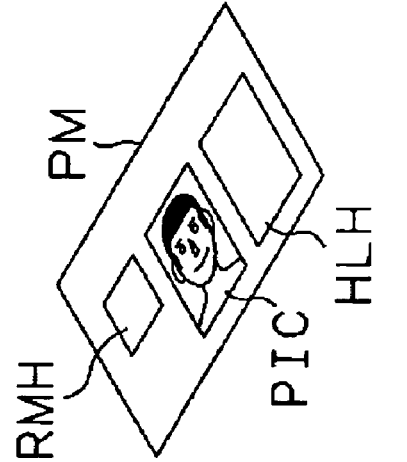
Fig.10A / Fig.10B / Fig.10C
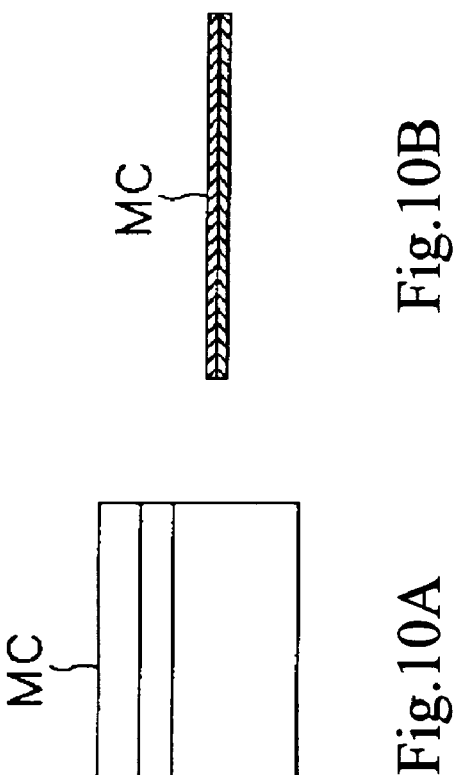
Fig.11A / Fig.11B / Fig.11C

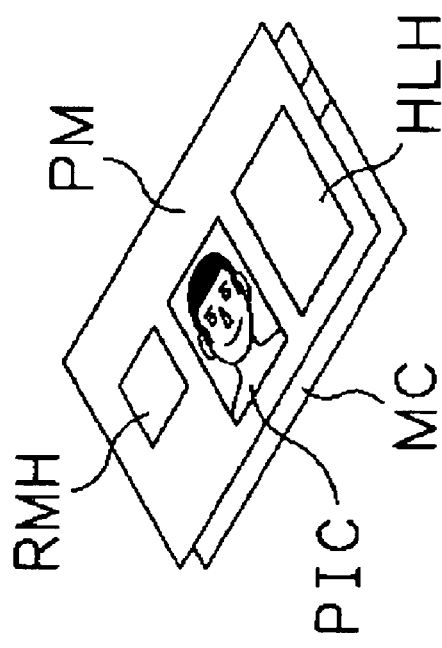
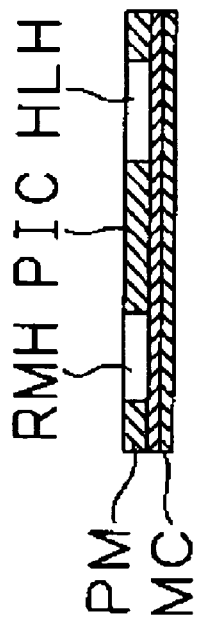
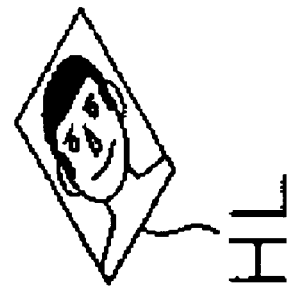
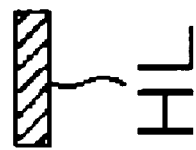
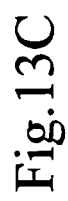

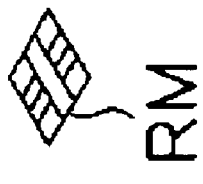
Fig.14A
Fig.14B
Fig.15A
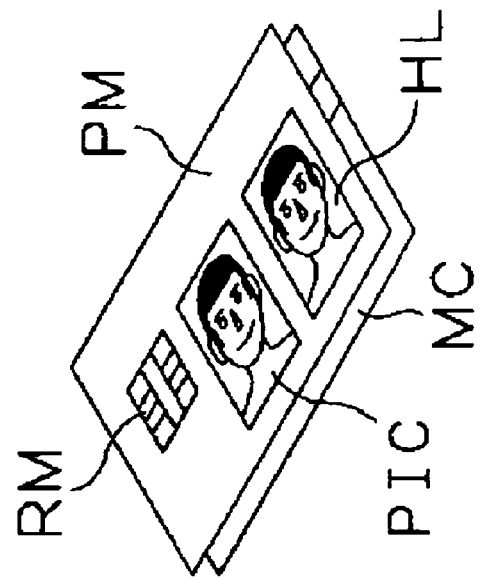
Fig.14C
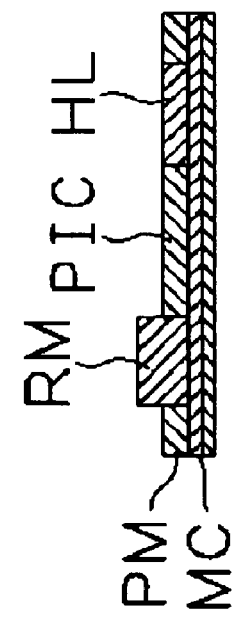
Fig.15B

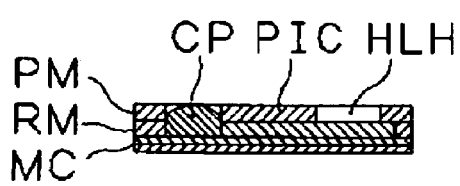 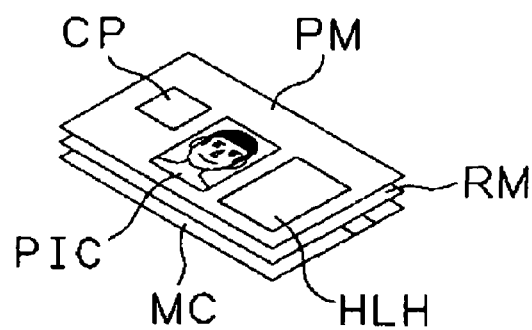
Fig.20A   Fig.20B
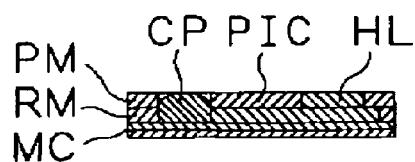 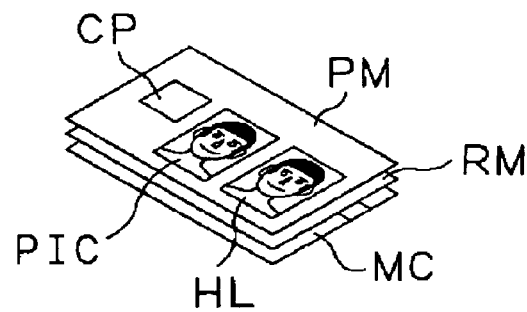
Fig.21A   Fig.21B

| CERTIFICATION ID | NAME | ADDRESS | AGE | SEX | IMAGE FILE NAME |
|---|---|---|---|---|---|
| ○○○○○ | ○○△△ | ……… | 28 | M | ……..jpg |
| △△△△△△ | ××○○ | ……… | 40 | F | ……..jpg |
| ××××× | △△□□ | ……… | 23 | F | ……..jpg |
| …. | …. | …. | …. | …. | …. |

Fig. 25

| TERMINAL ID | KEY INFORMATION | TERMINAL ADMINISTRATOR ID | TERMINAL LOCATION | CERTIFIER ID |
|---|---|---|---|---|
| ○○○○○ | ○○○○○○ | ○○○○○○○ | ○○○○○ | ○○○○ |
| △△△△△ | △△△△△△ | △△△△△△△ | △△△△△ | △△△△△ |
| ×××× | ×××× | ×××××× | ××××× | ×××× |
| .... | .... | .... | .... | .... |

Fig. 26

| CERTIFIER ID | PASSWORD | NAME | ADDRESS | AGE | SEX | CERTIFICATION ID |
|---|---|---|---|---|---|---|
| ○○○○ | △△△○○○ | ×○×○ | ⋯⋯ | 55 | M | ○○○○○ |
| ××□× | ○○××△△ | △×□○ | ⋯⋯ | 31 | M | △△△△△ |
| △△○○ | □□□×○△ | ○□×× | ⋯⋯ | 42 | F | ×××× |
| ⋯⋯ | | ⋯⋯ | ⋯⋯ | ⋯⋯ | ⋯⋯ | ⋯⋯ |

Fig. 27

AUTHENTICATION SYSTEM AUTHENTICATION METHOD AUTHENTICATION MEDIUM MANUFACTURING DEVICE AND AUTHENTICATION TERMINAL DEVICE

TECHNICAL FIELD

The present invention relates to a certification system and a certification method for identifying an individual person and certifying that the person is a right person, a certification media manufacturing apparatus for making a certification medium which is used in the certification system and the certification method, and a certification terminal device for certifying by using the certification medium which is made by the certification medium manufacturing apparatus.

BACKGROUND OF THE INVENTION

Presently, in a case when an individual person enjoys certain services or follows the necessary procedures, the person is often required to prove that he/she is the right person qualified to enjoy the services or properly registered to enable him/her to follow the necessary procedures. At present, an individual person is also required to prove if a letter or any document such as an electronic mail which is transmitted over a network is justifiable. These actions are generally known as certification. That is, certification means any action to distinguish that a natural person (an individual person), a legal person, a group, an article, an apparatus, a letter or the like is not another person or a fake and proves that the person or the article is the right person or the genuine article.

Such certification can be classified into plural forms depending on its use or purpose. Among those, there is identification or authentication for identifying an individual person. The identification distinguishes natural person (an individual person) and confirms if he/she has a certain qualification or if he/she is the registered person.

Methods of such identification include not only by means of a certification medium having a face photograph of an individual person visibly attached thereto such as, for example, identification cards which are seen in driver's licenses, passports or the like, some of credit cards or the like but also by means of finger prints, retinas, irises, voiceprints, handwritings and other personal characteristic information. Another simple method of identification is by means of a fact of holding something such as a credit card. Furthermore, developed are new technologies which are combinations of such technologies as certification by passwords .commonly used in electronic commerce which is advanced in recent years as a result of popularization of network technology, certification by digital signature and other certification technologies.

In these identification technologies, it is important that individual persons are highly accurately distinguished. On the contrary to the need for highly accurate certification, however, there are conflicting requirements to perform identification at a low cost, to eliminate the need for a special device or the like for certification if possible, to enable to perform certification at any place, to minimize complicated certification procedures, or to relieve oppressive feeling to the individual person to be certified.

Technical evaluation of such certification technologies has been studied in various industries. For example, the certification technologies study WG (working group) in the Electronic Commerce Demonstration Promotion Council (currently the Electronic Commerce Promotion Council of Japan) publicly released the "Evaluation Standard of Identification Technology (Version 1)" in April 1998. Also, in March 2000, the Certification and Notary WG of the Council released the "Proposal on Certification Level and Identification System".

Incidentally, holograms which are made by using holographic technology are difficult to copy or counterfeit as compared to printed materials prepared by a sublimation type or ink jet type printer or by an electro-photographic type copier, and thus are being used also for a certification purpose.

For example, holograms are visibly integrated into such anti-counterfeit articles as credit cards, employee certificates, and also bills, thereby improving counterfeit prevention capability of such articles.

However, in such certification technology which uses holograms with excellent anti-counterfeit capability, because of difficulty in making a large quantity of holograms and high cost of making so-called image holograms which can express halftones like photographs, it is popular to use embossed holograms which are less expensive and easy to reproduce in a large quantity.

Embossed holograms are made by providing unevenness on metal foils or polymer films and thus can be made at a low cost and in a large quantity by making an original mold which is then used as a press or a template. However, embossed holograms are very expensive in making an original mold, which are disadvantageous in cost when duplicating a small number such as less than several hundreds because the cost of making an original mold is a major portion of the total production cost including copied holograms.

Also, in holograms, in order to make original molds of holograms for a purpose of achieving a goal of free image expression, a so-called computer generated hologram (CGH) technique using a computer is often employed for calculating light wave surfaces and interference fringes. However, since the technologies for the computer generated holograms are not fully advanced yet, it can be reproduced by a monochromatic light such as a laser beam or the like and thus not in a stage of expressing sufficient tones like photographs.

In reproducing holograms using original molds made by such embossed holograms or the computer generated holograms, identical holograms can be reproduced in a large quantity. As a result, in certification technology using such holograms which are integrated into articles requiring anti-counterfeit capability, it is typical to integrate an identical hologram for, for example, one kind of credit card services, i.e., credit cards from the same credit brand, thereby integrating a common hologram for each kind.

However, since these holograms can be reproduced in a large quantity, it is possible that a large quantity of counterfeit articles are made if once a hologram corresponding to the original mold is counterfeited, thereby making it insufficient to use as certification of the articles integrating a common hologram for each kind.

As a part of a series of certification technologies using these embossed holograms or the computer generated holograms, proposed are various technologies for making anti-counterfeit articles and for certifying anti-counterfeit articles.

One of such technologies is disclosed in, for example, Japanese non-examined patent publication no. 2000-348145.

This technology is to make a stamper as an original mold from a group of holograms which can reproduce 300 kinds of images such as alphabets, numbers and then the stamper is used to form computer generated holograms on bare cards. Accordingly, in this technology, as described in the paragraph [0025] in the patent specification, bare cards made from a single stamper comprise computer generated holograms each having a data storage area of an identical format. In this technology, in a case where there are, for example, 10 computer generated holograms disposed in parallel in a data memory area, a technique is used to destroy 5 out of the 10 computer generated holograms for recording certification information exclusive to the card in the data memory area of the identical format.

In other words, in the technology, a duplicating type hologram which comprises computer generated holograms as an original mold is integrated with cards, and a part of the holograms are destroyed in order to record individual information. Accordingly, the technology does not overcome drawbacks of the conventional computer generated holograms, i.e., restricting the reproduction light to a monochromatic light such as a laser or the like and incapability of expressing sufficient tones like a photograph. In a case of using such technology, it is impossible to express images such as portraits and it is impossible to reproduce by using any desired illumination light such as white light.

Other technologies for making anti-counterfeit articles and for certifying anti-counterfeit articles are disclosed in, for example, Japanese non-examined patent publication no. 2000-348149.

This patent specification discloses an apparatus for issuing cards with holograms made by using the technology as disclosed in the above mentioned Japanese non-examined patent publication no. 2000-348145, a database associated with it, a device for reading out the holograms by illuminating a monochromatic light onto the issued cards, a certification apparatus for certifying by comparing the information acquired by reading out the holograms and the information held in the database, and a system comprising these apparatus and the like.

That is, these Japanese non-examined patent publication nos. 2000-348145 and 2000-348149 disclose a card which records individual information by integrating therein a duplicating type hologram which uses as its original mold a computer generated hologram reproducible by illuminating a monochromatic light and destroying a part of the hologram, and a certification technology using the card.

Moreover, a technique for making an anti-counterfeit article and for certificating an anti-counterfeit article is disclosed in, for example, Japanese patent no. 2906730.

This technique records numbers, characters, symbols and the like in a hologram as information pattern and attaches the hologram to a part of information medium. For example, an embossed hologram is used to record numbers, characters, symbols and the like similar to barcodes and magnetic patterns and are read out by using a coherent light. Accordingly, this patent publication also records information by integrating an embossed hologram (a relief hologram) with a card in such a manner to be reproduced by illuminating a monochromatic light.

Furthermore, a technique for making an anti-counterfeit article and for certificating an anti-counterfeit article is disclosed in, for example, Japanese non-examined patent publication no. Hei 11-339049.

This technique reads visible information such as photographs, signed characters or seals for identifying an individual person on a surface of a card as a multi-level image of n×m pixels and calculates a degree of coincidence in features by means of splitting the read-out image into plural blocks.

Also, a technique for making an anti-counterfeit article and certificating an anti-counterfeit article is also disclosed in, for example, Japanese non-examined patent publication no. Hei 11-66315.

This technique uses the same technique as those disclosed in the above Japanese non-examined patent publication no. Hei 11-339049 and reads out visible information as multi-level images. And a degree of coincidence of features is calculated by means of comparison in image levels between a certain pixel and circumference pixels of a read-out image.

That is, these Japanese non-examined patent publication nos. Hei 11-339049 and Hei 11-66315 disclose techniques which automatically compare visible information by designated device in order to identify individual persons.

Yet another technique for making an anti-counterfeit article and for certifying an anti-counterfeit article is disclosed in, for example, Japanese non-examined patent publication no. Hei 10-124642.

This technique is similar to conventional cash cards used in banks each having a memory portion for storing information therein and a display surface for displaying information except a hidden part of the information and a comparison is made by acquiring the non-displayed hidden information by inquiring to a card holder. The official gazette includes descriptions about encryption of the hidden information and insertion of unique information to the hidden information in the hope of more reliable anti-counterfeit capability.

Incidentally, these conventional certification techniques using a hologram as disclosed in these official gazettes are unable to reproduce the hologram by other than a monochromatic light. In certification procedures, an exclusive device is required for reproduction, thereby making the entire system expensive. And locations to perform certification are restricted, thereby making the certification procedures complicated. Since the articles to which these techniques are applied include information elements such as numbers, characters, symbols and the like recorded as the hologram, they are different from those for directly distinguishing individual persons for a certification purpose. Even if the article is genuine, in a case where it is stolen and a stealer pretends as if he/she is the right holder, it is difficult to discover a dishonest use.

The present invention was made in light of the foregoing circumstances. It is an object of the present invention to provide a certification system and a certification method which are capable of reliably and easily certifying individual persons by means of certification medium integrating visible information which is able to directly and easily distinguish individual persons, and yet satisfying requirements for performing certification at any desired location, minimizing complicated steps in certification, and minimizing oppressive feeling to individual persons to be certified. It is an additional object of the present invention to provide a certification medium manufacturing apparatus for making a certification medium to be used in a certification system, a certification method and also a certification terminal device for certifying by using the certification medium made by the certification medium manufacturing apparatus.

DISCLOSURE OF THE INVENTION

In order to achieve the above objects, a certification system according to the present invention is the one for identifying an individual person and certifying that the individual person is a right person and is characterized by including two dimensional photo printing means for printing visible information for directly distinguishing the individual person as a two dimensional photograph, data conversion processing means for converting the visible information into data which can be printed as a hologram or a holographic stereogram, hologram or holographic stereogram manufacturing means for making the holograph or the holographic stereogram in accordance with the data obtained by conversion by the data conversion processing means, information storage means for storing various kinds of information including at least the visible information, information recording means for recording connection information to connect to the information storage means and read the visible information stored therein, in a designated recording member which is capable of recording various kinds of information, certification medium manufacturing means for making a certification medium by integrating at least the recording member having the connection information recorded by the information recording means, the two dimensional photograph obtained by printing by the two dimensional photo printing means and the hologram or the holographic stereogram made by the hologram or holographic stereogram manufacturing means in a condition that the two dimensional photograph and the hologram or the holographic stereogram are visible, and presentation means to be connected to the information storage means in accordance with the connection information which is recorded in the recording member by the information recording means and for receiving and presenting the visible information corresponding to the connection information among the information stored in the information storage means.

The term "directly distinguishing" an individual person means to distinguish by naked eyes, i.e., a certifier is capable of distinguishing under a normal condition without using an exclusive device, machine or the like.

Such certification system according to the present invention integrates by the certification medium manufacturing means the recording member in which the connection information is recorded, the two dimensional photograph of visible information and the hologram or the holographic stereogram in accordance with the visible information and makes the certification medium in a condition that the two dimensional photograph and the hologram or the holographic stereogram are visible. In a case of certifying an individual person to be certificated who holds the certification medium, connection is made to the information storage means in accordance with the connection information which is recorded in the recording member by the presentation means and receives the visible information corresponding to the connection information among the information stored in the information storage means for presentation to a certifying judge.

On the other hand, in order to achieve the above object, a certification method according to the present invention is the one for performing certification to determine if an individual person is the right person and is characterized by including a two dimensional photo printing step for printing visible information to directly distinguish an individual person as a two dimensional photograph, a data conversion processing step for converting the visible information into data which can be printed as a hologram or a holographic stereogram, a hologram or holographic stereogram manufacturing step for making a hologram or a holographic stereogram in accordance with the data obtained by conversion in the data conversion processing step, an information storage step for storing various kinds of information including at least the visible information into designated information storage means, an information recording step for recording in a predetermined recording member which is capable of recording various kinds of information the connection information for reading the stored visible information by connecting to the information storage means, a certification medium manufacturing step for making a certification medium by integrating at least the recording member in which the connection information is recorded in the information recording step, the two dimensional photograph which is obtained by printing in the two dimensional photo printing step and the hologram or the holographic stereogram which is obtained in the hologram or holographic stereogram manufacturing step in a condition that the two dimensional photograph and the hologram or the holographic stereogram are visible, and a presentation step for connecting to the information storage means in accordance with the connection information which is recorded in the recording member in the information recording step and receiving for presentation the visible information which corresponds to the connection information among information stored in the information storage means.

Such certification method according to the present invention makes a certification medium by integrating at least the recording member in which the connection information is recorded, the two dimensional photograph of the visible information and the hologram or the holographic stereogram in accordance with the visible information in a condition that the two dimensional photograph and the hologram or the holographic stereogram are visible. In making certification of an individuals who holds the certification medium, connection is made to the information storage means in accordance with the connection information as recorded in the recording member and the visible information corresponding to the connection information among the information as stored in the information storage means is received for presentation to a certifying judge.

Moreover, in order to achieve the above object, a certification system according to the present invention is the one for performing certification to determine if an individual person is a right person and is characterized by including two dimensional photo printing means for printing visible information directly distinguishing an individual person as a two dimensional photograph, data conversion processing means for converting the visible information into data which can be printed as a hologram or a holographic stereogram, hologram or holographic stereogram manufacturing means for making a hologram or a holographic stereogram in accordance with the data obtained by conversion by the data conversion processing means, information recording means for recording the visible information in a designated recording member which is capable of recording various kinds of information, certification medium manufacturing means for making a certification medium by integrating at least the recording member in which the visible information is recorded by the information recording means, the two dimensional photograph which is obtained by printing by the two dimensional photo printing means, and the hologram or the holographic stereogram made by the hologram or holographic stereogram manufacturing means in a condition that the two dimensional photograph and the hologram or the holographic stereogram are visible, and presentation means for reading and presenting the visible information which is recorded in the recording member by the information recording means.

Such certification system according to the present invention makes the certification medium by integrating the recording member in which the visible information is recorded, the two dimensional photograph of the visible information and the hologram or the holographic stereogram in accordance with the visible information in a condition that the two dimensional photograph and the hologram or the holographic stereogram are visible. In performing certification of an individual person who holds the certification medium, the presentation means presents to a certifying judge the visible information which is recorded in the recording member by reading the information.

Furthermore, in order to achieve the above object, a certification method according to the present invention is the one for identifying an individual person and certifying if the individual person is a right person and is characterized by including a two dimensional photo printing step for printing visible information which directly distinguishing the individual person as a two dimensional photograph, a data conversion processing step for converting the visible information into data which can be printed as a hologram or a holographic stereogram, a hologram or holographic stereogram manufacturing step for making a hologram or a holographic stereogram in accordance with the data which is obtained by the conversion in the data conversion processing step, an information recording step for recording the visible information in a designated recording member in which various kinds of information can be recorded, a certification medium manufacturing step for making a certification medium by integrating at least the recording member in which the visible information is recorded in the information recording step, the two dimensional photograph which is obtained by printing in the two dimensional photo printing step, and the hologram or the holographic stereogram made in the hologram or holographic stereogram manufacturing step in a condition that the two dimensional photograph and the hologram or the holographic stereogram are visible, and a presentation step for reading and presenting the visible information which is recorded in the recording member in the information recording step.

Such certification method according to the present invention makes the certification medium by integrating the recording member in which the visible information is recorded, the two dimensional photograph of the visible information and the hologram or the holographic stereogram in accordance with the visible information in a condition that the two dimensional photograph and the hologram or the holographic stereogram are visible. In performing certification of an individual person who holds the certification medium, the visible information which is recorded in the recording member is read out and presented to a certifying judge who judges if the individual person is a right person.

Additionally, in order to achieve the above object, a certification medium manufacturing apparatus according to the present invention is the one for making a certification medium to be used in the certification system for performing certification if an individual person is a right person and is characterized by including two dimensional photo printing means for printing visible information which directly distinguishes the individual person as a two dimensional photograph, data conversion processing means for converting the visible information into data which can be printed as a hologram or a holographic stereogram, hologram or holographic stereogram manufacturing means for making a hologram or a holographic stereogram in accordance with the data which is obtained by conversion by the data conversion processing means, information storage means for storing various kinds of information including at least the visible information, information recording means for recording a connection information to connect to the information storage means and to read the stored visible information, and certification medium manufacturing means for making a certification medium by integrating at least the recording member in which the connection information is recorded by the information recording means, the two dimensional photograph which is obtained by printing by the two dimensional photo printing means and the hologram or the holographic stereogram made by the hologram or holographic stereogram manufacturing means in a condition that the two dimensional photograph and the hologram or the holographic stereogram are visible.

Such certification medium manufacturing apparatus according to the present invention makes the certification medium by integrating the recording member in which the connection information is recorded, the two dimensional photograph of the visible information and the hologram or the holographic stereogram in accordance with the visible information in a condition that the two dimensional photograph and the hologram or the holographic stereogram are visible.

Moreover, in order to achieve the above object, a certification terminal device according to the present invention uses a certification medium made by the certification medium manufacturing apparatus comprising two dimensional photo printing means for printing as a two dimensional photograph visible information which directly distinguishes the individual person, data conversion processing means for converting the visible information into data which can be printed as a hologram or a holographic stereogram, hologram or holographic stereogram manufacturing means for making a hologram or a holographic stereogram in accordance with the data which is obtained by conversion by the data conversion processing means, information storage means for storing various kinds of information including at least the visible information, information recording means for recording connection information to connect to the information storage means and read the stored visible information, in a designated recording member which can record various kinds of information, and certification medium manufacturing means for making the certification medium by integrating at least the recording member in which the connection information is recorded by the information recording means, the two dimensional photograph which is obtained by printing by the two dimension photo printing means and the hologram or the holographic stereogram made by the hologram or holographic stereogram manufacturing means in a condition that the two dimensional photograph and the hologram or the holographic stereogram are visible. The certification terminal device for identifying the individual person is characterized by including information read-out means for reading out connection information which is recorded in the recording member by the information recording means and presentation means for connecting to the information storage means in accordance with the connection information which is recorded in the recording member by the information recording means for receiving and presenting the visible information corresponding to the connection information among the information stored in the information storage means.

Such certification terminal device according to the present invention integrates the recording member in which the connection information is recorded, the two dimensional photograph of the visible information and the hologram or the holographic stereogram in accordance with the visible information and, in a case of certifying an individual person who holds the certification medium in a condition that the two dimensional photograph and the hologram or the holographic stereogram are visible, connection is made to the information storage means in accordance with the connection information which is recorded in the recording member by the presentation means and presents to a certifying judge the visible information corresponding to the connection information among the information stored in the information storage means.

Moreover, in order to achieve the above object, a certification medium manufacturing apparatus according to the present invention is the one for making a certification medium which is used in a certification system for identifying an individual person and certifying if the individual person is a right person and is characterized by including two dimensional photo printing means for printing visible information which directly distinguishes the individual person as a two dimensional photograph, data conversion processing means for converting the visible information into data which can be printed as a hologram or a holographic stereogram, hologram or holographic stereogram manufacturing means for making the hologram or the holographic stereogram in accordance with the data which is obtained by conversion by the data conversion means, information recording means for recording visible information in a designated recording member which can record various kinds of information, and certification medium manufacturing means for making the certification medium by integrating at least the recording member in which the visible information is recorded by the information recording means, the two dimensional photograph which is obtained by printing by the two dimensional photo printing means and the hologram or the holographic stereogram made by the hologram or holographic stereograph manufacturing means in a condition that the two dimensional photograph and the hologram or the holographic stereogram are visible.

Such certification medium manufacturing apparatus according to the present invention makes the certification medium by integrating the recording member in which the visible information is recorded, the two dimensional photograph of the visible information and the hologram or the holographic stereogram in accordance with the visible information by the certification medium manufacturing means in a condition that the two dimensional photograph and the hologram or the holographic stereogram are visible.

Also, in order to achieve the above object, a certification terminal device according to the present invention is the one to certify if an individual person is a right person by using a certification medium made by a certification medium manufacturing apparatus comprising two dimensional photo printing means for printing visible information which directly distinguishes an individual person as a two dimensional photograph, data conversion processing means for converting the visible information into data which can print as a hologram or a holographic stereogram, hologram or holographic stereogram manufacturing means for making a hologram or a holographic stereogram in accordance with the data which is obtained by conversion by the data conversion processing means, information recording means for recording the visible information in a designated recording member which can record various kinds of information, certification medium manufacturing means for making the certification medium by integrating at least the recording member in which the visible information is recorded by the information recording means, the two dimensional photograph which is obtained by printing by the two dimensional photo printing means, and the hologram or the holographic stereogram made by the hologram or holographic stereogram manufacturing means in a condition that the two dimensional photograph and the hologram or the holographic stereogram are visible. The certification terminal device is characterized by including information read-out means for reading out the visible information which is recorded in the recording member by the information recording means and presentation means for presenting the visible information which is read out of the recording member by the information read-out means.

Such certification terminal device according to the present invention integrates the recording member in which the visible information is recorded, the two dimensional photograph of the visible information and the hologram or the holographic stereogram in accordance with the visible information and, in certifying the individual person who holds the certification medium in a condition that the two dimensional photograph and the hologram or the holographic stereogram are visible, the visible information which is recorded in the recording member is read out by the presentation means to be presented to a certifying judge.

BRIEF DESCRIPTION OF THE DRAWINGS

FIG. 2A through FIG. 2D are illustrations for describing a holographic stereogram made by a holographic stereogram manufacturing unit which is provided in the above certification system, wherein FIG. 2A shows a way how the holographic stereogram is observed at a certain angle, FIG. 2B shows a reproduced image when observed at the angle as shown in FIG. 2A, FIG. 2C shows a way how the holographic stereogram is observed at another angle, FIG. 2D shows a reproduced image as observed at the observation angle as shown in FIG. 2C.

FIG. 4A through FIG. 4B are illustrations for describing a printing section in the holographic stereograph manufacturing unit of the certification system, wherein FIG. 4A is a front view of the printing section while FIG. 4B is a plan view of the printing section.

FIG. 10A through FIG. 10C are illustrations for describing manufacturing steps of a certification card or a contact type IC card as a first specific example of making the certification card in the certification system, wherein FIG. 10A is a front view of a magnetic card which is a base member of the certification card, FIG. 10B is a side cross section view of the magnetic card, and FIG. 10C is a perspective view of the magnetic card.

FIG. 11A through FIG. 11C are illustrations for describing the manufacturing steps of the certification card or the contact type IC card as the first specific example of making the certification card in the certification system, wherein FIG. 11A is a front view of a print surface member having a two dimensional photograph affixed thereon, FIG. 11B is a side cross section view of the print surface member, FIG. 11C is a perspective view of the print surface member.

FIG. 12A through FIG. 12B are illustrations for describing the manufacturing steps of the contact type IC card which is the first specific example of the certification card in the certification system, wherein FIG. 12A is a side cross section view of a first intermediate member to be made by affixing the magnetic card and the print surface member, and FIG. 12B is a perspective view of the first intermediate member.

FIG. 13A through FIG. 13C are illustrations for describing the manufacturing steps of the contact type IC card which is the first specific example of the certification card in the certification system, wherein FIG. 13A is a front view of a holographic stereogram, and FIG. 13B is a side cross section view of the holographic stereogram, FIG. 13C is a perspective view of the holographic stereogram.

FIG. 14A through FIG. 14C are illustrations for describing the manufacturing steps of the contact type IC card which is the first specific example of the certification card in the certification system, wherein FIG. 14A is a front view of a recording member comprising an IC portion, FIG. 14B is a side cross section view of the recording member, and FIG. 14C is a perspective view of the recording member.

FIG. 15A through FIG. 15B are illustrations for describing the manufacturing steps of the contact type IC card which is the first specific example of the certification card in the certification system, wherein FIG. 15A is a side cross section view of a second intermediate member made by accommodating and affixing the holographic stereogram and the recording member in the first intermediate member, and FIG. 15B is a perspective view of the second intermediate member.

FIG. 16A through FIG. 16C are illustrations for describing the manufacturing steps of the contact type IC card which is the first specific example of the certification card in the certification system, wherein FIG. 16A is a front view of a cover member, FIG. 16B is a side cross section view of the cover member, and FIG. 16C is a perspective view of the cover member.

FIG. 17A through FIG. 17B are illustrations for describing the contact type IC card which is the first specific example of the certification card in the certification system, wherein FIG. 17A is a side cross section view of the contact type IC card as the certification card finally manufactured by affixing the second intermediate member and the cover member, and FIG. 17B is a perspective view of the certification card.

FIG. 18A through FIG. 18C are illustrations for describing manufacturing steps of a contactless type IC card which is a second specific example of the certification card in the certification system, wherein FIG. 18A is a front view of a recording member comprising an IC portion, FIG. 18B is a side cross section view of the recording member, and FIG. 18C is a perspective view of the recording member.

FIG. 19A through FIG. 19B are illustrations for describing the manufacturing steps of the contactless type IC card which is the second specific example of the certification card in the certification system, wherein FIG. 19A is a side cross section view of a first intermediate member made by affixing a magnetic card and a recording member, and FIG. 19B is a perspective view of the first intermediate member.

FIG. 20A through FIG. 20B are illustrations for describing the manufacturing steps of the contactless type IC card which is the second specific example of the certification card in the certification system, wherein FIG. 20A is a side cross section view of a second intermediate member made by accommodating and affixing a recording member in the first intermediate member, and FIG. 20B is a perspective view of the second intermediate member.

FIG. 21A through FIG. 21B are illustrations for describing the manufacturing steps of the contactless type IC card which is the second specific example of the certification card in the certification system, wherein FIG. 21A is a side cross section view of a third intermediate member made by accommodating and affixing a holographic stereogram in the second intermediate member, and FIG. 21B is a perspective view of the third intermediate member.

FIG. 22A through FIG. 22C are illustrations for describing the manufacturing steps of the contactless type IC card as the second specific example regarding the manufacture of the certification card in the certification system, wherein FIG. 22A is a front view of a cover member, FIG. 22B is a side cross section view of the cover member, and FIG. 22C is a perspective view of the cover member.

FIG. 23A through FIG. 23B are illustrations for describing the manufacturing steps of the contactless type IC card as the second specific example regarding the manufacture of the certification card in the certification system, wherein FIG. 23A is a side cross section view of the contactless type IC card finally assembled as the certification card by affixing the third intermediate member and the cover member, and FIG. 23B is a perspective view of the certification card.

FIG. 25 is a drawing for describing a structure of a certification information database.

FIG. 26 is a drawing for describing a structure of a certification terminal database.

FIG. 27 is a drawing for describing a structure of a judge database.

BEST MODES OF EMBODYING THE INVENTION

Now, a specific embodiment to which the present invention is applied will be described in detail by reference to the drawings.

This embodiment is a certification system to distinguish an individual person for certifying that the individual person is a right person. The certification system uses visible information for directly distinguishing an individual person rather than information elements such as simple numbers, characters, symbols. The certification system can use as the visible information at least a looks image such as the face images of an individual person as well as a signature or the like. And the certification system makes a card-shaped certification medium (referred to as a certification card below) of a two dimensional photograph and a hologram or a holographic stereogram by integrating at least a printing of a two dimensional photograph of visible information and a hologram or a holographic stereogram of the visible information and judgment is made if the individual person is the right person by means of the certification card. The certification system also stores the visible information in a designated server and a certifying judge reads out the corresponding visible information from the server in accordance with the presented certification card before judging if the individual person is the right person. Moreover, in the certification system, the certification card is constructed as an IC card by assembling an IC (integrated circuit) chip in the certification card so that designated information is recorded in the IC chip. By combining these various technologies, the certification system makes it possible to provide a certification card with excellent anti-counterfeit capability and a plurality of check mechanisms with regards to certification.

It is to be noted, for convenience of description, that description will be made hereunder on the use of looks images showing an individual person as visible information for directly distinguishes the individual person. Also for convenience of description, it is described hereunder that an object to be integrated with the two dimensional photograph in the certification card is a holographic stereogram.

Firstly, a concept of making and issuing the certification card to be used in the certification system will be described.

Figure 1:
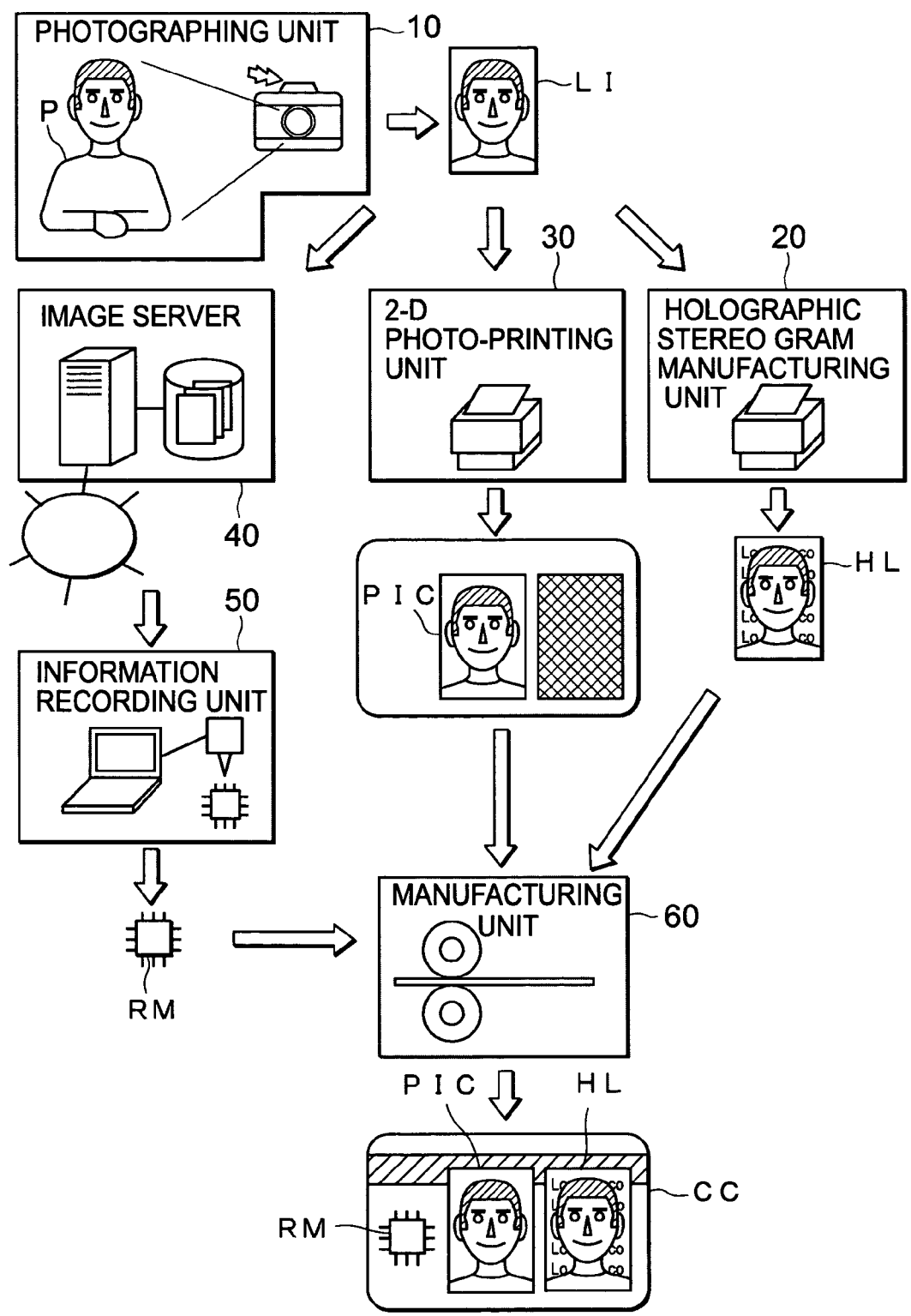
FIG. 1 is an illustration for describing a concept of a certification system presented as an embodiment according to the present invention, in which steps from making to issuing a certification card are conceptually illustrated.

As shown in FIG. 1, the certification system comprises a photographing unit 10 which is looks image making means for making a looks image data LI of a face picture or the like by taking a picture of an individual person P to be certified as an object, a holographic stereogram manufacturing unit 20 which is holographic stereogram manufacturing means for making a holographic stereogram HL based on the looks image data LI made by the photographing unit 10, a two dimensional photo printing unit 30 which is two dimensional photo printing means for printing the looks image data LI as a two dimensional photograph PIC, an image server 40 which is information storage means for storing various kinds of information including at least the looks image data LI, an information recording unit 50 which is information recording means for recording in a recording member RM connection information and is connected to the image server 40 for reading out the stored looks image data LI, and a manufacturing unit 60 which is certification medium manufacturing means for making a certification card CC by integrating the recording member RM, the two dimensional photograph PIC and the holographic stereogram HL.

It is to be noted in the certification system that each of these units may be an independent unit or an integrated single apparatus. In any event, each of these units is a constituent element to comprise a certification card manufacturing apparatus as a certification medium manufacturing apparatus.

The photographing unit 10 is provided under administration of a designated organization or the like for qualifying to enjoy given services or to follow necessary procedure which require identification of the individual person P and makes the looks image data LI of the face image or the like by taking a picture of the individual person P to be certified as an object. The photographing unit 10 makes the looks image data LI by photographing by, for example, a digital still camera or a video recorder having a camera or by using a scanner to read-out a pictured film taken by a photographic film camera. The looks image data LI made by photographing by the photographing unit 10 is supplied to the holographic stereogram manufacturing unit 20, the two dimensional photo printing unit 30 and the image server 40.

Figure 2A:
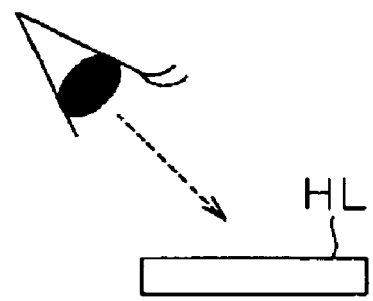
Figure 2B:
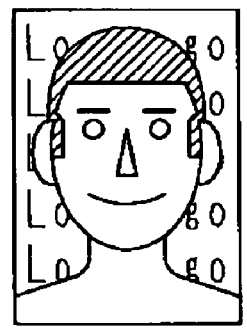
Figure 2C:
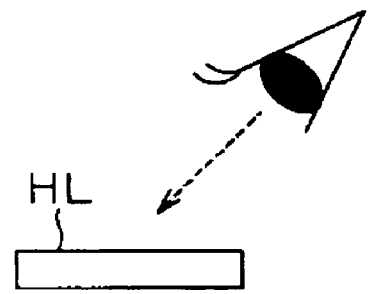
Figure 2D:
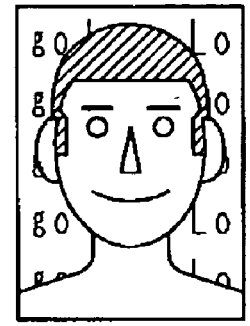

The holographic stereograph manufacturing unit 20 converts the looks image data LI made by the photographing unit 10 into data which can be printed as a holographic stereogram. At this time, the holographic stereogram manufacturing unit 20 combines a desired image data with the looks image data LI as the foreground and/or background, if necessary, thereby processing to convert into a three dimensional image pattern in which information changes in a direction of parallax. For example, the holographic stereogram manufacturing unit 20 can combine a pattern such as a designated trademark or the like as the background of a person representing the individual person P which is an object in the looks image data LI. If the holographic stereogram HL is observed in an observation angle as shown in FIG. 2A, a reproduction image is seen as shown in FIG. 2B. On the other hand, if the holographic stereogram HL is observed in an observation angle as shown in FIG. 2C, the location of the background pattern in the reproduced image is shifted as compared to the reproduced image in FIG. 2B, thereby generating a three dimensional image data of different superimposed relationship between the person and the pattern depending on observation angles. Contrary to the above, the holographic stereogram manufacturing unit 20 combines the picture of the individual person P which is the object in the looks image data LI and the foreground of a three dimensional pattern which is a designated series of numbers, characters such as a registration number, a serial number and/or symbols, thereby generating a three dimensional image data which changes the way of superimposing the person and the foreground depending on observation angles. Moreover, the holographic stereogram manufacturing unit 20 may combine the photograph of the individual person P which is the object in the looks image data LI and both of foreground and background, and then patterning them. Based on the three dimensional image data which is obtained by converting in the above manner, the holographic stereogram manufacturing unit 20 makes the holographic stereogram HL as a personalized printing which is reproducible by not only a monochromatic light such as a laser light or the like but also a white light and is capable of expressing tones.

It is to be noted that the technology to make such holographic stereogram HL can employ one of the systems for making printings capable of expressing parallax only in horizontal directions as disclosed in:

Akira Shirakura, Nobuhiro Kihara and Shigeyuki Baba, "Instant holographic portrait printing system", Proceeding of SPIE, Vol. 3293, pp246-253, January 1998 and Kihara, Shirakura and Baba, "High speed hologram portrait printing system", Three Dimensional Image Conference 1998, July 1998 or one of the systems capable of expressing parallax in both horizontal and vertical directions as disclosed in:

Yamaguchi, Honda and Ooyama "Holographic 3D printer using Lipman holographic stereogram", $20^{th}$ Image Engineering Conference, December 1989 and Endo, Yamaguchi, Honda and Ooyama, "High density recording in holographic 3D printer", $23^{rd}$ Image Engineering Conference, December 1992.

As in these technologies, it is possible for the holographic stereogram manufacturing unit 20 to use any technology to make a holographic stereogram which can express parallax in one direction or in both horizontal and vertical directions.

Specifically, the holographic stereogram manufacturing unit 20 can be realized by the following construction. It is to be noted that the holographic stereogram manufacturing unit 20 is described herein to make the holographic stereogram HL having horizontal parallax information by light exposure recording of a plurality of rectangular element holograms in a single hologram recording medium but needless to mention that the holographic stereogram HL having parallax information in both horizontal and vertical directions can be made by light exposure recording a plurality of dot-shaped element holograms in a single hologram recording medium.

Figure 3:
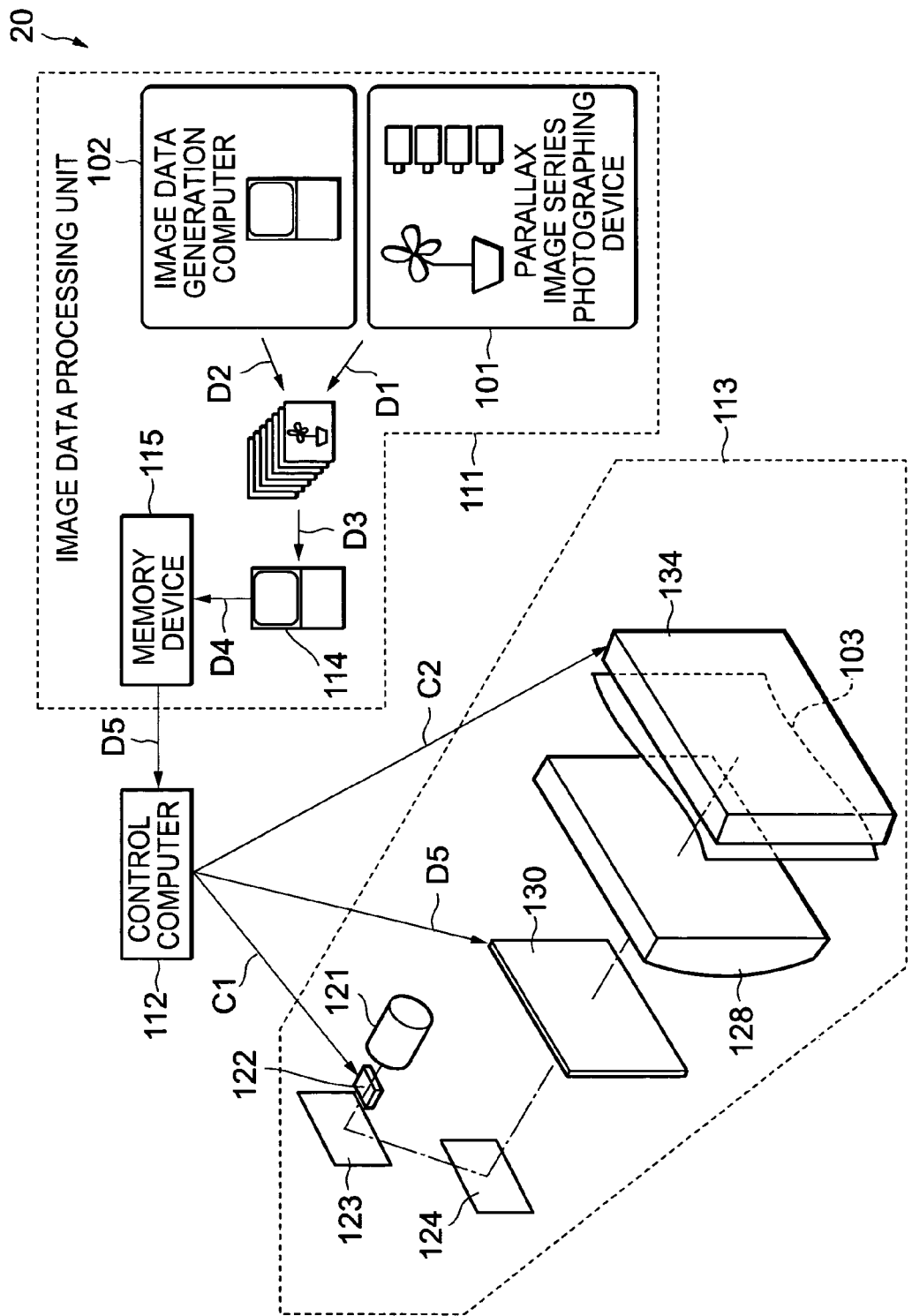
FIG. 3 is an illustration for describing the entire construction of the holographic stereogram manufacturing unit in the certification system.

The holographic stereogram manufacturing unit 20 is to make light exposure recording of a holographic stereogram image on a hologram recording medium 103 made from a light sensitive film. As shown in FIG. 3, the holographic stereogram manufacturing unit 20 comprises an image data processing section 111 for processing the image data which is an object of light exposure recording, a control computer 112 for entirely controlling the holographic stereogram manufacturing unit 20, and a printing section 113 including optical systems for making a holographic stereogram.

The image data processing section 111 has at least an image processing computer 114 and a memory device 115 for generating a parallax image data series D3 based on photographed image data D1 including parallax information which is supplied from a parallax image series photographing device 101 having, for example, a multi-lens camera, a movable camera or the like and image data of computer image data D2 or the like including parallax information generated by an image data generation computer 102.

It is to be noted that the photographed image data D1 is a plurality of image data which are obtained, for example, by simultaneously photographing using a multi-lens camera or continuous photographing by a movable camera. And there are parallax information between image data constituting the photographed image data D1. Similarly, the computer image data D2 are a plurality of image data generated as, for example, CAD (Computer Aided Design) and CG (Computer Graphics) and include parallax information between image data constituting the computer image data D2.

The image data processing section 111 generates hologram image data D4 by applying a predetermined image processing for holographic stereogram on parallax image data series D3 based on these photographed image data D1 and/or computer image data D2 by the image processing computer 114. The hologram image data D4 is temporarily stored in the memory device 115 such as, for example, a memory, hard disk device or the like. As described hereinafter, at the time of light exposure recording of the element hologram image onto the hologram recording medium 103, the image data processing section 111 sequentially reads out element hologram image data D5 for every image from the hologram image data D4 which are stored in the memory device 115 and the element hologram image data D5 is supplied to the control computer 112.

The control computer 112 controls the printing section 113 for sequentially light exposure recording as a rectangular element hologram an element display image in accordance with the element hologram image data D5 which are supplied from the image data processing portion 111 on the hologram recording medium 103 which is provided at a part of the printing section 113. At this time, as described hereinafter, the control computer 112 controls operation of each mechanism of the printing section 113.

The printing section 113 provides and supports each member constituting the optical system on a supporting substrate (optical base) which is not shown and the supporting substrate is supported by a casing of the unit by way of a damper or the like which is not shown. The printing section 113 has an incident optical system, an object optical system and a reference optical system as optical systems for making a holographic stereogram. It is to be noted that the holographic stereogram manufacturing unit 20 uses the light sensitive hologram recording medium 103 and thus the casing of the unit is constructed at least to keep light shielding capability of the optical systems.

Figure 4A:
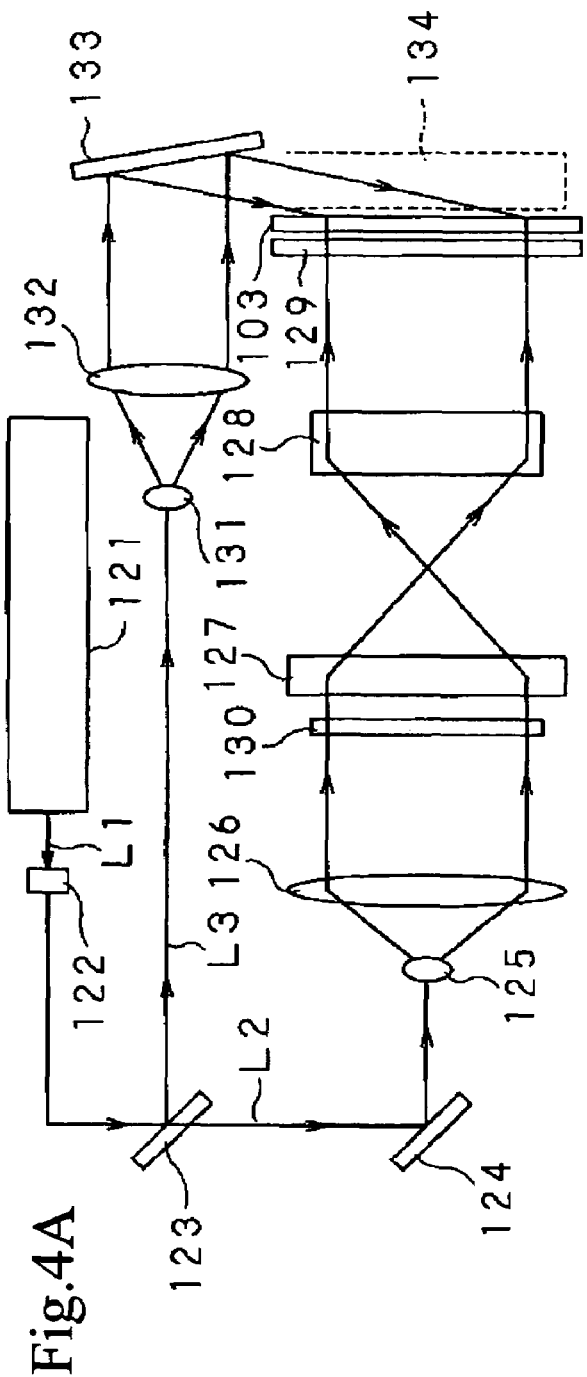

As shown in FIG. 4A, the printing section 113 has, as the incident optical system, a laser light source 121 for emitting a laser beam of a designated wavelength, a shutter mechanism 122 disposed on the optical axis of the laser beam L1 from the laser light source 121 for inputting or interrupting the laser beam L1 to a subsequent stage, and a half mirror 123 for splitting the laser beam L1 into an object light L2 and a reference light L3.

The laser light source 121 consists of a laser such as, for example, a semiconductor excited YAG laser, a water-cooled argon ion laser, a water-cooled krypton laser or the like which is capable of emitting a single wavelength, good coherence laser beam L1.

The shutter mechanism 122 is controlled to open or close by a control signal C1 outputted from the control computer 112 in response to an output timing of the element hologram image data D5 for inputting the laser light L1 to the optical systems at a subsequent stage or shutting off the laser beam L1 from outgoing into the optical systems at the subsequent stage.

The half mirror 123 splits the incident laser light L1 into a transmitting light and a reflecting light. The laser light L1 is used for two purposes: one is the transmitting light to be used as the above-mentioned object light L2 while the other is the reflecting light to be used as the reference light L3. The object light L2 and the reference light L3 are outputted to an object optical system and a reference optical system in subsequent stages, respectively.

It is to be noted that, although not shown, a mirror or the like may be provided in the incident optical system for the purpose of suitably changing a proceeding direction of the laser light L1 so as to equalize light paths of the object light L2 and the reference light L3. Also, the shutter mechanism 122 may be constructed as mechanically driven shutter blades or an electronic shutter using an AOM (Acousto-Optic Modulation). In other words, the shutter mechanism 122 may be any form as long as it can be freely closed or opened for shielding or passing the laser light L1 thereof.

Figure 4B:
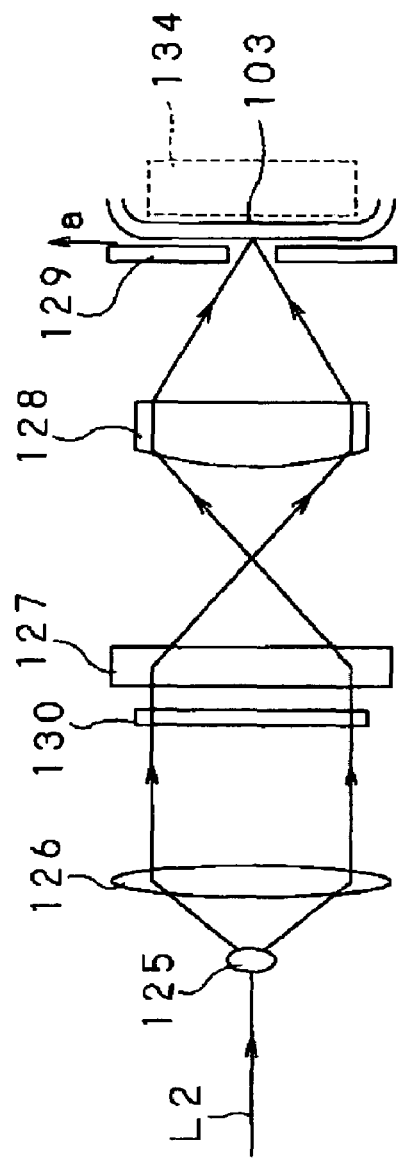

On the other hand, as shown in FIG. 4A and FIG. 4B, the printing section 113 comprises as the object optical system a mirror 124, a spatial filter 125, a collimator lens 126, a projection lens 127, a cylindrical lens 128 and a mask 129. These optical components are sequentially disposed from the input side along the optical axis.

The mirror 124 reflects the object light L2 permeated through the half mirror 123. The object light L2 which is reflected by the mirror 124 is inputted to the spatial filter 125.

The spatial filter 125 is constructed by a combination of, for example, a convex lens and a pinhole for equally directionally spreading the object light L2 which is reflected by the mirror 124 in response to the width of the display screen of a transmission type liquid crystal display 130 which will be described hereinafter.

The collimator lens 126 converts the spreading object light L2 by the spatial lens 125 into a parallel light before being lead to the transmission type liquid crystal display 130.

The projection lens 127 slightly spreads the object light L2 before projection onto the cylindrical lens 128. By slightly spreading the object light L2, the projection lens 127 contributes to improve image quality of the holographic stereogram HL to be made.

The cylindrical lens 128 focuses the parallel form object light L2 in the lateral direction.

The mask 129 is formed with a rectangular opening for inputting a part of the object light L2 focused by the cylindrical lens 128 and passed through the opening to the hologram recording medium 103.

In the object optical system, the transmission type liquid crystal display 130 is provided between the collimator lens 126 and the projection lens 127. The transmission type liquid crystal display 130 sequentially displays element holograph images based on the element hologram image data D5 which are supplied from the control computer 112. It is to be noted that the control computer 112 supplies a driving control signal C2 to a recording medium feeding mechanism 134, which will be described later, of the hologram recording medium 103 in response to the output timing of the element hologram image data D5 for controlling the operation, thereby controlling the feeding operation of the hologram recording medium 103.

In the object optical system which is constructed as described hereinabove, the object light L2 which is split by the incident optical system to be a narrow beam is spread by the spatial filter 125 and is then converted into a parallel light by inputting to the collimator lens 126. Moreover, in the object optical system, the object light L2 which is inputted to the transmission type liquid crystal display 130 by way of the collimator lens 126 undergoes image modulation in response to the element hologram image which is displayed on the transmission type liquid crystal display 130 before being inputted to the cylindrical lens 128 by way of the projection lens 127. And the object optical system operates so that the image modulated object light L2 is inputted to the hologram recording medium 103 through the opening of the mask 129 for light exposure recording in response to the element hologram image while the shutter mechanism 122 is operated to open.

Furthermore, the printing section 113 has a spatial filter 131, a collimator lens 132 and a mirror 133 as the reference optical system and these optical components are sequentially disposed from the input side along the optical axis.

Different from the spatial filter 125 in the above-mentioned object optical system, the spatial filter 131 consists of, for example, a combination of a cylindrical lens and a slit and spreads the reference light L3 which is split by reflection by the half mirror 123 to a predetermined width, specifically to one dimensional direction in response to the width of the display screen of the transmission type liquid crystal display 130.

The collimator lens 132 converts the spreading reference light L3 by the spatial filter 131 into a parallel light.

The mirror 133 reflects the reference light L3 in order to direct it to the back of the hologram recording medium 103.

The printing section 113 which is provided with the above-mentioned optical systems is constructed so that the object optical system through which the object light L2 split by the half mirror 123 passes has substantially the same light path as the light path of the reference optical system through which the reference light L3 passes. Accordingly, the printing section 113 improves coherence between the object light L2 and the reference light L3, thereby making a holographic stereogram HL with a clearer reproduced image.

The holographic stereogram manufacturing unit 20 is also provided with the recording medium feeding mechanism 134 for intermittently feeding the hologram recording medium 103 by an amount equal to one element hologram in the direction of an arrow a in FIG. 4B.

The recording medium feeding mechanism 134 is intermittently driven to run the hologram recording medium 103 in response to the driving control signal C2 which is supplied from the control computer 112. Also, the holographic stereogram manufacturing unit 20 opens the light path of the laser light L1 when driven by the shutter mechanism 122 based on the control signal C1 which is supplied from the control computer 112 in synchronism with the operation of the recording medium feeding mechanism 134.

Such a holographic stereogram manufacturing unit 20 operates so that the control computer 112 supplies the driving control signal C2 corresponding to one element hologram to the recording medium feeding mechanism 134 at every termination of light exposure recording for one element image, thereby driving the hologram recording medium 103 to run along the running path equal to one element hologram and to stop by positioning a non-light exposed portion at the opening portion of the mask 129. It is to be noted that the holographic stereogram manufacturing unit 20 is constructed so as to quickly stop any vibration caused in the hologram recording medium 103 while feeding the hologram recording medium 103. Here, the hologram recording medium 103 is, for example, an elongated light sensitive film and, although not shown, is wound about a feeding roll which is rotatively provided inside a film cartridge which is held in a light shielding condition as a whole. When the film cartridge is installed in the holographic stereogram manufacturing unit 20, the hologram recording medium 103 is pulled into the holographic stereogram manufacturing unit 20 and is driven to run along the running path by the recording medium feeding mechanism 134.

Under this condition, the holographic stereogram manufacturing unit 20 drives the shutter mechanism 122 to open and inputs the image modulated object light L2 and the reference light L3 respectively from the front and the back of the hologram recording medium 103, thereby light exposure recording the Moire fringe corresponding to the element hologram image. Upon completing light exposure recording of one element image, the holographic stereogram manufacturing unit 20 supplies the driving control signal C2 to the recording medium feeding mechanism 134 from the control computer 112 for promptly driving to run the hologram recording medium 103 by a designated amount before stopping.

Moreover, by a fixing processing portion (not shown), the holographic stereogram manufacturing unit 20 performs fixation processing which comprises an irradiation process of ultra violet ray onto the hologram recording medium 103 and a heating process of the hologram recording medium 103 at a designated temperature, thereby fixing the holographic stereogram image which is light exposure recorded on the hologram recording medium 103. The holographic stereogram manufacturing unit 20 sequentially cut the fixation processed hologram recording medium 103 at a designated size for each holographic stereogram for discharging a single holographic stereogram HL to the outside.

By continuously repeating the above operations, the holographic stereogram manufacturing unit 20 sequentially light exposure records a plurality of holographic stereogram images on the elongated hologram recording medium 103 for making a holographic stereogram HL on which the holographic stereogram image is light exposure recorded.

Each holographic stereogram HL made by such holographic stereogram manufacturing unit 20 is supplied to the manufacturing unit 60.

The two dimensional photo printing unit 30 prints the looks image data L1 produced by the photographing unit 10 as a personalized two dimensional photograph PIC by using a designated printer or the like. At this time, the two dimensional photo printing unit 30 performs the preprocessing, if necessary, and processes to convert into the two dimensional image data by combining the looks image data L1 with a designated image data as the foreground and/or the background. Also, as another preprocessing, the two dimensional photo printing unit 30 may pick up a part of the image data from the three dimensional image data generated by the holographic stereogram manufacturing unit 20, thereby converting it into the two dimensional image data. The two dimensional photo printing unit 30 prints the two dimensional image data thus converted by the above manner to obtain the two dimensional photograph PIC by means of, for example, a sublimation type, ink-jet type or other type printer. And the two dimensional photograph PIC printed and made by the two dimensional photo printing unit 30 is supplied to the manufacturing unit 60.

The image server 40 stores various kinds of information including at least the looks image data L1 produced by the photographing unit 10 in correspondence to the individual person P. Specifically, the image server 40 stores, if necessary, the image data based on the three dimensional image data which are generated by the holographic stereogram manufacturing unit 20 and/or the two dimensional image data which are generated by the two dimensional photoprinting unit 30 in addition to the looks image data L1. In order to interrelate the looks image data L1 and the individual person P, the image server 40 also holds a designated database which will be described hereinafter. In accordance with the database, the image server 40 stores image data to be readable through a designated cable and/or wireless communication network, for example, internet, intranet or the like.

Incidentally, in order to read-out the image data from the image server 40 through a communication network at the time of certification, the certification system predetermines connection information comprising information for specifying the image server 40 such as, for example, a telephone number, a URL (Uniform resource Locator) or the like and certification for specifying the image data which is stored in the image server 40. In the certification system, it may be arranged so that anyone who has the knowledge of the connection information and the connection procedure can read out the image data from the image server 40. At the time of connection to the image server 40, the certification system may be able to use, for example, the client side telephone number, an IP (Internet Protocol) address, key information such as a public key or a secret-key, a password or the like and performs the mutual certification between the image server 40 and the client side, thereby enabling only for a particular client terminal or a particular person to read out the image data.

The information recording unit 50 records the connection information corresponding to the looks image data L1 which is stored in the image server 40 in the designated recording member RM. Specifically, the information recording unit 50 may use a part of a surface area of a certification card CC to be finally manufactured as the recording member RM for visually recording the connection information by means of embossment, printing or the like. Alternatively, a designated device such as a barcode, a magnetic stripe or an IC chip from which the information is readable by a designated device is used as the recording member RM and the connection information is electromagnetically recorded in such recording member RM. It is shown in FIG. 1 that the information recording unit 50 uses an IC chip as the recording member RM and that the connection information is recorded therein. In a case of electromagnetically recording the connection information, the information recording unit 50 is also capable of recording in the recording member RM the key information which will be described hereinafter, the image data such as the looks image data L1 and the like as well as the connection information.

It is to be noted that an IC chip is employed as the recording member RM in the certification card CC. In a case of constructing the certification card CC as the IC card, it may be either a contact type or contactless type. Examples of the contact type IC card which are in a practical and actual proof stage include:

"VISA cash" which is an electronic money system developed by VISA International Inc. and "MONDEX" which is electronic money system developed as Mondex International Inc.

On the other hand, examples of the contactless type IC card which are in a practical and actual proof stage include:

"IC telephone card" for public telephones by NTT East Corporation and NTT West Corporation and "OCTOPUS card" which is a prepaid card commonly usable for transportation system in Hong Kong, the People's Republic of China.

Also, safety for counterfeit prevention or the like of such IC cards is disclosed in "1999 Investigation Report on Safety of Smart Cards" published by Information-technology Promotion Agency (IPA).

In order to make the certification card CC by taking the above technologies into consideration, the information recording unit 50 can make the recording member RM. The recording member RM made by recording by such information recording unit 50 is supplied to the manufacturing unit 60.

The manufacturing unit 60 makes the certification card CC by integrating at least the holographic stereogram HL which is made by and obtained from the holographic stereogram manufacturing unit 20, the two dimensional photograph PIC which is printed by and obtained from the two dimensional photo printing unit 30 and the recording member RM which is made by and obtained from the information recording unit 50. Specifically, the manufacturing unit 60 integrates the holographic stereogram HL, the two dimensional photograph PIC and the recording member RM by means of designated adhesion and fixation processing such as, for example, hot melt, thermal setting or photo setting. At this time, the manufacturing unit 60 integrates the holographic stereogram HL and the two dimensional photograph PIC in a condition that the holographic stereogram HL and the two dimensional photograph PIC are visible from the outside.

Such a certification system is able to make a certification card CC which integrates the holographic stereogram HL and the two dimensional photograph PIC based on the looks image data LI of the individual person P and the recording member RM which stores the connection information for reading the looks image data LI stored in the image server 40. In the certification system, the individual person P holds the certification card CC and shows it when requested for certification in the following certification procedure. It is to be noted that a specific example of making the certification card CC will be described in detail hereinafter.

Now, a concept of certification procedure using the certification card CC will be described.

Certification procedures in the certification system include a simple certification procedure using the certification card CC, a highly accurate online certification procedure using the certification card CC, a highly accurate offline certification procedure using the certification card CC and a highly accurate online and offline certification procedure using the certification card CC.

Firstly, a concept of a simple certification procedure using the certification card CC will be described.

Figure 5:
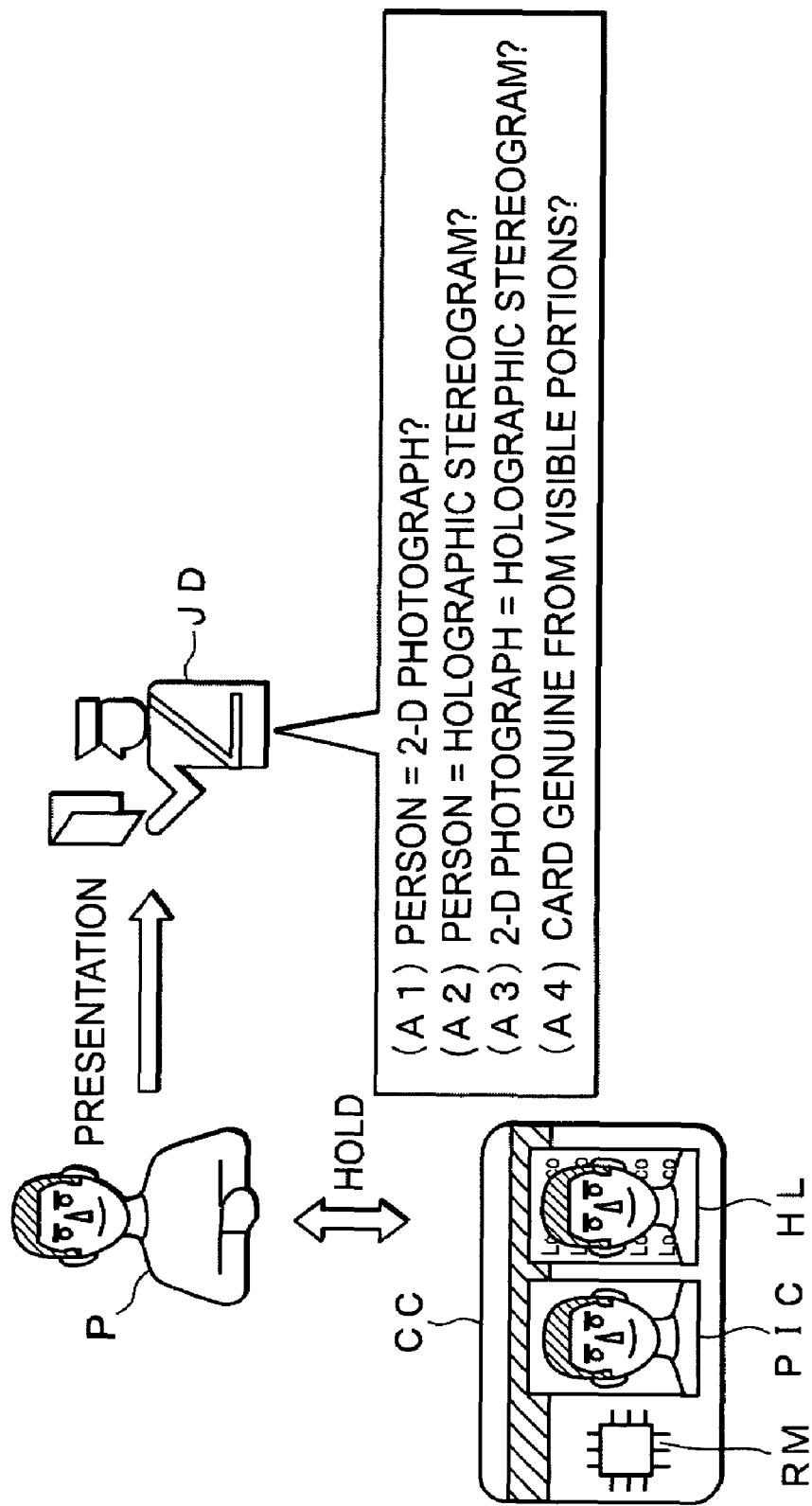
FIG. 5 is an illustration for describing a concept of the certification system, which is an illustration for describing a concept of a simple certification operation which uses the certification card.

As shown in FIG. 5, in the certification system, a certification operation is performed by presenting the certified card CC by the individual person P who is to be certified and holds the certification card CC in response to a request of a certifying judge JD.

When the certification card CC is presented, the certifying judge JD checks at least the following (A1) through (A4) by eye inspection of the certification card CC:

(A1) if the individual person to be identified who presented the certification card CC is the same person as seen in the two dimensional photograph PIC in the certification card CC;

(A2) if the individual person to be identified who presented the certification card CC is the same as the person in the reproduced image of the holographic stereogram HL in the certification card CC;

(A3) if the individual person as seen in the two dimensional picture PIC and the reproduced image of the holographic stereogram HL in the certification card CC agree with each other; and (A4) when verifying features of the visible portions such as a logo mark or the like in the foreground and/or background as shown in the reproduced image of the holographic stereogram HL in the certification card CC, if the certification card CC is genuine.

It is to be noted that, while checking the above (A1) through (A4), the certifying judge JD observes the certification card CC in a plurality of observation angles while changing the reproduced images in the holographic stereogram HL.

As described hereinabove, the certification system using a single certification card CC is simple and the certifying judge JD is able to simply certify if the individual person P to be certified is the right person by means of a plurality of check mechanisms. That is, the certifying judge JD who is a user of the certification system is able to perform certification procedure accurately and easily by means of the certification card CC. Also, the individual person P who is to be certified and is a user of the certification system is able to certify himself/herself as the right person by means of the certification card CC and enjoy designated services or follow the necessary procedure by way of the certifier JD in a case where the individual person P is proved to be the right person as a result of the certification procedure.

Then, a concept of a highly accurate online procedure using the certification card CC will be described.

In the certification system, a certification procedure is performed in a case where the image data corresponding to the individual person P such as the looks image data LI or the like is stored in the image server 40.

Figure 6:
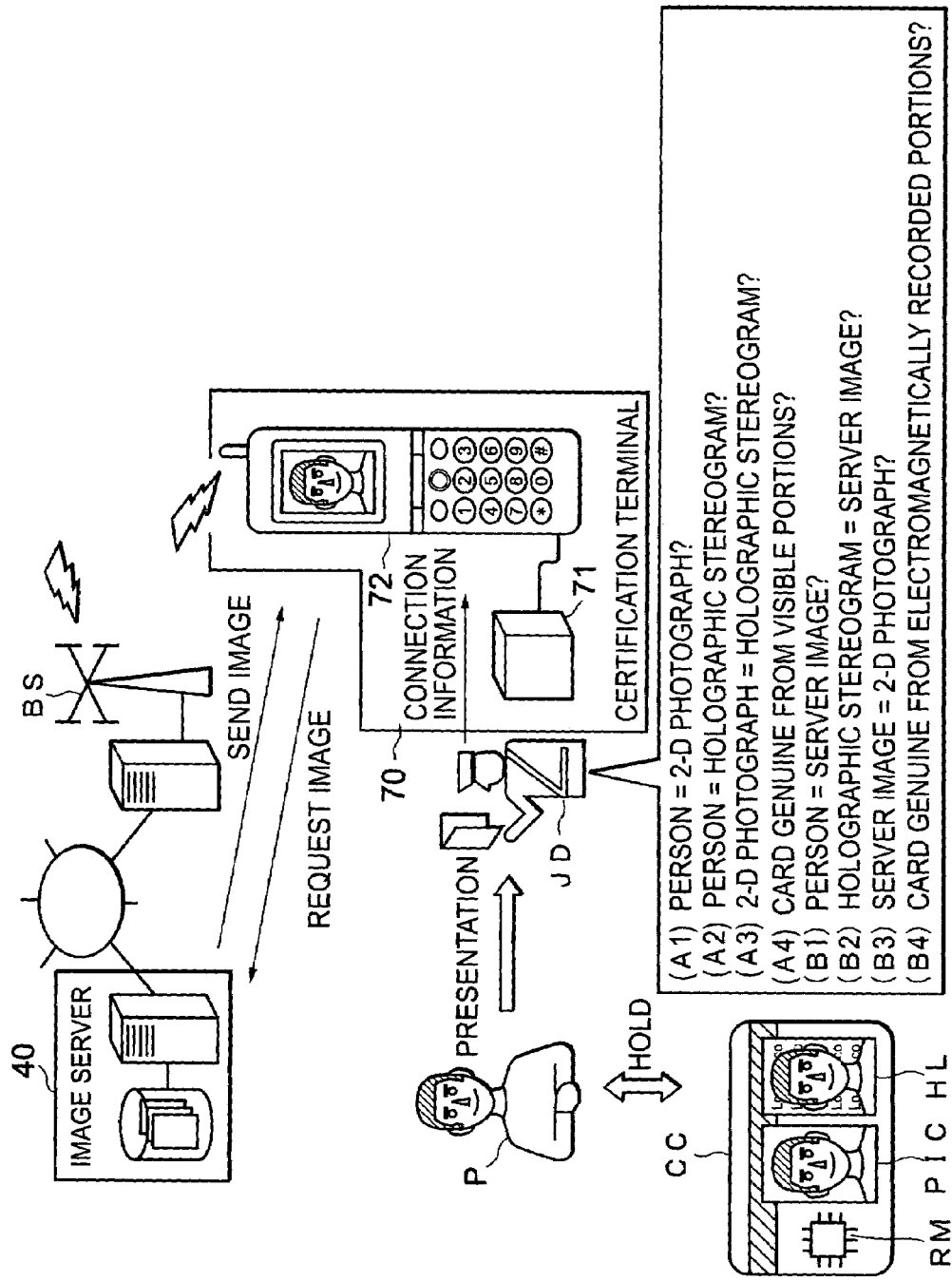
FIG. 6 is an illustration for describing a concept of the certification system, which is an illustration for describing a concept of a highly accurate online certification operation using the certification card.

As shown in FIG. 6, in the certification system, the certifying judge JD who performs the certification operation reads out the image data such as the looks image data LI (referred to as the server image below) by connecting to the image server 40 in accordance with the presented certification card CC and holds image read-out means and presentation means for presenting the server image to the certifying judge JD, thereby performing the certification operation when the individual person P to be identified who holds the certification card CC presents it in response to the request of the certifying judge JD.

When the certification card CC is presented, the certifying judge JD checks at least the following (A1) through (A4) by eye inspection of the certification card CC in the same manner as described above:

(A1) if the individual person to be identified who presented the certification card CC is the same person as seen in the two dimensional photograph PIC in the certification card CC;

(A2) if the person to be identified who presented the certification card CC is the same person as the reproduced image of the holographic stereogram HL in the certification card CC;

(A3) if the person appeared in the two dimensional photograph PIC of the certification card CC agrees with the person in the reproduced image of the holographic stereogram HL; and (A4) when verifying a logo mark or the like which is shown as the foreground and/or background of the reproduced image of the holographic stereogram HL in the certification card CC, if the certification card CC is genuine Furthermore, the certifying judge JD reads out the server image corresponding to the certification card CC from the image server 40 based on the connection information which is recorded in the designated recording member RM in the certification card CC.

At this time, in a case where the connection information is visually recorded at a partial area on the surface of the certification card CC as the recording member RM by embossment, printing or the like, the certifying judge JD reads it and inputs the read out connection information to a client terminal 72 which is presentation means such as a mobile phone, a personal digital assistant (PDA) or the like in an image certification terminal device 70. It is to be noted that the client terminal 72 has at least a display screen for displaying the image data. In the certification system, in response to the displayed image data, an image request command is issued from the client terminal 72 to the image server 40 by way of a designated base station BS. And the corresponding server image is sent from the image server 40 to the client terminal 72 by way of the designated base station BS.

On the other hand, in a case where the connection information is electromagnetically recorded in the recording member RM which is readable by a designated device such as a barcode, a magnetic stripe or the IC chip, the certifying judge JD reads out the connection information using a card reader 71 which is information read-out means connected to the client terminal 72 in the certification terminal device 70 and inputs the read out connection information to the client terminal 72. In response thereto, an image request command is issued from the client terminal 72 to the image server 40 in the certification system by way of the designated base station BS. And the server image is sent from the image server 40 to the client terminal 72 by way of a designated base station BS in response to the image request command.

When the server image is displayed on the display screen of the client terminal 72, the certifying judge JD performs eye inspection on the server image and the certification card CC to check at least the following (B1) through (B4):

(B1) if the individual person to be certified who presented the certification card CC is the same person who appears in the server image;

(B2) if the individual person in the reproduced image of the holographic stereogram HL in the certification card CC agrees with the person who appears in the server image; and (B3) if the person who appears in the server image agrees with the person as seen in the two dimensional photograph PIC in the certification card CC.

It is to be noted at this time that various kinds of information such as the name and the like of the individual person corresponding to the displayed server image may be displayed simultaneously on the display screen of the client terminal 72.

In the certification system, as a result of a plurality of check mechanisms by the certifying judge JD using a single certification card CC in online operation, it is possible to accurately and easily certify if the individual person P to be certified is the right person.

Also, in the certification system, in a case where the connection information is electromagnetically recorded in the recording member RM which is readable by the card reader 71, such as a barcode, a magnetic stripe or an IC chip, key information such as a public key and a secret-key may be pre-recorded in the recording member RM together with the connection information. In the certification system in this particular case, certification of the key information is carried out by performing certification inside the client terminal 72 or by sending the key information to the image server 40 from the client terminal 72 together with the connection information. That is, the certification system is able to check the following (B4):

(B4) When verifying the features of the key information and like as recorded in the recording member RM of the certification card CC at the electromagnetically recorded portion, if the certification card CC is genuine.

Accordingly, in the certification system, it is possible to accurately and easily certify if the individual person P to be certified is the right person by performing certification of the certification card CC itself. That is, the certifying judge JD who is a user of the certification system is able to accurately and easily perform an online certification by means of the certification card CC. On the other hand, the individual person P to be certified who is a user of the certification system is also able to accurately and easily perform certification by means of the certification card CC and enjoy designated services or follow designated procedure by way of the certifying judge JD if the individual person is proved as the right person as a result of the certification operation.

Now, a concept of accurate offline certification operation using the certification card CC will be described.

In the certification system, a certification operation is performed in a case where the image data such as the looks image data LI and the like corresponding to the individual person P is recorded in the recording member RM. Particularly, this technique is effective in a case where the certification card CC is constructed in the form of an IC card.

In other words, it is possible to record still images, so-called animation GIF (Graphics Interchange Format) frame feeding pseudo-animated images, or normal animated images in the IC card. Accordingly, in the certification system, the above described information recording unit 50 records the looks image data LI in the recording member RM such as an IC chip or the like by encrypting based on a designated encryption technique or uses a designated encryption method at the time of writing and/or read-out of the looks image data LI which is recorded in the recording member RM, thereby enabling only the right person to write and read out the looks image data LI. And the certification operation can be performed depending on whether or not the looks image data LI can be read out of the recording member RM and the read-out looks image data LI is correct.

Also, in the certification system, since the pseudo-animated images and the animated images can be recorded in the IC card, a part or all of the image data is extracted from the three dimensional image data which is generated by the holographic stereogram manufacturing unit 20 at the time of recording the image data such as the looks image data LI and the like in the recording member RM such as the IC chip or the like by the information recording unit 50, thereby enabling to record the image data as the animated images which are equivalent to the images as the reproduced images which are reproduced from the holographic stereogram HL to be observed in a manner to change sequentially by parallax.

Figure 7:
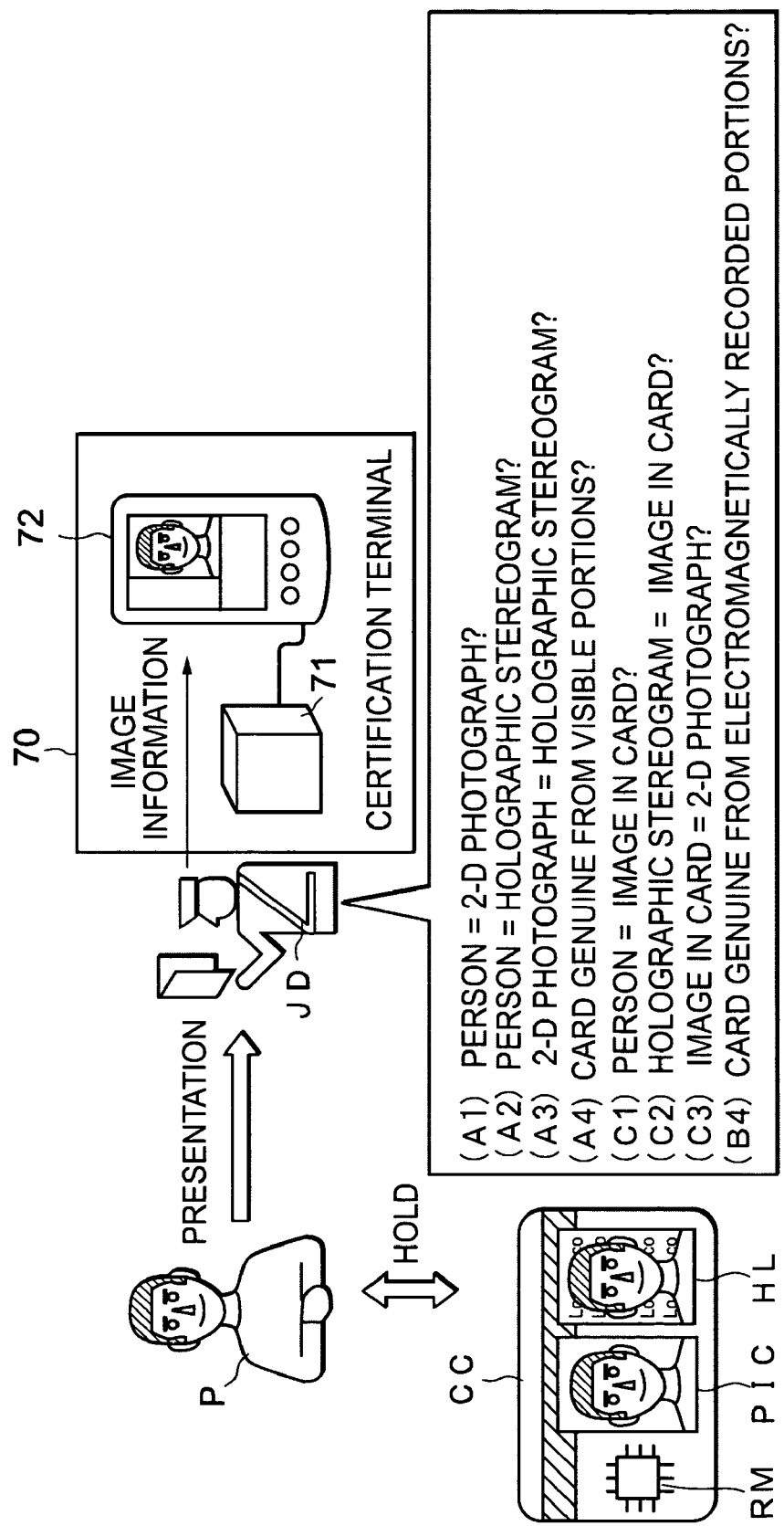
FIG. 7 is an illustration for describing a concept of the certification system, which is an illustration for describing a concept of a highly accurate offline certification operation using the certification card.

As shown in FIG. 7, in the certification system, the certifying judge JD reads out the image data such as the looks image data LI or the like (referred to as the image-in-card hereinbelow) which is recorded in the recording member RM in the presented certification card CC and holds the certification terminal device 70 to present by displaying the image in card to the certifying judge JD, thereby performing the certification operation by presenting the certification card CC by the individual person P to be certified who holds the certification card CC in response to the request of the certifying judge JD.

When the certification card CC is presented, similarly to the above, the certifying judge JD performs eye inspection of the certification card CC to check at least the following (A1) through (A4):

(A1) if the individual person to be certified who presented the certification card CC is the same person as seen in the two dimensional photograph PIC in the certification card CC;

(A2) if the individual person to be certified who presented the certification card CC is the same person in the reproduced image of the holographic stereogram HL in the certification card CC;

(A3) if the individual person appeared in the two dimensional photograph PIC in the certification card CC agrees with the person in the reproduced image in the holographic stereogram HL; and (A4) when verifying the features in the visible portion such as a logo mark and the like as the foreground and/or background in the reproduced image in the holographic stereogram HL of the certification card CC, if the certification card CC is genuine Moreover, the certifying judge JD reads out the image in card such as the looks image data LI which is recorded in the designated recording member RM in the certification card CC.

At this time, in a case where the image-in-card is electromagnetically recorded in the recording member RM which is readable by means of a designated device, such as a barcode, a magnetic stripe or an IC card, the certifying judge JD instructs the client terminal 72 to read out the image-in-card by means of the card reader 71 which is connected to the client terminal 72 such as a mobile phone, a personal digital assistant or the like in the certification terminal device 70. In the certification system, the image in card is read out of the certification card CC by means of the client terminal 72 in response to the instruction.

When the image-in-card is displayed on the display screen of the client terminal 72, the certifying judge JD performs eye inspection on the image-in-card and the certification card CC and checks at least the following (C1) through (C3):

(C1) if the individual person to be certified who presented the certification card CC is the same person as displayed in the image-in-card;

(C2) if the individual person in the reproduced image of the holographic stereogram HL in the certification card CC agrees with the person as displayed in the image in card;

(C3) if the individual person displayed in the image-in-card agrees with the person appeared in the two dimensional photograph PIC of the certification card CC.

At this time, it is to be noted that various kinds of information such as the name and the like of the person corresponding to the displayed image-in-card may also be displayed on the display screen of the client terminal 72.

In the certification system, it is possible to accurately and easily certify if the individual person P to be certified is the right person by means of a plurality of offline check mechanisms by the certifying judge JD using a single certification card.

Also, in the certification system in which the image in card is electromagnetically recorded in the recording member RM which is readable by the card reader 71, such as a barcode, a magnetic stripe or an IC chip, it is possible to record in advance key information such as a public key and a secret-key together with the connection information in the recording member RM. In this case, in the certification system, the key information is certified inside the client terminal 72 and judgment is made if the key information is genuine and if the image in card can be read out accurately. That is, the certification system checks the above-mentioned (B4):

(B4) when verifying the features of the electromagnetically recorded portion such as the key information and the like which is recorded in the recording member RM in the certification card CC, if the certification card CC is genuine.

Accordingly, in the certification system, by performing certification of the certification card CC, it is possible to confirm more accurately and easily if the individual person P to be certified is the right person. That is, the certifying judge JD who is a user of the certification system is able to perform offline certification operation accurately and easily by using the certification card CC. The individual person P to be certified who is a user of the certification system is also able to accurately and easily perform certification operation by means of the certification card CC and enjoy designated services and follow designated procedure by way of the certifying judge JD if the individual person is proved to be the right person as a result of the certification operation.

Finally, a concept of the highly accurate online and offline certification operation using the certification card CC will be described.

The certification system stores the image data corresponding to the looks image data LI and the like of the individual person P in the image server 40 and performs the certification operation in a case where the image data such as the looks image data LI and the like corresponding to the individual person P is recorded in the recording member RM.

Figure 8:
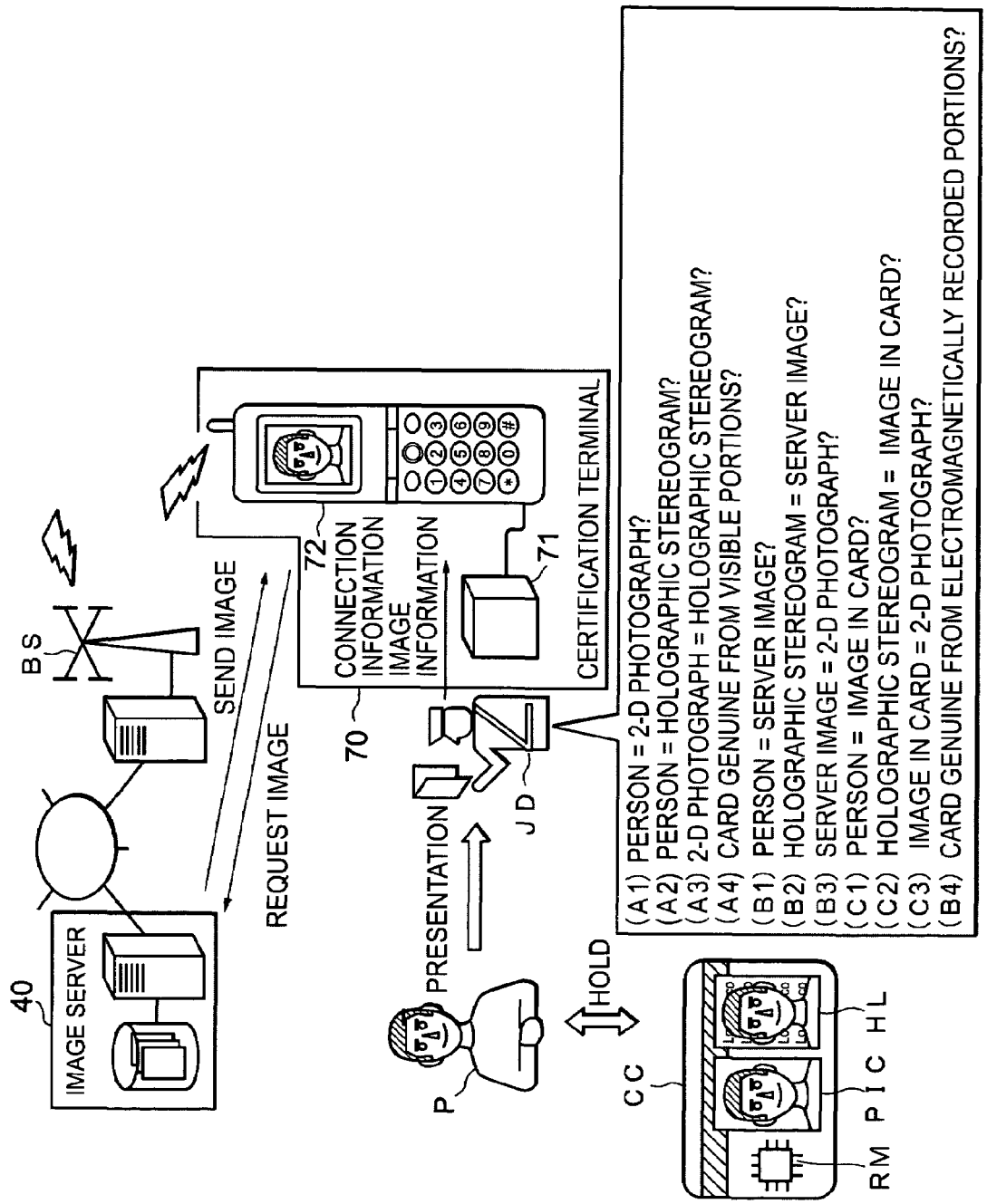
FIG. 8 is an illustration for describing a concept of the certification system, which is an illustration for describing a highly accurate online and offline certification operation using the certification card.

As shown in FIG. 8, in the certification system, a certifying judge JD who performs the certification operation connects to the image server 40 in accordance with the presented certification card CC to read out the server image which is presented to the certifying judge JD for displaying the server image and holds the certification terminal device 70 to read out the image-in-card which is recorded in the recording member RM in the presented certification card CC for presenting the image-in-card to the certifying judge JD by displaying or the like. As a result, certification operation is performed by presentation of the certification card CC by the individual person P to be certified who holds the certification card CC in response to the request of the certifying judge JD.

When the certification card CC is presented, the certifying judge JD performs eye inspection on the certification card CC and checks, as described hereinabove, at least the following (A1) through (A4):

(A1) if the individual person to be certified who presented the certification card CC is the same as the person appeared in the two dimensional photograph PIC in the certification card CC;

(A2) if the individual person to be certified who presented the certification card CC is the same person as shown in the reproduced image of the holographic stereogram HL in the certification card CC;

(A3) if the individual person-appeared in the two dimensional photograph PIC in the certification card CC agrees with the person in the reproduced image of the holographic stereogram HL; and (A4) when verifying the features in the visible portion of a logo mark or the like as the foreground and/or background which is shown in the reproduced image of the holographic stereogram in the certification card CC, if the certification card CC is genuine Moreover, as described hereinabove, the certifying judge JD reads out the server image corresponding to the certification card CC from the image server 40 in accordance with the connection information which is recorded in the designated recording member RM in the certification card CC.

When the server image is displayed on the display screen of the client terminal 72, the certifying judge JD performs eye inspection on the server image and the certification card CC in order to check at least the following (B1) through (B3):

(B1) if the individual person to be certified who presented the certification card CC is the same as the person in the displayed server image;

(B2) if the individual person as shown in the reproduced image of the holographic stereogram HL in the certification card CC agrees with the person in the displayed server image; and (B3) if the individual person in the displayed server image agrees with the person in the two dimensional photograph PIC in the certification card CC.

It is to be noted that the display screen of the client terminal 72 may display various kinds of information such as the name and the like of the person corresponding to the displayed server image at this time.

Moreover, as described hereinabove, the certifying judge JD reads out the image-in-card as recorded in the designated recording member RM of the certification card CC.

When the image-in-card is displayed on the display screen of the client terminal 72, the certifying judge JD performs eye inspection on the image-in-card and the certification card CC and checks, as described hereinabove, at least the following (C1) through (C3):

(C1) if the individual person to be certified who presented the certification card CC is the same as the person in the displayed image-in-card;

(C2) if the individual person in the reproduced image of the holographic stereogram HL of the certification card CC agrees with the person in the displayed image-in-card; and (C3) if the individual person in the displayed image-in-card agrees with the person in the two dimensional photograph PIC.

It is to be noted that, at this time, the display screen of the client terminal 72 may also display together with various kinds of information such as the name of the person corresponding to the displayed image-in-card.

Again, as described above, the certification system, it is able to check the following (B4):

(B4) when verifying the features in the electromagnetically recorded portion such as the key information and the like which is recorded in the recording member RM of the certification card CC, if the certification card CC is genuine.

In the certification system, it is possible to certify with very high degree of accuracy if the individual person P to be certified is the right person by way of a plurality of online and offline check mechanisms by the certifying judge JD using a single certification card CC. That is, the certifying judge JD who is a user of the certification system is able to accurately and easily perform the online and offline certification operation by means of the certification card CC. Also, the individual person P to be certified who is a user of the certification system is able to accurately and easily be certified by means of the certification card CC and enjoy designated services and follow designated procedure by way of the certifying judge JD if the person is proved to be the right person as a result of the certification operation.

As described hereinabove, according to the certification system, the certification operation can be performed in different ways including a simple certification using the certification card CC, a highly accurate online certification using the certification card CC, a highly accurate offline certification using the certification card CC, and a highly accurate online and offline certification using the certification card CC. It is to be noted that specific examples of these certification operations using the certification card CC will be described in detail later.

Now, specific examples of the certification system based on the above concept will be described.

Firstly, a first specific example of making a certification card CC will be described.

The specific example is to make the certification card CC as a contact type IC card which is an IC card with external terminals in conformity to ISO (International Organization for Standardization)/IEC (International Electro-technical Commission) 78-16 or JIS (Japan Industrial Standard) X6303~X6307 and as a card provided with a magnetic stripe.

Figure 9:
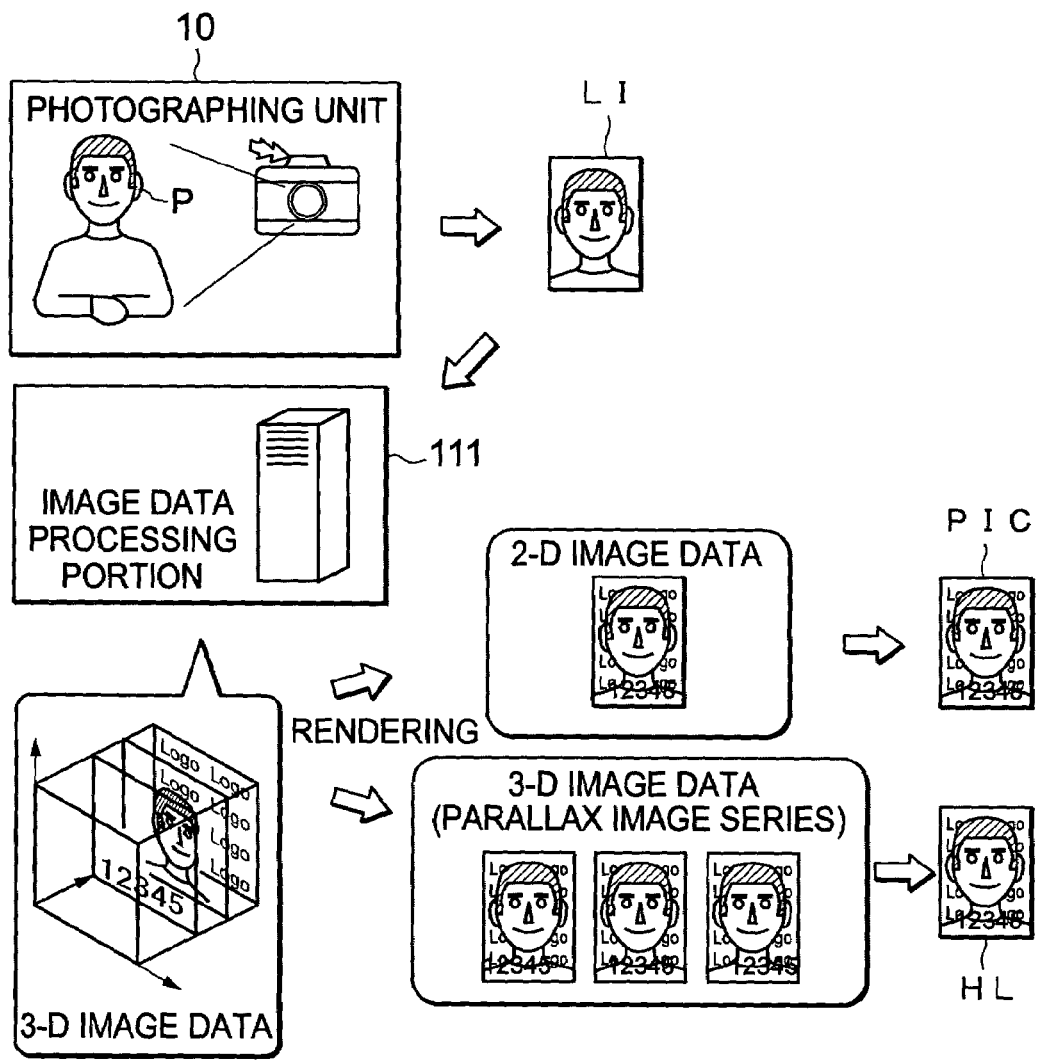
FIG. 9 is an illustration for describing a specific example of making the certification card in the certification system, which is an illustration for describing a way how a photograph of an individual person to be identified is taken and a two dimensional photograph and a holographic stereogram are made.

Firstly, as shown in FIG. 9, in the certification system, the looks image data LI such as the face image or the like is prepared by taking a photograph of the individual person P to be certified as an object by the above-mentioned photographing unit 10. In this particular example, the two dimensional image data is photographed by a digital still camera.

Also, in the certification system, the looks image data LI as the two dimensional image data is combined with image data comprising three dimensional image data as the foreground and the background by the image data processing portion 111 in the above described holographic stereogram manufacturing unit 20, thereby making the holographic stereogram HL as a printing based on the three dimensional image data rendered from three dimensional image data which comprises the obtained object data to parallax image series.

Moreover, in the certification system, the two dimensional photograph PIC is prepared by the above described two dimensional photo-printing unit 30 using the two dimensional image data which is obtained by rendering the three dimensional image data which is generated by the holographic stereogram manufacturing unit 20 to images as observed from the front.

Then, in the certification system, a magnetic card MC as a base member of the certification card CC is prepared as shown a front view in FIG. 10A, a side cross section view in FIG. 10B and a perspective view in FIG. 10C. The magnetic card MC is a card which is known as a JIS I type or a JIS II type white plane card with a magnetic stripe. The magnetic card MC is made by laminating a base film on a layer comprised of a magnetic stripe and an adhesive. It is to be noted that the magnetic card MC is preferably thin for lamination which will be described later.

Also, in the certification system, a print surface member PM on which the two dimensional photograph PIC is affixed is prepared as shown a front view in FIG. 11A, a side cross section view in FIG. 11B and a perspective view in FIG. 11C. The print surface member PM has the two dimensional photograph PIC as affixed thereto and characters, figures and the like visibly printed on the certification card CC. Moreover, since the certification card CC is constructed as a contact type IC card, the print surface member PM is formed with a recording member hole RMH for accommodating an IC device such as an IC chip and the like and a holographic stereogram hole HLH for accommodating the holographic stereogram HL. It is to be noted that these recording member hole RMH and the holographic stereogram hole HLH may be recesses.

In the certification system, a first intermediate member is prepared by the manufacturing unit 60 by laminating the magnetic card MC as shown in FIG. 10A through FIG. 10C and the print surface member PM as shown in FIG. 11A through FIG. 11C, wherein a side cross section view is shown in FIG. 12A and a perspective view is shown in FIG. 12B.

Furthermore, in the certification system, the holographic stereogram HL is prepared as shown a front view in FIG. 13A, a side cross section view in FIG. 13B and a perspective view in FIG. 13C. Also, in the certification system, the recording member RM comprising an IC device is prepared as shown a front view in FIG. 14A, a side cross section view in FIG. 14B and a perspective view FIG. 14C.

In the certification system, the holographic stereogram HL as shown in FIG. 13A through FIG. 13C is positioned so as to be accommodated in the holographic stereogram hole HLH in the first intermediate member and the recording member RM as shown in FIG. 14A through FIG. 14C is positioned so as to be accommodated in the recording member hole RMH and then affixed by the manufacturing unit 60 to prepare a second intermediate member as shown a side cross section view in FIG. 15A and a perspective view in FIG. 15B.

Figure 16C:
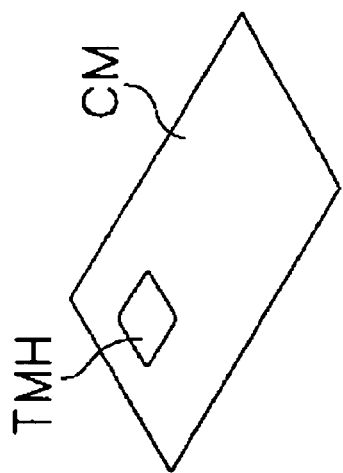
Figure 16B:
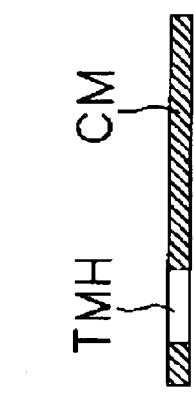
Figure 16A:
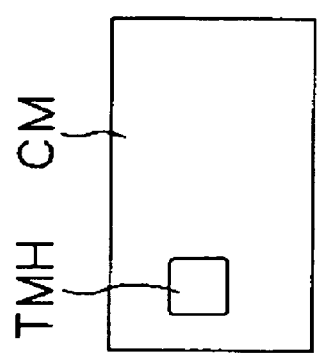

Finally, in the certification system, a cover member CM is prepared as shown a front view in FIG. 16A, a side cross section view in FIG. 16B and a perspective view in FIG. 16C. The cover member CM is made from an optically transparent material so that the two dimensional photograph PIC, the holographic stereogram HL and characters, figures and the like which are drawn on the print surface member PM are made visible. Also, the cover member CM is formed with an external terminal hole TMH to externally expose external terminals of the IC device.

Figure 17B:
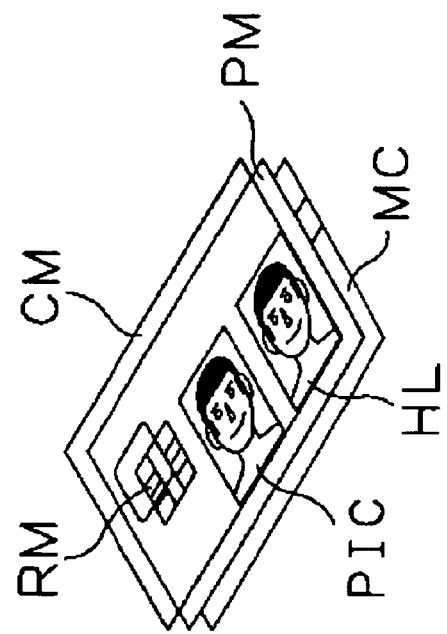
Figure 17A:
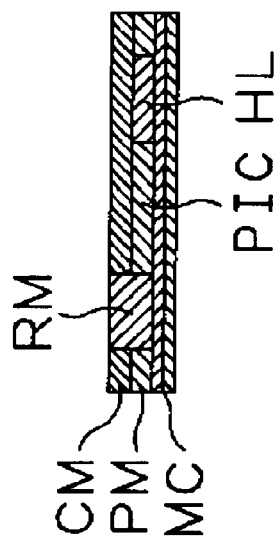

In the certification system, the certification card CC in the form of a contact type IC card is made by the manufacturing unit 60 by putting the second intermediate member as shown in FIG. 15A and FIG. 15B together with the cover member CM in such a manner to expose the external terminals of the IC device through the external terminal hole TMH as shown a side cross section view in FIG. 17A and a perspective view in FIG. 17B.

In the certification system, the certification card CC in form of a contact type IC card is made through these series of steps. Accordingly, in the certification system, the certification card CC can be made in a planar form with minimum surface unevenness by affixing the cover member CM. This means that the certification card CC is easy to handle. Also, by covering the print surface member PM including the two dimensional photograph PIC and the holographic stereogram HL with the cover member CM before being sealed in the certification card CC in the certification system, the certification card CC is hard to be counterfeited or modified.

It is to be noted here that, although the characters, figures and the like which are visibly drawn in the certification card CC are described to be printed on the print surface member PM, a part or all of the characters, figures and the like may be printed on the cover member CM. Also, it is needless to say that the characters, figures and the like in the certification card CC may be printed on the exposed side of the magnetic card MC which constitutes the base member, i.e., a rear surface reverse to the front surface on which the cover member CM is affixed.

Also, in the certification system, the sequence of manufacturing the certification card CC is not particularly restricted and it may be assembled sequentially from the magnetic card MC constituting the base member or the entire components may be affixed at one time in an aligned condition.

Now, a second specific example of manufacturing the certification card CC will be described.

This example is to make the certification card CC as a contactless type IC card which is an IC card having no external terminals in conformity to ISO/IEC 10536, 14443, 15693 or JIS X6321-X6323 and is provided with a magnetic stripe.

Firstly, similar to the one as shown in FIG. 9, in the certification system, the looks image data LI such as the face image or the like is prepared by taking a photograph of the individual person P to be identified by the above described photographing unit 10. A digital still camera is used herein for taking a photograph of the two dimensional image data.

Again, in the certification system, the image data as the foreground and the background comprising three dimensional image data is combined with the looks image data LI which is two dimensional image data by the image data processing portion 111 in the above described holographic stereogram manufacturing unit 20 and the holographic stereogram HL is prepared as a printing based on the three dimensional image data rendered from three dimensional image data comprising the obtained object data to parallax image series.

Moreover, in the certification system, the two dimensional photograph PIC is prepared by the above described two dimensional photo printing unit 30 by using the two dimensional image data which is obtained by rendering the three dimensional image data generated by the holographic stereogram manufacturing unit 20 to images as observed from the front.

Then, as shown in FIG. 10A through FIG. 10C, in the certification system, a magnetic card MC which is known as so-called white plane card is prepared to be a base member of the certification card CC.

Figure 18A:
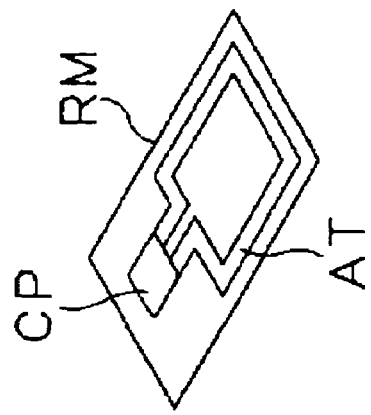
Figure 18B:
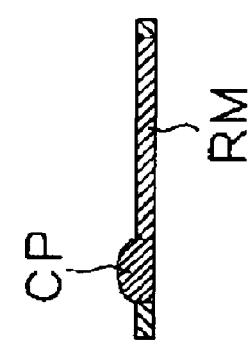
Figure 18C:
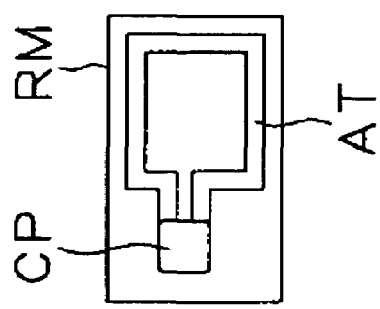

Also, in the certification system, a recording member RM comprising an IC portion is prepared in order to construct the certification card CC as a contactless type IC card as shown a front view in FIG. 18A, a side cross section view in FIG. 18B and a perspective view in FIG. 18C. The IC portion as the recording member RM comprises an antenna AT for communicating by means of an electromagnetic wave and an IC chip CP for recording the data and controlling communication processing with outside. In the certification system, since the IC chip CP in the IC portion herein generally has a designated thickness, only the IC chip is made thick and the other part is flattened and the other member to be affixed therewith is formed with a hole so that the IC chip is not destroyed when assembled.

Figure 19B:
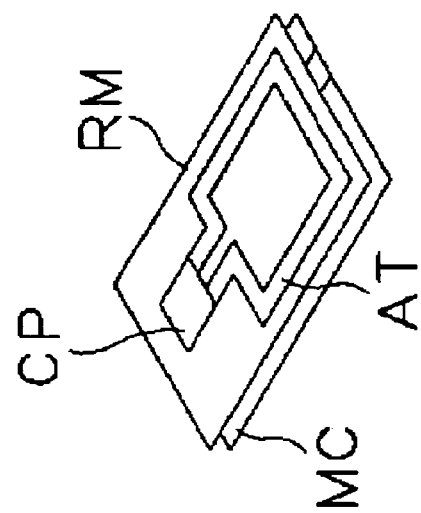
Figure 19A:
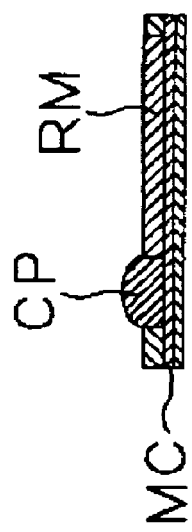

In the certification system, the magnetic card MC as shown in FIG. 10A through FIG. 10C and the recording member RM as shown in FIG. 18A through FIG. 18C are assembled by affixing by the manufacturing unit 60 to make a first intermediate member as shown a side cross section view in FIG. 19A and a perspective view in FIG. 19B.

Moreover, in the certification system, the print surface member PM having the two dimensional photograph PIC attached thereto is prepared as shown previously in FIG. 11A through FIG. 11C. The print surface member PM has characters, figures and the like which are visibly printed on the certification card CC in addition to the two dimensional photograph PIC attached thereto. In order to construct the certification card CC as a contactless type IC card, the print surface member PM is also formed with a recording member hole RMH for accommodation of the IC chip CP in the IC portion and a holographic stereogram hole HLH for accommodation of the holographic stereogram HL. It is to be noted that these recording member hole RMH and/or holographic stereogram hole HLH may be recesses.

In the certification system, the IC chip in the IC portion as shown in FIG. 18A through FIG. 18C is positioned so as to be accommodated in the recording member hole RMH in the first intermediate member for putting together to make by the manufacturing unit 60 a second intermediate member as shown a side cross section view in FIG. 20A and a perspective view in FIG. 20B.

Furthermore, in the certification system, the holographic stereogram HL is prepared as previously shown in FIG. 13A through FIG. 13C.

In the certification system, the holographic stereogram HL as shown in FIG. 13A through FIG. 13C is positioned so as to be accommodated in the holographic stereogram hole HLH in the second intermediate member putting together by the manufacturing unit 60 to make a third intermediate member as shown a side cross section view in FIG. 21A and a perspective view in FIG. 21B.

Figure 22A:
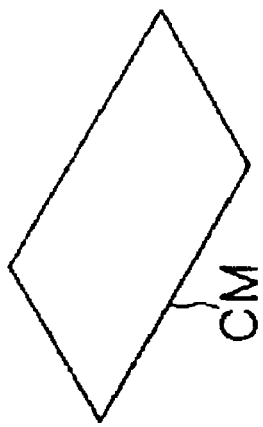
Figure 22B:
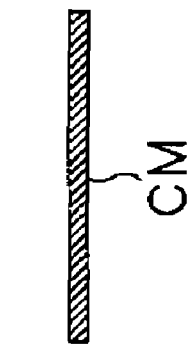
Figure 22C:
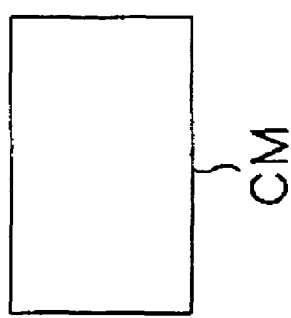

Finally, in the certification system, a cover member CM is prepared as shown a front view in FIG. 22A, a side cross section view in FIG. 22B and a perspective view in FIG. 22C. The cover member CM is made from an optically transparent material so that the two dimensional photograph PIC, the holographic stereogram HL and characters, figures and the like which are drawn on the printing plane member PM are made visible. It is to be noted that, the cover member CM is formed with no external terminal hole TMH unlike the cover member CM as previously shown in FIG. 16A through FIG. 16C.

Figure 23B:
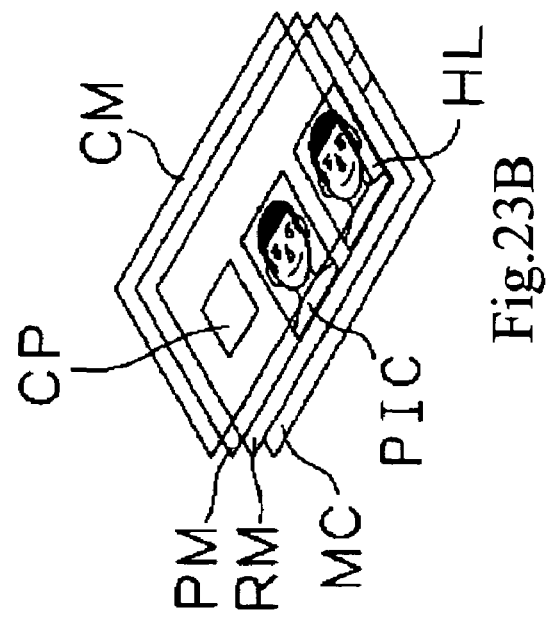
Figure 23A:
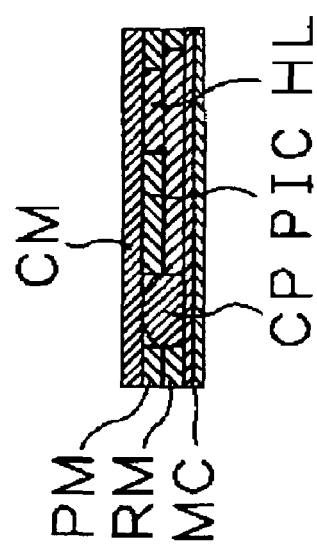

In the certification system, the third intermediate member as shown in FIG. 21A and FIG. 21B and the cover member CM are affixed together by the manufacturing unit 60 to make the certification card CC as a contactless type IC card as shown a side cross section view in FIG. 23A and a perspective view in FIG. 23B.

In the certification system, the certification card CC as a contactless type IC card can be made through the above-mentioned series of steps. At this time, in the certification system, by affixing the cover member CM together, the certification card CC can be formed in a flat plate shape with small unevenness. Accordingly, the certification card CC is easy to handle. Also, in the certification system, the print surface member PM including the two dimensional photograph PIC and the holographic stereogram HL are covered with the cover member CM, thereby making the certification card CC hard to be counterfeited and modified.

It is to be noted that, although the characters, figures and the like which are visibly drawn on the certification card CC are described to be printed on the print surface member PM herein, a part or all of these characters, figures and the like may be printed on the cover member CM similarly to the above described certification card CC as the contact type IC card. Again, as the certification card CC, the characters, figures and the like may be printed on the exposed surface of the magnetic card MC which is the base member, i.e., on a rear surface reverse to the front surface on which the cover member CM is affixed.

Also, in the certification system, the sequence of steps assembling the certification card CC is not restricted and it may be assembled by sequentially laminating from the magnetic card MC which is the base member or alternatively all components are aligned to be put together at one time.

Now, the certification card CC which is manufactured in the foregoing manner as a contact type IC card or a contactless type IC card can be used for any of the highly accurate online certification operation, the highly accurate offline certification operation, or the highly accurate online and offline certification operation since various kinds of information such as the above mentioned connection information and the like by the information recording unit 50. Among many combinations, descriptions will be made hereunder on specific examples of the highly accurate online certification operation using the certification card CC as the contactless type IC card which is made as the above second specific example, the highly accurate offline certification operation using the certification card CC as the contact type IC card which is made as the above mentioned first specific example, and the highly accurate online and offline certification operation using the certification card CC as the contact type IC card which is made as the above mentioned first specific example.

Firstly, description will be made on manufacturing steps of the certification card CC to be used for the highly accurate online certification operation using the contactless type IC card as the certification card CC. In this case, in the certification system, the certification card CC recording various kinds of information is made by way of a series of steps as shown in FIG. 24.

Figure 24:
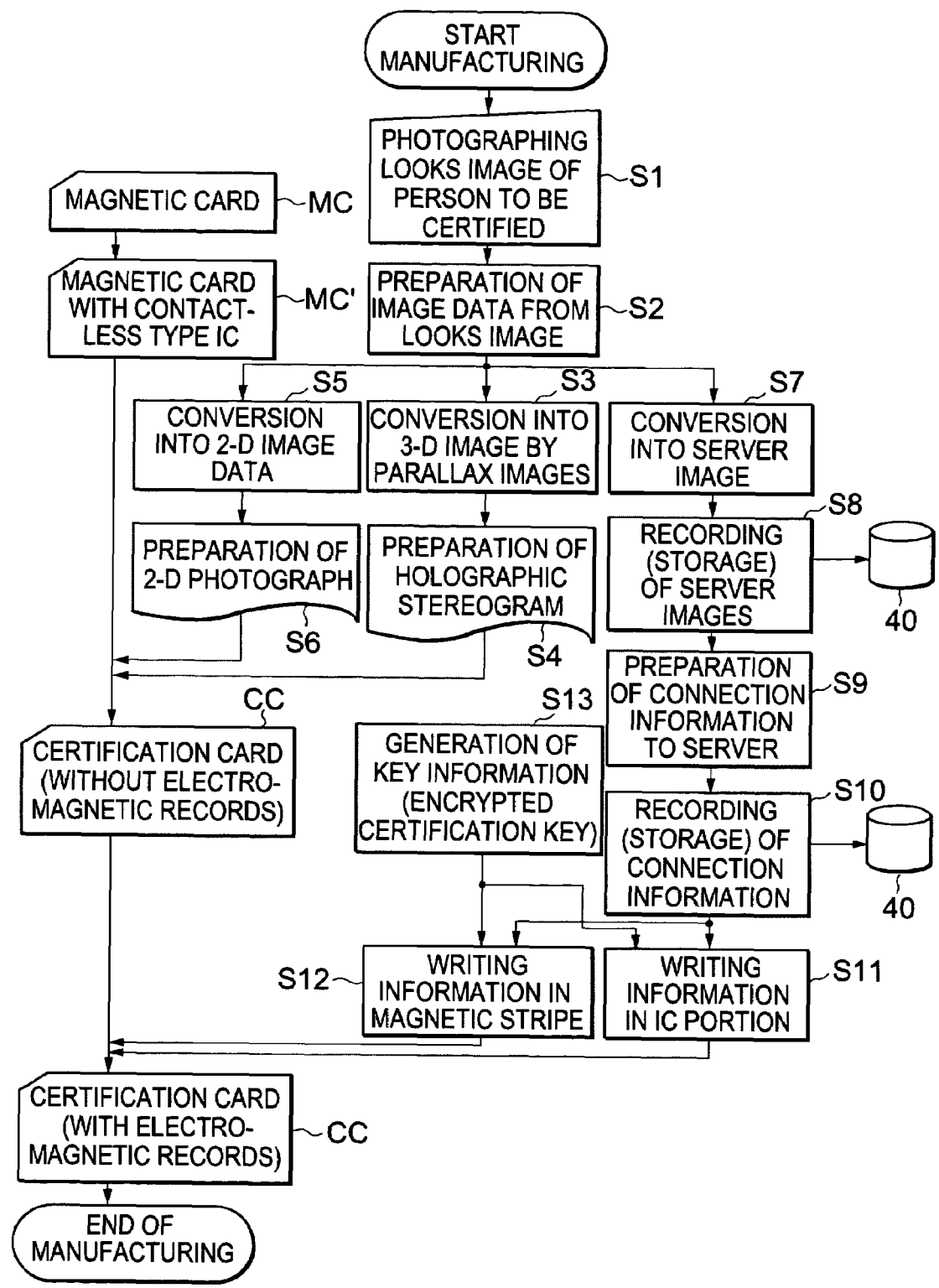
FIG. 24 is a flowchart for describing a series of steps for making the certification card having recorded therein various kinds of information used in a highly accurate online certification operation using the certification card as the contactless IC card.

That is, in the certification system, in step S1 as shown in FIG. 24, the looks image data LI is prepared by photographing by the photographing unit 10 the individual person P to be certified as an object.

Subsequently, in the certification system, in step S2, three dimensional image data comprised of object data is prepared by combining the looks image data LI and the foreground and background image data comprising the three dimensional image data by the image data processing portion 111 in the holographic stereogram manufacturing unit 20.

Then, in the certification system, in step S3, the three dimensional image data which is obtained in step S2 is converted into three dimensional data by parallax image by means of rendering by the image data processing portion 111 in the holographic stereogram manufacturing unit 20 and, in step S4, the holographic stereogram HL is prepared as a printing in accordance with the three dimensional image data.

Also, in the certification system, in step S5, the three dimensional image data is converted into two dimensional image data, for example, by rendering the three dimensional image data which is generated by the holographic stereogram manufacturing unit 20 to an image observed from the front and, in step S6, the two dimensional photograph PIC is prepared by the two dimensional photo printing unit 30 based on the two dimensional image data.

On the other hand, in the certification system, subsequent to the foregoing steps or in parallel with these steps, the magnetic card MC which is previously shown in FIG. 10A through FIG. 10C is prepared in the manufacturing unit 60 and is affixed together with the recording member RM as previously shown in FIG. 18A through FIG. 18C, thereby making a magnetic card MC' with contactless type IC as a first intermediate member as previously shown in FIG. 19A and FIG. 19B. Then, in the certification system, the certification card CC is made in the manufacturing unit 60 by affixing together the holographic stereogram HL which is prepared in step S4 and the two dimensional photograph PIC which is prepared in step S6 with the magnetic card MC' with contactless type IC. It is to be noted that the certification card CC is in a condition having no electromagnetically recorded various kinds of information such as the connection information and the like.

Moreover, in the certification system, in step S7, a designated conversion processing for enabling storage in the image server 40 is performed on the three dimensional image data which is obtained in step S2 and, in step S8, the obtained image data is recorded in the image server 40 as the server image.

Subsequently, in the certification system, in step S9, connection information for enabling connection to the image server 40 is generated and, in step S10, the obtained connection information is recorded in the image server 40. At this time, in the certification system, a certification information database, for example, as shown in FIG. 25 is prepared and held in the image server 40.

That is, as shown in FIG. 25, the certification information database comprises at least a certification ID for identifying the image data as the server image and a file name of the image data in correspondence to the certification ID and additionally personal information of the individual person to be certified such as the name, address, age, sex and the like of the person who appears in the image data.

In the certification system, by holding such certification information database in the image server 40, it is possible to conduct a search and distribution of the server image with the key of the certification ID including in the connection information which is transmitted from the client terminal 72 in the above described certification terminal device 70.

In the certification system, by recording the connection information in the image server 40 as well as establishing such certification information database, in step S11, the connection information is written by the information recording unit 50 in the above described IC portion as the recording member RM of the certification card CC. Also, in the certification system, in step S12, rather than writing the connection information in the IC portion, it may be written in the magnetic stripe as the recording member RM of the certification card CC.

Moreover, in the certification system, in step S13, key information as an encryption certification key for mutual certification between the image server 40 and the client terminal 72 is generated if necessary and, in step S11, such key information is written by the information recording unit 50 in the IC portion as the recording member RM of the certification card CC or, in step S12, the key information is written in the magnetic stripe as the recording member RM of the certification card CC.

At this time, in the certification system, in a case of enabling only a particular client terminal or a particular person (the certifying judge) to read out the image data by performing mutual certification between the image server 40 and the client terminal 72, a certification terminal database or a judge database is prepared to be held in the image server 40, for example, as shown in FIG. 26 or FIG. 27.

That is, the certification terminal database which is used for enabling only the particular client terminal to read out the image data comprises, as shown in FIG. 26, a terminal ID for certifying the client terminal 72, key information such as a public key or a secret-key as a certification key which is necessary for mutual certification, a terminal administration ID for identifying the administrator of the client terminal 72, a terminal location for showing the location of the client terminal 72 and a judge ID for certifying the certifying judge JD who is the user of the client terminal 72.

On the other hand, the judge database which is used for enabling only the particular certifying judge to read out the image data comprises, as shown in FIG. 27, at least the judge ID for certifying the certifying judge JD, a password which is required for mutual certification and a certification ID for certifying the image data as the server image and additionally personal information of the certifying judge JD such as the name, address, age, sex and the like of the certifying judge JD.

In the certification system, by holding the certification terminal database and the certifier database in the image server 40, mutual certification can be performed between the image server 40 and the client terminal 72, thereby preventing the image data from being read out by any unauthorized client terminal or certifying judge.

In the certification system, it is possible to make the certification card CC as the contactless type IC card in which various kinds of information such as the connection information are electromagnetically recorded so as to be used for a highly accurate online certification operation through such a series of steps.

Next, steps of the highly accurate online certification operation using the certification card CC as the contactless type IC card made in this way will be described. In this case, in the certification system, the online certification operation using the certification card CC is performed by way of a series of steps as shown in FIG. 28.

Figure 28:
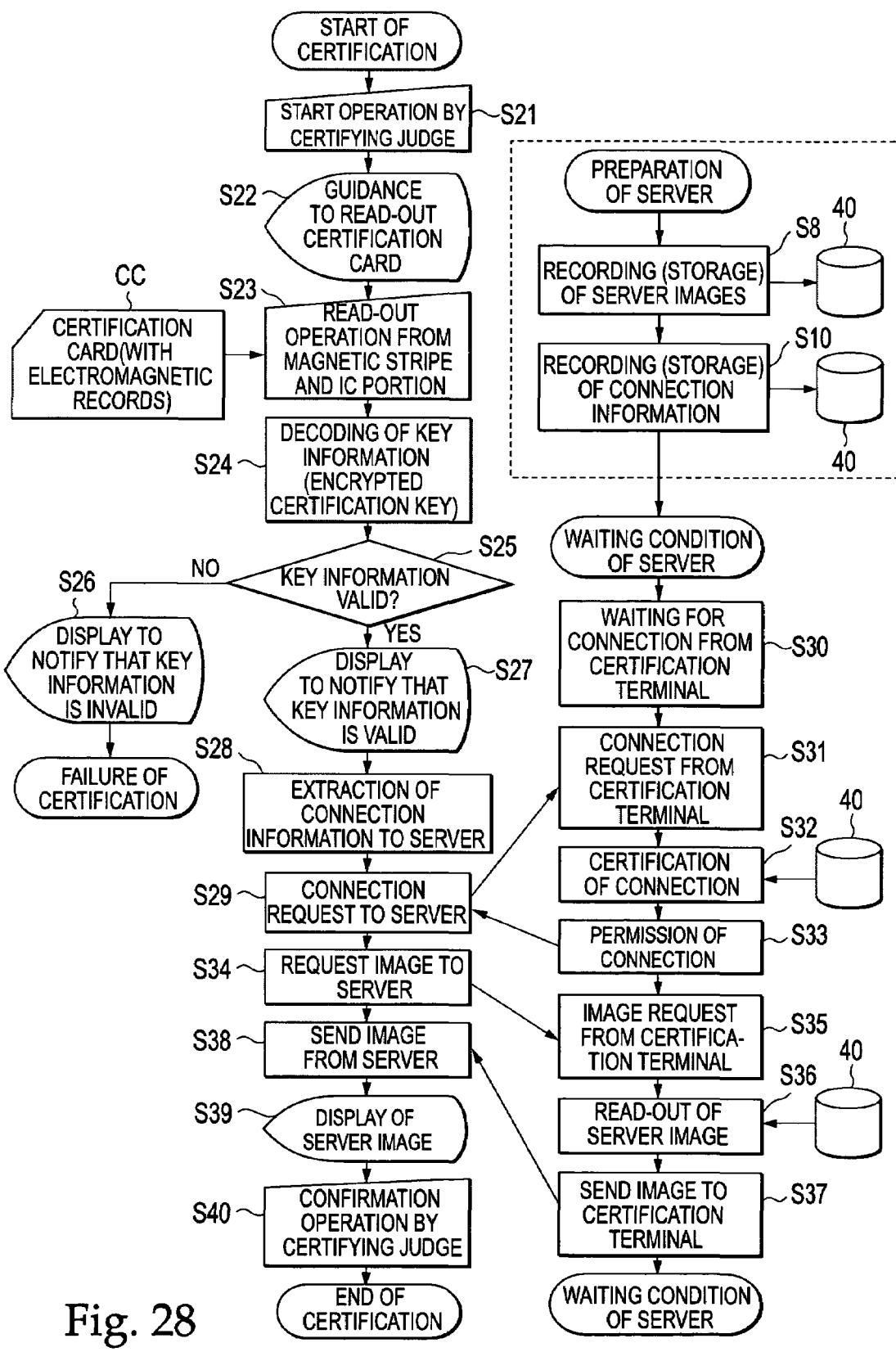
FIG. 28 is a flowchart for describing a series of steps in performing a highly accurate online certification operation using the certification card as the contactless IC card.

That is, in the certification system, in step S21 as shown in FIG. 28, designated online operations to initiate the certification operation will be carried out by the certifying judge JD.

Subsequently, in the certification system, in step S22, guidance for instructing to read out the certification card CC using the card reader 71 in the above described certification terminal device 70 is given to the certifying judge JD from the client terminal 72.

Then, in the certification system, in step S23, by inserting the certification card CC in which various kinds of information such as the connection information are electromagnetically recorded into the card reader 71 by the certifier JD, the card reader 71 reads out the information from the magnetic stripe and the IC portion.

Subsequently, in the certification system, upon reading out the encrypted key information by the card reader 71, in step S24, the key information is decoded by the client terminal 72 which is connected to the card reader 71 and, in step S25, judgment is made by the client terminal 72 if the decoded key information is valid.

Here, if it is determined that the key information is not valid, in the certification system, in step S26, a notice that the key information is invalid is displayed on the display screen of the client terminal 72, thereby completing a series of processing as a failure of certification.

On the other hand, if it is determined that the key information is valid, in the certification system, the processing goes to step S27 and displays on the display screen of the client terminal 72 a notice that the key information is valid.

And, in the certification system, in step S28, the client terminal 72 reads out the connection information for connection to the image server 40 and, in step S29, the client terminal 72 issues a connection request command including the connection information for sending to the image server 40 and requests connection to the image server 40.

On the other hand, in the certification system, as a preparation step in the image server 40, the server image is recorded in the image server 40 in step S8 as shown in FIG. 24 and, in step S10, the connection information is recorded in the image server 40, thereby making the image server 40 in a stand-by condition waiting for the connection request from the certification terminal device 70.

And, in the certification system, subsequent to steps S21 through step S29 or alternatively in parallel with these steps, in step S30, the image server 40 waits for the connection request from the certification terminal device 70 and, in step S31, the image server 40 receives the connection request command issued in step S29 by the client terminal 72.

Subsequently, in the certification system, in step S32, certification of the connection request from the client terminal 72 is performed in accordance with the above described certification terminal database and the judge database which are held in the image server 40. If a certification result determines that the client terminal 72 and the certifying judge JD are right, in step S33, connection permission is sent from the image server 40 to the client terminal 72.

In response thereto, in the certification system, an image request command including the above described certification ID is issued by the client terminal 72 and sent to the image server 40 in step S34. By sending the image request to the image server 40, in step S35, the image request command is received by the image server 40.

Subsequently, in the certification system, in step S36, the image server 40 conducts a search for and reads out the corresponding server image with the certification ID as the key and, in step S37, the image server 40 distributes the requested server image to the client terminal 72. In the certification system, upon sending the server image, the image server 40 changes again to the stand-by condition waiting for a connection request.

Subsequently, in the certification system, upon receiving by the client terminal 72 the server image which is distributed from the image server 40 in step S38, the server image is displayed on the display screen of the client terminal 72 in step S39.

Then, the certifying judge JD checks the above described (A1) through (A4) and (B1) through (B4) in step S40 in the certification system in order to confirm if the person to be certified is a right person before completing a series of certification operation.

In the certification system, the online certification operation can be performed highly accurately and easily by using the contactless type IC card as the certification card CC by way of the above described series of steps.

Now, description will be made on the manufacturing process of the certification card CC which is used for a highly accurate offline certification operation using a contact type IC card as the certification card CC. In this case, in the certification system, the certification card CC in which various kinds of information are recorded is made by way of a series of steps as shown in FIG. 29.

Figure 29:
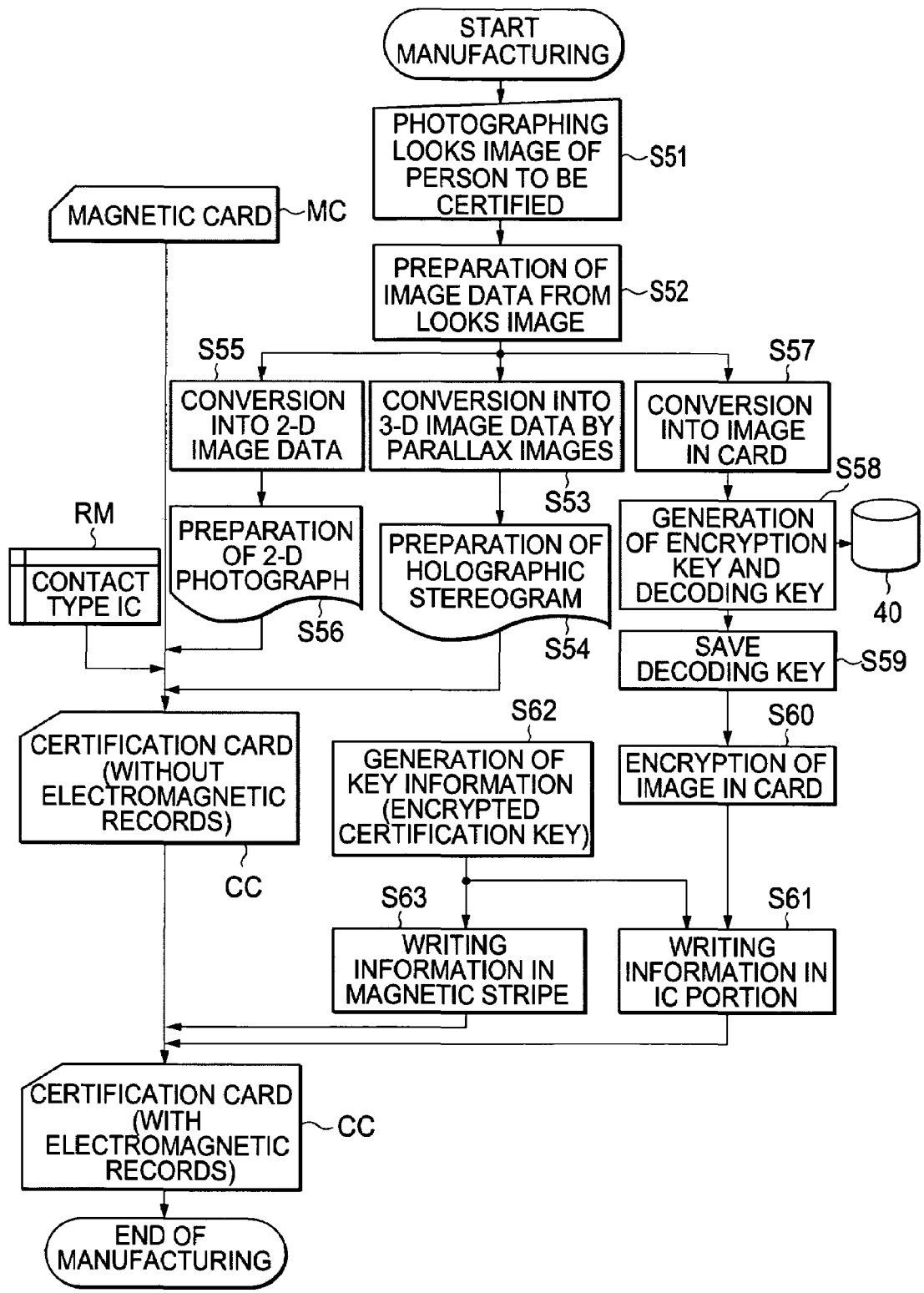
FIG. 29 is a flowchart for describing a series of steps in making the certification card having recorded therein various kinds of information used in a highly accurate offline certification operation using the certification card as the contactless IC card.

That is, as shown in FIG. 29, in the certification system, the looks image data LI is prepared by the photographing unit 10 which takes a photograph of an individual person P to be certified as an object, in step S51.

Subsequently, in the certification system, in step S52, the image data processing portion 111 in the holographic stereogram manufacturing unit 20 combines the looks image data LI with an image data as the foreground and the background which comprises three dimensional image data in order to obtain three dimensional image data comprising object data.

Subsequently, in the certification system, in step S53, the three dimensional image data which is obtained in step S52 is subject to rendering by the image data processing portion 111 in the holographic stereogram manufacturing unit 20 to convert into three dimensional data by parallax images and, in step S54, the holographic stereogram HL as a printing is prepared in accordance with the three dimensional image data.

Also, in the certification system, in step S55, the three dimensional image data which is generated by, for example, the holographic stereogram manufacturing unit 20 is converted into two dimensional image data which is observed from the front by rendering and, in step S56, the two dimensional photograph PIC is prepared by the two dimensional photo-printing unit 30 in accordance with the two dimensional image data.

On the other hand, in the certification system, subsequent to these steps or in parallel with these steps, the magnetic card MC which is previously shown in FIG. 10A through FIG. 10C is prepared by the manufacturing unit 60 and the certification card CC is made by affixing the magnetic card MC together with the recording member RM which is previously shown in FIG. 14A through FIG. 14C. It is to be noted that the certification card CC is in a condition that no various kinds of information such as connection information and the like are electromagnetically recorded.

Moreover, in the certification system, in step S57, a designated conversion processing in parameters such as, for example, size, number of colors and number of pixels of the image data is performed on the three dimensional image data which is obtained in step S52 in order to convert it into any suitable data as an image in card to be recorded in the IC portion which is the recording member RM and then, in step S58, an encryption key and a decoding key for encrypting and decoding the image in card are generated and recorded in the image server 40.

Subsequently, in the certification system, in step S59, the decoding key is kept in designated storage means, for example, the image server 40 and, in step S60, the image data is encrypted as the image in card by using the encryption key.

Then, in the certification system, in step S61, the encrypted image data is written in the above described IC portion as the recording member RM of the certification card CC by the information recording unit 50.

Moreover, in the certification system, in step S62, the key information as the encrypted certification key is generated, if necessary, for certification of the certification card CC by the client terminal 72 and, in step S61, the key information is written in the information recording unit 50 in the IC portion as the recording member RM of the certification card CC or, in step S63, the key information is written in the magnetic stripe as the recording member RM of the certification card CC.

In the certification system, the contact type IC card as the certification card CC in which various kinds of information such as the connection information which is used for highly accurate offline certification operation are electromagnetically recorded is made by way of the series of steps as described above.

It is to be noted that, in the certification system, the image data which is recorded in the recording member RM as the image-in-card is not necessarily encrypted.

Next, a description will be made on the highly accurate offline certification procedure using the contact type IC card as the certification card CC which is made by way of the above described steps. In this case, in the certification system, the offline certification operation using the certification card CC is performed by a series of steps as shown in FIG. 30.

Figure 30:
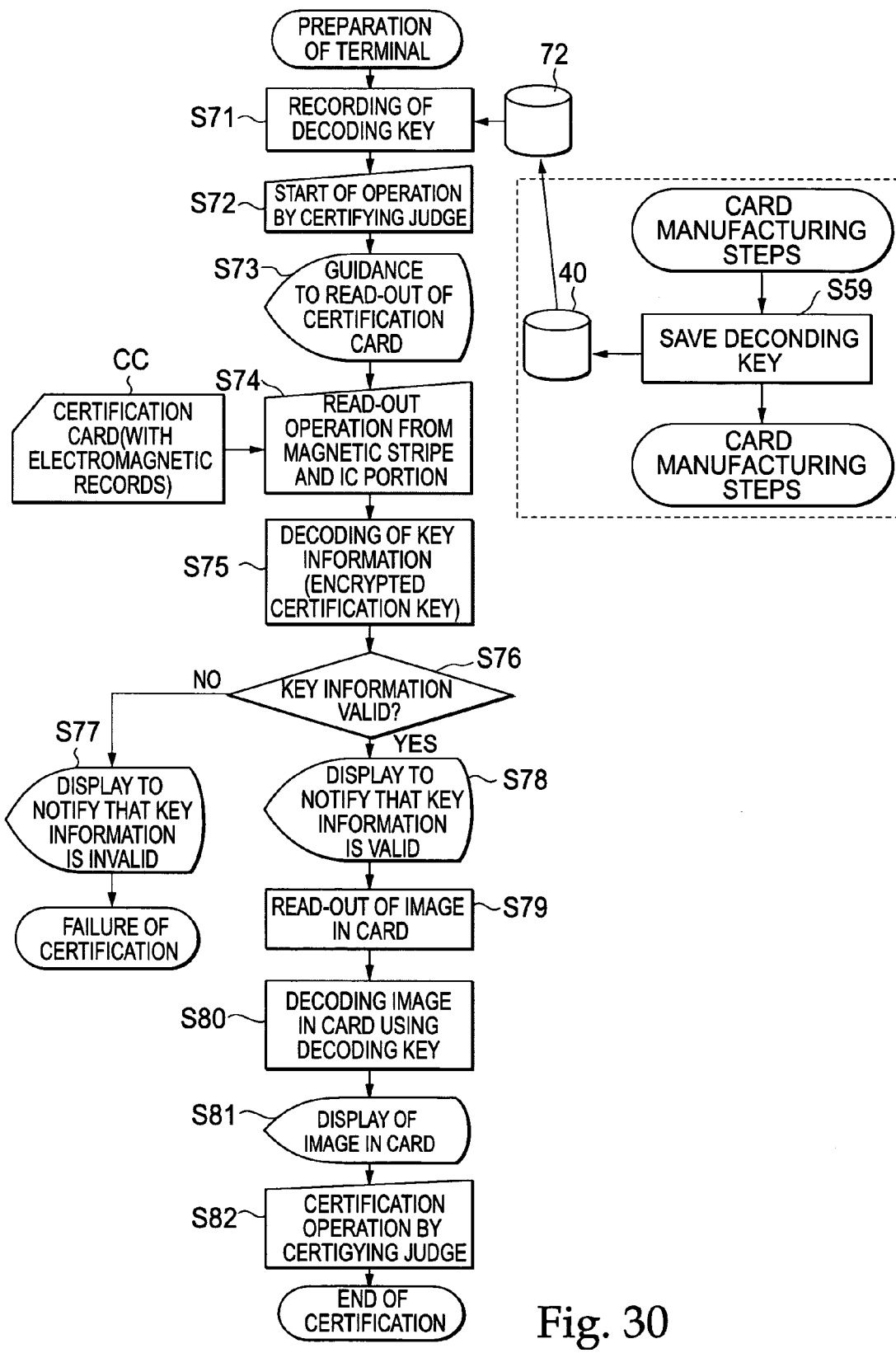
FIG. 30 is a flowchart for describing a series of steps in performing a highly accurate offline certification operation using the certification card as the contact type IC card.

That is, in the certification system as shown in FIG. 30, in step S71, the certification operation is initiated by reading out the decoding key as kept in step S58 in FIG. 29 and recording the decoding key in the designated memory means in the client terminal 72.

In the certification system, in step S72, a designated operation for initiating the online certification operation is performed by the certifying judge JD and, in step S73, guidance for instructing to read out the certification card CC using the card reader in the certification terminal device 70 is given to the certifying judge JD from the client terminal 72.

Subsequently, in the certification system, in step S74, upon insertion of the certification card CC in which various kinds of information such as the image-in-card and the like are electromagnetically recorded into the card reader 71 by the certifying judge JD, the information is read out of the magnetic stripe and the IC portion by the card reader 71.

Subsequently, in the certification system, upon reading out the encrypted key information by the card reader 71, in step S75, the key information is decoded by the client terminal 72 which is connected to the card reader 71 and, in step S76, judgment is made by the client terminal 72 if the decoded key information is valid.

At this time, if the key information is determined to be not valid in the certification system, in step S77, a notice that the key information is invalid is displayed on the display screen of the client terminal 72, thereby completing a series of steps as a failure of certification.

On the other hand, if the key information is determined to be valid in the certification system, the processing goes to step S78 and a notice that the key information is valid is displayed on the display screen of the client terminal 72.

Then, in the certification system, in step S79, the image in card is read out by the client terminal 72 and, in step S80, the image in card is decoded by the client terminal 72 using the decoding key and, in step S81, the decoded image in card is displayed on the display screen of the client terminal 72.

And in the certification system, in step S82, the certifying judge JD checks the above mentioned (A1) through (A4), (C1) through (C4) and (B4) in order to confirm if the individual person to be certified is the right person before completing a series of certification steps.

In the certification system, a highly accurate and easy offline certification operation can be performed using the contact type IC card as the confirmation card CC by way of the above described series of steps.

Next, description will be made on manufacturing steps of the certification card CC which is used for the highly accurate and easy online and offline confirmation operation using a contact type IC as the certification card CC. In this case, in the certification system, the certification card CC in which various kinds of information are recorded is made by way of a series of steps as shown in FIG. 31.

Figure 31:
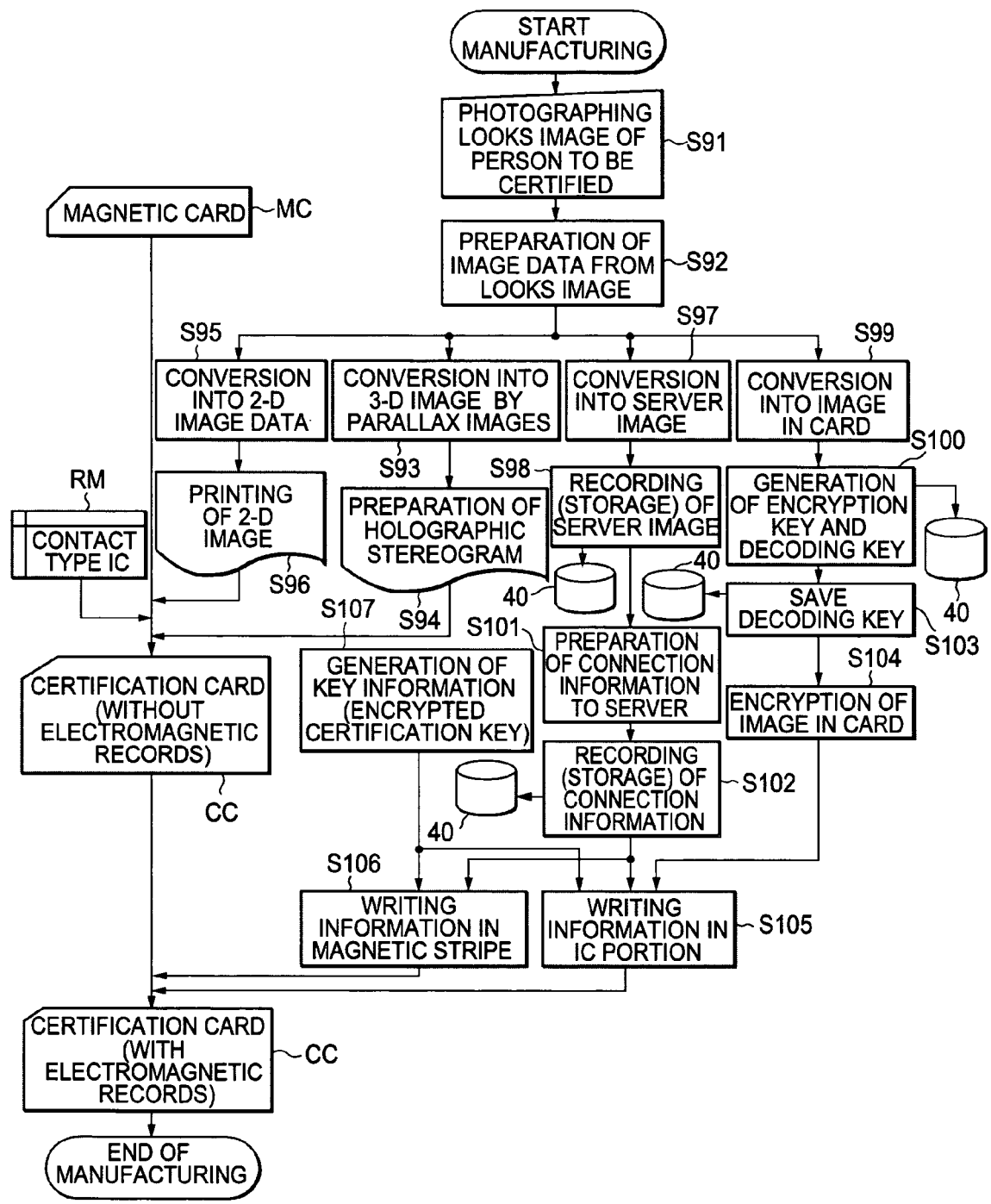
FIG. 31 is a flowchart for describing a series of manufacturing steps in making a certification card having recorded therein various kinds of information used in a highly accurate both online and offline certification operation using the certification card as the contact type IC card.

That is, as shown in FIG. 31, in the certification system, the looks image data LI is prepared in step S91 by taking a photograph of the individual person P to be certified as an object by the photographing unit 10.

Subsequently, in the certification system, in step S92, three dimensional image data comprising object data is prepared by combining the looks image data LI with image data as the foreground and the background comprising three dimensional image data by the image data processing portion 111 in the holographic stereogram manufacturing unit 20.

Subsequently, in the certification system, in step S93, the three dimensional image data which is obtained in step S92 is converted into three dimensional image data by parallax images by rendering by the image data processing portion 111 in the holographic stereogram manufacturing unit 20 and, in step S94, the holographic stereogram HL is made as a printing in accordance with the three dimensional image data.

Also, in the certification system, in step S95, rendering is performed in order to convert the three dimensional image data which is prepared by the holographic stereogram manufacturing unit 20 into two dimensional image data which is observed, for example, from the front and, in step S96, a two dimensional photograph PIC is prepared by the two dimensional photo-printing unit 30 in accordance with the two dimensional image data.

On the other hand, in the certification system, subsequent to these steps or in parallel with these steps, the magnetic card MC which-is previously shown in FIG. 10A through FIG. 10C is prepared by the manufacturing unit 60 and the certification card CC is made by affixing the magnetic card MC together with the recording member RM which is shown in FIG. 14A through FIG. 14C. It is to be noted that the certification card CC is in a condition that various kinds of information are not recorded.

Moreover, in the certification system, in step S97, a designated conversion processing for storage in the image server 40 is performed on the three dimensional image data which is obtained in step S92 and, in step S98, the obtained image data is recorded in the image server 40 as the server image.

Furthermore, in the certification system, in step S99, a designated conversion processing on the three dimensional image data in parameters such as, for example, size, number of colors and number of pixels of the image data is performed to make it suitable for recording as the image-in-card in the IC portion as the recording member RM and then, in step S100, an encryption key and a decoding key for encryption and decoding of the image-in-card are generated and recorded in the image server 40.

Subsequently, in the certification system, in step S101, the connection information for connection to the image server 40 is generated and, in step S102, the obtained connection information is recorded in the image server 40.

Also, in the certification system, in step S103, the decoding key which is generated in step S100 is stored in a designated storage means such as, for example, the image server 40 and, in step S104, the image data is encrypted as the image in card by using the encryption key.

Then, in the certification system, upon recording the connection information in the server 40, in step S105, the connection information is written in the above described IC portion as the recording member RM of the certification card CC in the information recording unit 50 and also writes the encrypted image data in the above described IC portion as the recording member RM of the certification card CC. Also, in the certification system, in step S106, the connection information may be written in the magnetic stripe as the recording member RM of the certification card CC rather than in the IC portion.

Moreover, in the certification system, key information as an encryption certification key for mutual certification between the image server 40 and the client terminal 72 or for certification of the certification card CC by the client terminal 72 is generated if necessary and, in step S105, the key information is written in the IC portion as the recording member RM of the certification card CC by the information recording unit 50 or, in step S106, the key information is written in the magnetic stripe as the recording member RM of the certification card CC.

In the certification system, by following the foregoing series of steps, the contact type IC card as the certification card CC for electromagnetically recording various kinds of information such as the connection information and the like can be made and used for the highly accurate online and offline certification operation.

It is to be noted that, in the certification system, the image data which is recorded in the recording member RM as the image-in-card is not necessarily encrypted.

Next, the highly accurate online and offline certification procedure using the contact type IC card which is made as the certification card CC through the foregoing steps will be described. In this case, in the certification system, the online and offline certification operation using the certification card CC is performed by following a series of steps as shown in FIG. 32 and FIG. 33.

Figure 32:
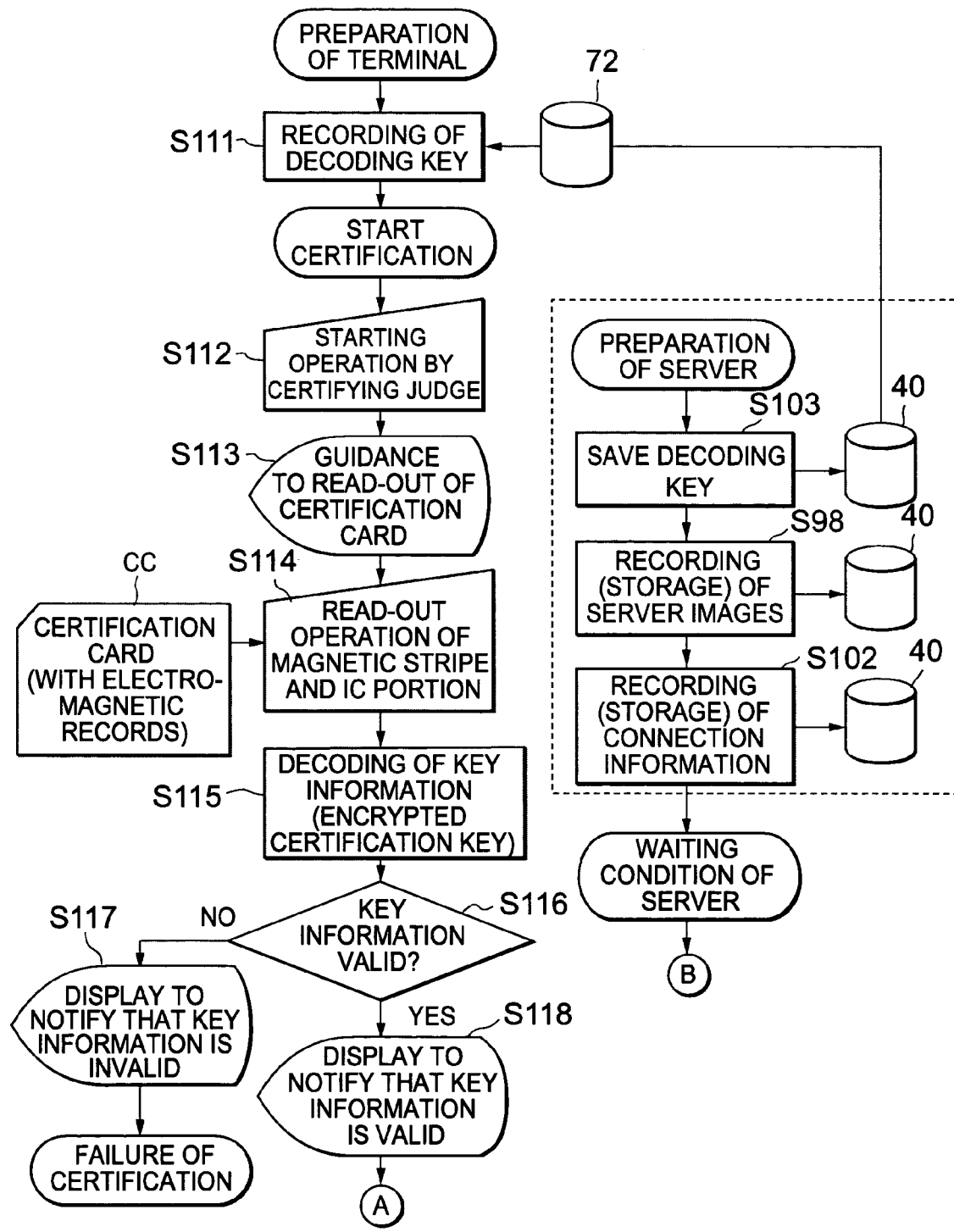
FIG. 32 is a flowchart for describing a series of steps for performing the highly accurate both online and offline certification operation using the certification card as the contact type IC card.
Figure 33:
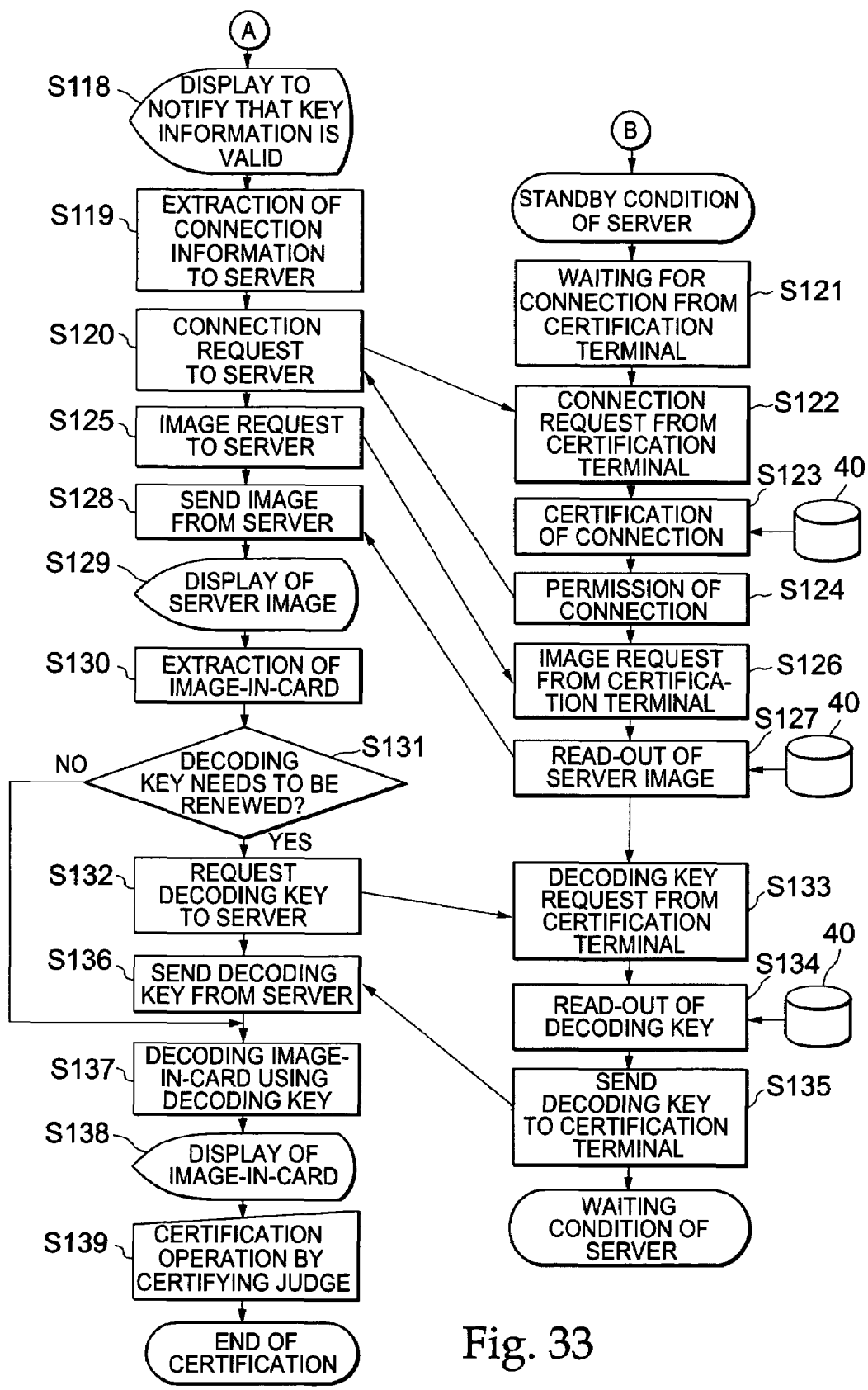
FIG. 33 is a flowchart for describing a series of steps subsequent to the steps in FIG. 32 for performing a highly accurate both online and offline certification operation using the certification card as the contact type IC card.

That is, in the certification system, as shown in FIG. 32, in step S111, the certification operation is initiated by reading out the decoding key which is held in step S103 in FIG. 31 and by recording the decoding key in designated memory means in the client terminal 72.

In the certification system, in step S112, a designated operation for initiating the online certification operation is performed by the certifying judge JD and, in step S113, guidance for instructing to read the certification card CC using the card reader 71 in the certification terminal device 70 is given to the certifying judge JD from the client terminal 72.

Subsequently, in the certification system, in step S114, the certification card CC in which various kinds of information such as the information in card and the like are electromagnetically recorded is inserted into the card reader 71 by the certifying judge JD in response to the guidance and the information is read out of the magnetic stripe and the IC portion by the card reader 71.

Then, in the certification system, upon reading the encrypted key information by the card reader 71, in step S115, the key information is decoded by the client terminal 72 which is connected to the card reader 71 and, in step S116, judgment is made by the client terminal 72 if the decoded key information is valid.

At this point, in the certification system, if the key information is determined to be not valid, in step S117, a notice that the key information is invalid is displayed on the display screen of the client terminal 72, thereby completing the series of operation as a failure of certification.

On the other hand, if it is determined that the key information is valid in the certification system, the processing goes to step S118 and displays on the display screen of the client terminal 72 that the key information is valid.

On the other hand, in the certification system, the server images are recorded in the image server 40 in advance in step S98 in FIG. 31 and, in step S102, the connection information is recorded in the image server 40 as preparation steps of the image server 40, thereby making the image server 40 in the stand-by condition waiting for the connection request from the certification terminal device 70.

And, in the certification system, the connection information for connection to the image server 40 is read out by the client terminal 72 in step S119 as shown in FIG. 33 and the connection request command including the connection information is issued and sent to the image server 40 by the client terminal 72 in step S120, thereby requesting connection to the image server 40.

In the certification system, subsequent to the foregoing steps S111 through S120 or in parallel with these steps, in step S121, the image server 40 receives the connection request from the certification terminal device 70 and, in step S122, receives the connection request command issued by the client terminal 72 in step S120.

Subsequently, in the certification system, in step S123, certification is performed in response to the certification request from the client terminal 72 in accordance with the above described certification terminal database and the judge database which are held in the image server 40. As a result of the certification, if it is determined that the client terminal 72 and the certifying judge JD are right, in step 124, a message to permit connection is sent from the image server 40 to the client terminal 72.

In response thereto, in the certification system, the client terminal 72 issues, in step S125, as an image request command including the above described certification ID and sends the request for an image to the image server 40 and, in step S126, the image request command is received by the image server 40.

Subsequently, in the certification system, in step S127, the certification ID is used as a key to conduct a search for and reads out the corresponding server image by the image server 40. And the requested server image is sent out to the client terminal 72 from the image server 40.

Subsequently, in the certification system, when the server image which is sent out of the image server 40 is received by the client terminal 72 in step S128, the server image is displayed on the display screen of the client terminal 72 in step S129.

Subsequently, in the certification system, in step S130, the image-in-card is read out by the client terminal 72 and, in step S131, judgment is made by the client terminal 72 if the decoding key should be renewed.

At this point, if it is determined that no renewal of the decoding key is necessary in the certification system, the processing goes to in step S137. On the other hand, if it is determined that the decoding key must be renewed in the certification system, in step S132, the client terminal 72 issues the decoding key request command which is sent to the image server 40 for requesting the decoding key and, in step S133, the decoding key request command is received by the image server 40.

Then, in the certification system, in step S134, the certification ID is used as a key to conduct a search for and read out the corresponding decoding key by the image server 40 and, in step S135, the requested decoding key is sent to the client terminal 72 from the image server 40. In the certified system, upon sending the decoding key, the image server 40 returns again to the stand-by condition waiting for the connection request.

Subsequently, in the certification system, upon receiving the decoding key which is sent from the image server 40 in step S136, the decoding key is used by the client terminal 72 in step S137 for decoding the image in card and, in step S138, the image in card is displayed on the display screen of the client terminal 72.

Then, in the certification system, in step S139, the certifying judger JD performs the certification operation to determine if the individual person to be identified is the right person by checking the above described (A1) through (A4), (B1) through (B4) and (C1) through (C3) before completing a series of certification operation.

In the certification system, the highly accurate and easy online and offline certification operation can be made using the certification card CC as the contact type IC card by way of the foregoing series of steps.

Now, various concrete examples have been described hereinabove and, in the highly accurate online certification operation, as described above, communication is performed between the image server 40 and the client terminal 72 in order to send and receive the server images and the key information as well as performing certification of the connection itself. Accordingly, description will be made hereunder on the communication techniques.

In the certification system, it is possible to adopt, for example, a public communication network which constitutes an audio telephone line as communication means between the image server 40 and the client terminal 72. In this case, in the certification system, it is possible to use a modem such as V.90 which is standardized by ITU-T (International Telecommunication Union Telecommunication) for data communication and communication protocol may be non-procedure, so-called Kermit for image file transfer, XMODEM or ZMODEM which is binary transfer protocol used in modem communication, B-Plus which is a high speed transfer protocol similar to ZMODEM, so-called Quick-VAN or the like. Also, in the certification system, it is possible to use PPP (Point-to-Point Protocol) and also FTP (File Transfer Protocol) and HTTP (HyperText Transfer Protocol) on TCP/IP (Transmission Control Protocol/Internet Protocol) as will be described hereinafter.

Now, a specific example to use the public network which constitutes an audio communication line will be described. At this point, non-procedure is used as the communication protocol and Kermit protocol is used for image file transfer.

In certification system, firstly, a telephone number which is recorded in the client terminal 72 or the certification card CC as the connection information is read out by the client terminal 72 and calls up the image server 40. Then, in the certification system, when connection procedure for data communication by the modem is completed after confirming the call by the image server 40, the image server 40 requests the client terminal 72 for the above described certification ID and the password. In response thereto, in the certification system, the client terminal 72 reads out the certification ID and the password which are recorded in the client terminal 72 or the certification card CC and sends to the image server 40 for performing certification of the connection.

Subsequently, in the certification system, any information relating to the server image is extracted by the client terminal 72 from the certification card CC to be certified and judgment is made if the server image corresponding to the certification card CC is stored in the image server 40. If it is determined that the corresponding server image is stored in the image server 40, in the certification system, the image server 40 and the client terminal 72 go respectively to a transmission condition and a reception condition in Kermit protocol so that the server image is transferred from the image server 40 to the client terminal 72. In the certification system, transfer of the server image terminates at the time when the server image is completed and the client terminal 72 is in a condition that the server image can be displayed on the display screen. Also, in the certification system, it is also possible to send the key information from the image server 40 to the client terminal 72 at the time before or after sending the server image if necessary. In the certification system, upon termination of sending various kinds of information required by the client terminal 72, the line to which connection was established by the client terminal 72 or the image server 40 was disconnected in order to terminate communication between the image server 40 and the client terminal 72.

In the certification system, by following the foregoing procedure, it is possible to conduct communication between the image server 40 and the client terminal 72.

Also, in the certification system, as communication means between the image server 40 and the client terminal 72, it is possible to adopt internet or intranet using various communication techniques such as, for example, Ethernet (trademark) which is specified by IEEE (Institute of Electrical and Electronic Engineers) 802.3 or 802.3u, a designated exclusive line, XDSL such as ADSL (Asymmetric Digital Subscriber Line) and the like which is standardized by ITU-T G.992, or wireless LAN (Local Area Network) such as IEEE802.11 or Bluetooth (trademark). Furthermore, in the certification system, as communication protocol on these various communication lines, it is possible to use FTP, HTTP or the like on TCP/IP.

Now, one specific example of the use of the Internet will be described hereunder. Herein, an HTTP protocol and an HTTPS (Hypertext Transfer Protocol Security) protocol on TCP/IP are used as the communication protocol.

In the certification system, URI (Uniform Resource Identifiers) or URL as the connection information which is recorded by the client terminal 72 in the client terminal 72 or the certification card CC is read out and connected to the image server 40 by so-called GET method. And, in the certification system, a redirecting function is used by the image server 40 to lead to a new URI or URL using the HTTPS protocol so that contents in the communication are not intercepted by any third party on the Internet. Together with the foregoing, in the certification system, a certification function is used by the image server 40 to request the certification ID and the password to the client terminal 72. In response thereto, in the certification system, the client terminal 72 reads out the certification ID and the password which are recorded in the client terminal 72 or the certification card CC and sent to the image server 40 for certification of connection by the image server 40.

Subsequently, in the certification system, information relating to the server image such as URI, URL of the server image are extracted from the certification card CC to be certified by the client terminal 72 and the server image corresponding to the certification card CC is requested to the image server 40 by the GET method or the POST method. At this point, in the certification system, if the corresponding server image is stored in the image server 40, the corresponding server image may be sent from the image server 40 to the client terminal 72. In the certification system, at the completion of sending the server image, the server image is ready to be displayed on the display screen of the client terminal 72. Also, in the certification system, at the stage of before or after sending the server image, the key information is sent from the image server 40 to the client terminal 72 if necessary. In the certification system, upon completion of sending various kinds of information required by the client terminal 72, the line to which the connection has been established is disconnected by the client terminal 72 or the image server 40, thereby terminating communication between the image server 40 and the client terminal 72.

In the certification system, it is possible to perform communication between the image server 40 and the client terminal 72 in accordance with the foregoing procedure.

Moreover, in the certification system, it is possible to apply, for example, a packet exchange system or the circuit switching system utilizing various wireless telephones such as so-called i-mode (trademark), J-SKY (trademark), ezweb (trademark), H" (edge: trademark) or dot i (trademark) as communication means between the image server 40 and the client terminal 72. Furthermore, in the certification system, it is possible to use WAP (Wireless Application Protocol) 1.x, WAP 2.0 which are protocol for mobile terminals, H" LINK protocol or the like as the communication protocol on various communication networks.

In the certification system, if WAP 2.0 is used for the communication protocol as a specific example of those various wireless telephones, substantially same processing as the case when the above described HTTP protocol on TCP/IP is used can be performed in the communication protocol level.

As described hereinabove, in the certification system, in a case of performing a highly accurate online certification operation, it is possible to perform communication between the image server 40 and the client terminal 72 by adopting various communication means.

As described hereinabove, the certification system shown as the embodiments according to the present invention use the looks image data LI of the individual person P as visible information for directly distinguishing the individual person P to be certified and the certification card CC is made by integrating at least the printing of the looks image data LI as the two dimensional photograph PIC and the printing of what is made as the holographic stereogram HL in accordance with the looks image data LI, thereby enabling to accurately and easily identifying individual person P by performing certification if the person is the right person by means of the certification card CC which is hard to be counterfeited. Additionally, it is able to satisfy various requirements such as low cost, eliminating the need for an exclusive device and the like for certification if is a simple certification, capability of performing certification at any location, minimizing complicated steps in certification operation and minimizing oppressive feeling to the individual person P to be certified.

That is, the certifying judge JD who is a user of the certification system is able to perform a highly accurate and easy certification operation by means of the certification card CC while satisfying various requirements. Also, the individual person P to be certified who is a user of the certification system is able to perform a highly accurate and easy certification operation by means of the certification card CC while satisfying various requirements. If the person is proved to be the right person as a result of the certification operation, the person is able to enjoy designated services or to follow designated procedure by way of the certifying judge r JD.

It is to be noted that the present invention should not be restricted to the above described embodiments and that, for example, a hologram may be replaced for the holographic stereogram HL as the object to be integrated into the certification card CC. That is, although it is described hereinabove that the holographic stereogram HL which is made by the holographic stereogram manufacturing unit 20 is integrated into the certification card CC in the above described embodiments, it is also possible in the present invention that a manufactured holograph is integrated into the certification card CC.

Also, although it is described that the two dimensional photograph PIC and the holographic stereogram HL are made in accordance with the looks image data LI of the individual person to be certified in the above described embodiments, the present invention should not be restricted to the looks image but may be any other visible information such as a signature or a registered seal which can directly distinguish an individual person.

Moreover, although it is explained in the above described embodiments that the certifying judge JD compares and judges the server image and the image-in-card, the present invention may be constructed to compare and judge the face images and the like by using a designated device. For example, in a case of applying the certification system to permit entrance into or leaving out of a regulated area after performing certification of an individual person, it is possible to open and close control of an entrance/exit gate by installing a designated image certification device which performs comparison and judgment of the face image and the like by the use of an existing various image recognition technologies instead of the certifying judge JD.

Furthermore, although it is described in the above described embodiments, as previously shown in FIG. 9, a digital still camera is used as the photographing unit 10 and the looks image data LI is manufactured by taking a photograph of the two dimensional image data of the individual person P to be certified, it is possible to use other photographing means in the present invention. Three specific examples will be described hereunder.

Figure 34:
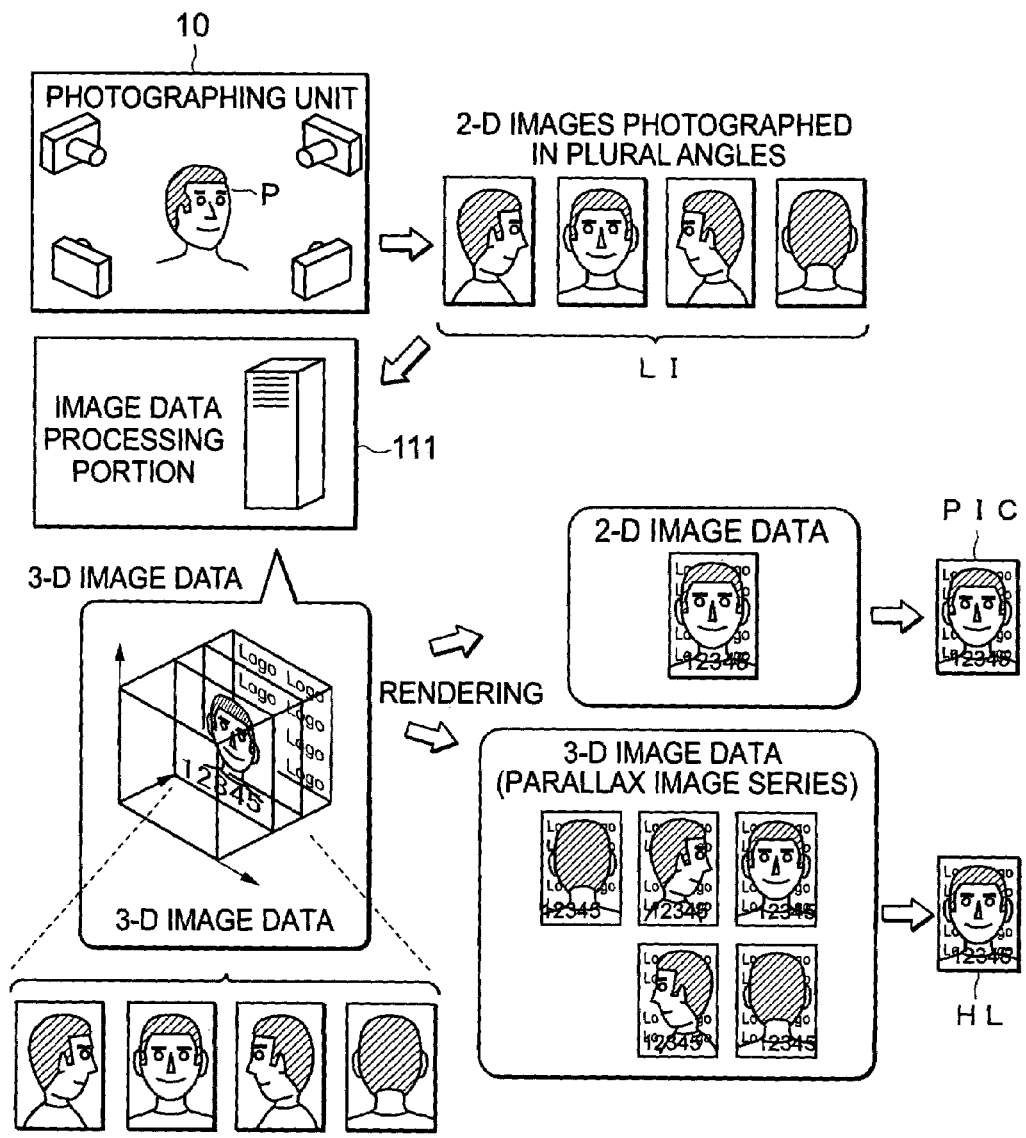
FIG. 34 is an illustration for describing production of looks image data as a plurality pieces of two dimensional image data by taking pictures for a certification target person in plural angles.

Firstly, as shown in FIG. 34, a first specific example takes photographs of the individual person P to be certified by a digital still camera or the like at plural angles such as 3 angles, 4 angles, 8 angles or the like, for example, front direction, left and right side directions and back direction, thereby preparing the looks image data LI as a plurality pieces of two dimensional image data.

In this case, in the certification system, at the time of preparing the holographic stereogram HL to be integrated into the certification card CC, the three dimensional image data may be generated by converting the looks image data LI comprising a plurality pieces of two dimensional image data by the image data processing portion 111 in the holographic stereogram manufacturing unit 20 so that images seen from different angles such as back, right side, front, left side and again back are sequentially displayed as reproduced images regardless of parallax angle in a case of observation of the holographic stereogram HL. And then, in the certification system, rendering is performed on the three dimensional image data in order to convert into a series of parallax images. At this time, in order to sequentially display the images seen from different angles as the reproduced images, for example, in so-called animation rendering, images seen from different angles are sequentially switched in time series, thereby generating appropriate series of parallax images.

Figure 35:
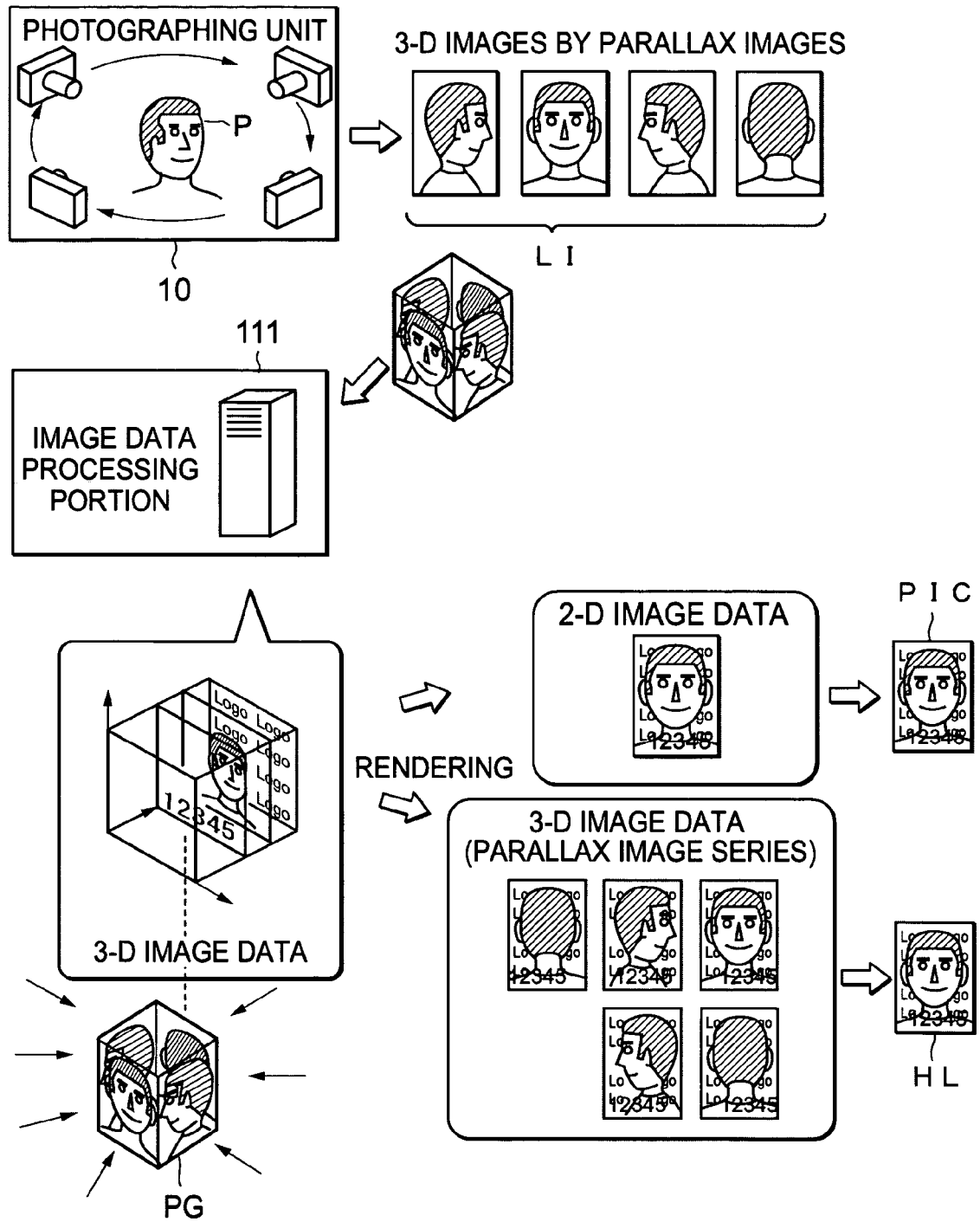
FIG. 35 is an illustration for describing how the looks image data are made as three dimensional image data by parallax images by taking a photograph of the certification target person in the range of 360 degrees about the person.

On the other hand, in a second specific example as shown in FIG. 35, the individual person P to be certified is photographed in a range of 360° about the person, thereby generating the looks image data LI as the three dimensional image data by the parallax images.

Here, techniques for taking photographs of the individual person P in the range of 360° about the person include a continuous photographing by a fixed camera while an object or the individual person P to be certified is rotating, a continuous photographing by a camera which revolves about a fixed object or the individual person P to be identified, a continuous photographing of an object or the individual person P to be certified while both camera and the person are revolving, or a simultaneous photographing of an object or the individual person P to be certified by disposing sufficient number of cameras necessary to prepare the three dimensional image data by parallax images about the individual person P to be certified.

In this case, in the certification system, at the time of preparing the holographic stereogram HL to be integrated into the certification card CC, the three dimensional image data by parallax images is converted into three dimensional data by the image data processing portion 111 in the holographic stereogram manufacturing unit 20. Such techniques include a technique for generating a polygon data PG by converting the shape of object into polygon data by means of correspondence of characteristic points of the object by using the parallax images which are obtained by photographing, a technique for generating interpolated parallax images in which interpolated images are generated by using so-called morphing technique or the like by means of correspondence of characteristic points between images by using parallax images obtained by photographing, or a technique for generating interpolated parallax images in accordance with the polygon data PG which is generated by converting the shape of object into polygon data by means of correspondence of characteristic points of the object using parallax images obtained by photographing.

Figure 36:
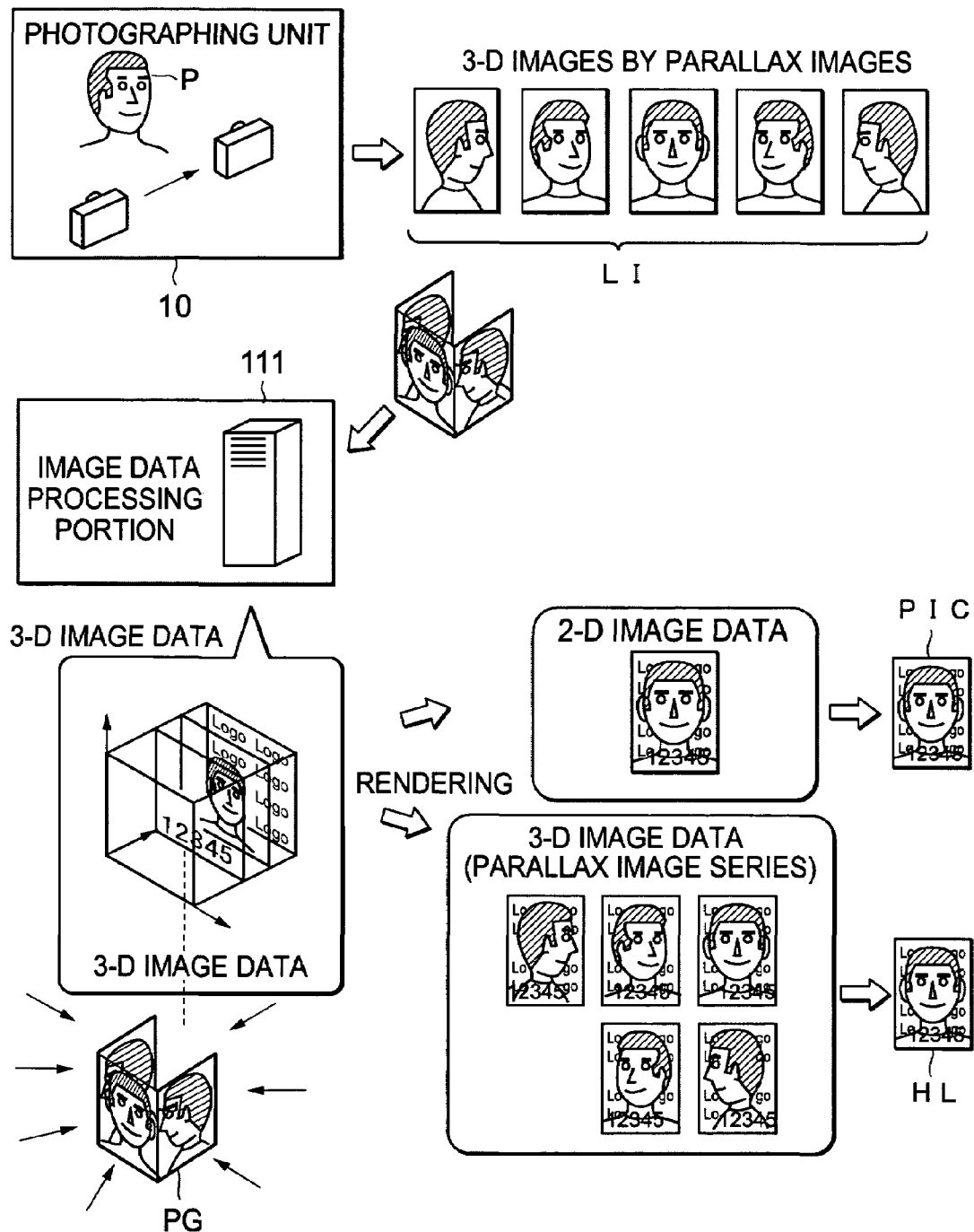
FIG. 36 is an illustration for describing how looks image data are made as three dimensional image data by parallax images by taking a photograph of the certification target person by moving a camera in a straight line or an arc.

Finally, in a third specific example as shown in FIG. 36, the looks image data LI as the three dimensional image data by parallax images is generated by photographing the individual person P to be certified while moving a camera in a linear or arc manner if necessary.

This is according to a fact that photographing of an object in all angles is not required because the holographic stereogram HL which is integrated into the certification card CC is generally flat. That is, in the holographic stereogram HL, when observed from different angles, it is rather unnatural that not only the front and right and left side images but also the back image are displayed as the reproduced images and it is preferable that correct three dimensional information is reproduced by reproducing appropriate parallax images depending on the observation angles. In the holographic stereogram HL, the photographing directions for the parallax images to be reproduced are obviously restricted in order to reproduce correct three dimensional information.

Accordingly, in the certification system, the individual person P to be certified is photographed to cover a necessary range, for example, front and right and left sides rather than in the range of 360° for generating the looks image data LI as the three dimensional image data by parallax images. In this case, at the time of making the holographic stereogram HL to be integrated into the certification card CC in the certification system, the three dimensional image data by parallax images is converted into the three dimensional data by the image data processing portion 111 in the holographic stereogram manufacturing unit 20. Techniques for this purpose may include, as described above, a technique for generating polygon data PG by interrelating characteristic points of an object using parallax images which are obtained by photographing and converting the shape of object into polygon data, a technique for generating interpolated parallax images by generating an interpolated image by means of so-called morphing technique or the like for interrelating characteristic points between images which use parallax images taken by photographing, a technique for generating interpolated parallax images based on generated polygon data PG by interrelating characteristic points of the object of the parallax images which are obtained by photographing and converting the shape of object into polygon data, and the like.

In the certification system, the looks image data LI is made by using these various photographing techniques and the holographic stereogram HL as a printing can be made in accordance with the three dimensional image data which is obtained by converting the looks image data LI. For example, the two dimensional photograph PIC can be made by using the two dimensional image data which is obtained by performing rendering of the three dimensional image data to a case where observed from the front.

As apparent from the foregoing, it is needless to say that the present invention can be suitably modified without departing from the subject matter thereof.

As described in detail hereinabove, the certification system according to the present invention is the one for performing certification of an individual person to determine if the person is the right person and comprises two dimensional photo printing means for printing visible information for directly distinguishing the individual person as a two dimensional photograph, data conversion processing means for converting the visible information into printable data as a hologram or a holographic stereogram, hologram or holographic stereogram manufacturing means for making the hologram or the holographic stereogram in accordance with the data which is converted by the data conversion processing means, information storage means for storing various kinds of information including at least the visible information, information recording means for recording connection information to connect to the information storage means for enabling to read out the stored visible information in a designate recording member which can record various kinds of information, certification medium manufacturing means for making a certification medium by integrating at least the recording member in which the connection information is recorded by the information recording means, the two dimensional photograph which is obtained by printing by the two dimensional photo printing means, and the hologram or the holographic stereogram which is made by the hologram or holographic stereogram manufacturing means in a condition that the two dimensional photograph and the hologram or the holographic stereogram are visible, and presentation means to be connected to the information storage means based on the connection information which is recorded in the recording member by the information recording means for receiving and presenting the visible information corresponding to the connection information among the information stored in the information storage means, thereby receiving and presenting the visible information corresponding to the connection information.

Therefore, the certification system according to the present invention makes the certification medium by integrating the recording member in which the connection information is recorded, the two dimensional photograph of the visible information, the hologram or the holographic stereogram in accordance with the visible information in a condition that the two dimensional photograph and the hologram or the holographic stereogram are visible and, at the time of certificating the individual person to be certified who holds the certification medium, it is possible to highly accurately and easily identify the person by connecting to the information storage means in accordance with the connection information stored in recording member and receiving the visible information corresponding to the connection information among information stored in the information storage means in order to display it for the certifying judge by the presentation means while satisfying requirements such as low cost, eliminate the need for any exclusive device and the like for certification if it is a simple certification, performing certification operation at any desired location, minimizing complicated steps in certification operation and minimizing oppressive feeling to the person to be certified.

Also, the certification method according to the present invention is the one for distinguishing an individual person and certifying the individual person is the right person and comprises a two dimensional photo-printing step for printing visible information which can directly distinguish the individual person, a data conversion processing step for converting the visible information into printable data as a hologram or holographic stereogram, a hologram or holographic stereogram manufacturing step for making a hologram or a holographic stereogram in accordance with the data which is obtained by conversion in the data conversion processing step, an information storage step for storing in designated information storage means various kinds of information including at least the visible information, an information recording step for recording the connection information which enables to connect to the information storage means for reading out the stored visible information in order to record it in a designated recording member in which various kinds of information can be recorded, a certification medium manufacturing step for integrating at least the recording member in which the connection information is recorded in the information recording step, the two dimensional photograph which is obtained by printing in the two dimensional photo printing step, and the hologram or the holographic stereogram which is obtained in the hologram or holographic stereogram manufacturing step in a condition that the two dimensional photograph and the hologram or the holographic stereogram are visible, and a presentation step for connection to the information storage means in accordance with the connection information which is recorded in the recording member in the information recording step and for receiving to present the visible information corresponding to the connection information among the information which are stored in the information storage means.

Therefore, the certification method according to the present invention makes the certification medium by integrating the recording member in which the connection information is recorded, the two dimensional photograph of the visible information and the hologram or the holographic stereogram in accordance with the visible information in a condition that the two dimensional photograph and the hologram or the holographic stereogram are visible and, at the time of identifying the individual person to be identified who holds the certification medium, connection is made to the information storage means in accordance with the connection information which is recorded in the recording member and the visible information corresponding to the connection information is received among the information stored in the information storage means for presentation to the certifying judge, thereby capable of highly accurately and easily distinguishing the individual person while satisfying requirements such as low cost, eliminating the need for an exclusive device and the like if it is a simple certification operation, performing the certification operation at any location, minimizing complicated steps in the certification operation and minimizing oppressive feeling to the individual person to be certified.

Moreover, the certification system according to the present invention is the one to distinguish an individual person for certifying the person to be the right person and comprises two dimensional photo printing means for printing a visible information for directly distinguishing the individual person as a two dimensional photograph, data conversion processing means for converting the visible information into data which is printable as a hologram or a holographic stereogram, hologram or holographic stereogram manufacturing means for making a hologram or a holographic stereogram in accordance with the data which is obtained by converting by the data conversion means, information recording means for recording the visible information in a designated recording member in which various kinds of information can be recorded, certification medium manufacturing means for integrating at least the recording member in which the visible information is recorded by the information recording means, the two dimensional photograph which is obtained by printing by the two dimensional photo printing means and the hologram or the holographic stereogram which is made by the hologram or holographic stereogram manufacturing means for making the certification medium in a condition that the two dimensional photograph and the hologram or the holographic stereogram are visible, and presentation means for reading and presenting the visible information which is recorded in the recording member by the information recording means.

Accordingly, the certification system according to the present invention makes the certification medium by integrating the recording member in which the visible information is recorded, the two dimensional photograph of the visible information and the hologram or the holographic stereogram in accordance with the visible information by the certification medium manufacturing means in a condition that the two dimensional photograph and the hologram or the holographic stereogram are visible and, at the time of identifying the individual person to be certified who holds the certification medium, the visible information which recorded in the recording member is read out and presented to the certifier by the presentation means, thereby highly accurately and easily distinguishing the individual person while satisfying the requirements such as low cost, eliminating the need for an exclusive device and the like for certification if it is a simple certification, performing certification at any location, minimizing complicated steps for certification operation and minimizing oppressive feeling to the individual person to be certified.

Furthermore, the certification method according to the present invention is the one for distinguishing an individual person and certifying the individual person is the right person and comprises a two dimensional photo printing step for printing the visible information which directly distinguishes the individual person as the two dimensional photograph, a data conversion processing step for converting the visible information into data which can be printed as a hologram or a holographic stereogram, a hologram or holographic stereogram manufacturing step for making a hologram or a holographic stereogram in accordance with the data which is obtained by converting by the data conversion processing step, an information recording step for recording the visible information in a designated recording member in which various kinds of information can be recorded, a certification medium manufacturing step for making a certification medium by integrating at least the recording member in which the visible information is recorded in the information recording step, the two dimensional photograph which is obtained by printing in the two dimensional photo printing step and the hologram or the holographic stereogram which is made and obtained in the hologram or holographic stereogram manufacturing step, and a presentation step for reading out and presenting the visible information which is recorded in the recording member in the information recording step.

Therefore, the certification method according to the present invention makes the certification medium by integrating the recording member in which the visible information is recorded, the two dimensional photograph of the visible information, and the hologram or the holographic stereogram in accordance with the visible information in a condition that the two dimensional photograph and the hologram or the holographic stereogram are visible and at the time of certifying the individual person to be certified who holds the certification medium, it is possible to highly accurately and easily distinguish the person by presenting the visible information which is recorded in the recording member to the certifier while satisfying requirements such as low cost, eliminating the need for any exclusive device and the like for certification if it is a simple certification, performing certification at any location, minimizing complicated steps for certification operation and minimizing oppressive feeling to the individual person to be certified.

Also, the certification medium manufacturing apparatus according to the present invention is the one for making the certification medium which is used in the certification system for distinguishing an individual person for certifying that the individual person is the right person and comprises two dimensional photo-printing means for printing visible information which directly distinguishes an individual person as a two dimensional photograph, data conversion processing means for converting the visible information into data which can be printed as a hologram or a holographic stereogram, hologram or holographic stereogram manufacturing means for making a hologram or a holographic stereogram in accordance with the data which is obtained by conversion by the data conversion processing means, information storage means for storing various kinds of information including at least the visible information, information recording means for recording the connection information for connecting to the information storage means in order to read out the visible information which is stored in the information storage means, and certification medium manufacturing means for integrating at least the recording member in which the connection information is recorded by the information recording means, the two dimensional photograph which is obtained by printing by the two dimensional photo printing means, and the hologram or the holographic stereogram which is made by the hologram or holographic stereogram manufacturing means, thereby making the certification medium in a condition that the two dimensional photograph and the hologram or the holographic stereogram are visible.

Therefore, the certification medium manufacturing apparatus according to the present invention integrates the recording member in which the connection information is recorded, the two dimensional photograph of the visible information, the hologram or the holographic stereogram in accordance with the visible information by the certification medium manufacturing means for making the certification medium which can highly accurately and easily distinguish an individual person by making the certification medium in a condition that the two dimensional photograph and the hologram or the holographic stereogram are visible while satisfying requirements such as low cost, eliminating the need for an exclusive device and the like for certification if it is a simple certification, performing certification operation at any location, minimizing complicated steps for certification operation and minimizing oppressive feeling to the individual person to be certified.

Moreover, the certification terminal device according to the present invention is the one for distinguishing an individual person to certify that the person is the right person by using a certification medium made by a certification manufacturing apparatus comprising two dimensional photo printing means for printing visible information which directly distinguishes the individual person, data conversion processing means for converting the visible information into data which is printable as a hologram or a holographic stereogram, hologram or holographic stereogram manufacturing means for making a hologram or a holographic stereogram in accordance with the data which is obtained by conversion by the data conversion processing means, information storage means for storing various kinds of information including the visible information, information recording means for recording the connection information to read out the stored visible information in a designated recording member which can record various kinds of information, and certification medium manufacturing means for making a certification medium by integrating at least the recording member in which the connection information is recorded by the information recording means, the two dimensional photograph which is obtained by printing by the two dimensional photo printing means, and the hologram or the holographic stereogram which is made by the hologram or holographic stereogram manufacturing means in a condition that the two dimensional photograph and the hologram or the holographic stereogram are visible. And the certification terminal device comprises information read-out means for reading out the connection information which is recorded in the recording member by the information recording means and presentation means for connecting to the information storage means based on the connection information which is read out of the recording member by the information read-out means and for receiving and presenting the visible information corresponding to the connection information among the information which are stored in the information storage means.

Therefore, at the time when certifying the individual person to be certified who holds the certification medium which integrates the recording member in which the connection information is recorded, the two dimensional photograph of the visible information and the hologram or the holographic stereogram in accordance with the visible information in a condition that the two dimensional photograph and the hologram or the holographic stereogram are visible, the certification terminal device according to the present information connects to the information storage means in accordance with the connection information which is recorded in the recording member by the presentation means and receives the visible information corresponding to the connection information among the information stored in the information storage means for presentation to the certifying judge, thereby enabling to highly accurately and easily certify the individual person while satisfying requirements such as low cost, eliminating the need for an exclusive device and the like for certification if it is a simple certification, performing certification operation at any location, minimizing complicated steps in certification operation and minimizing oppressive feeling to the individual person to be certified.

Furthermore, the certification medium manufacturing apparatus according to the present invention is the one for making a certification medium to be used in the certification system for distinguishing an individual person to certify that the person is the right person and comprises two dimensional photo-printing means for printing the visible information which directly distinguishes the individual person as a two dimensional photograph, data conversion processing means for converting the visible information into data which can be printed as a hologram or a holographic stereogram, hologram or holographic stereogram manufacturing means for making a hologram or a holographic stereogram in accordance with the data which is obtained by conversion by the data conversion processing means, information recording means for recording the visible information in a designated recording member in which various kinds of information can be recorded, and certification medium manufacturing means for making a certification medium by integrating at least the recording member for recording the visible information by the information recording means, the two dimensional photograph which is obtained by printing by the two dimensional photo printing means and the hologram or the holographic stereogram in a condition that the two dimensional photograph and the hologram or the holographic stereogram are visible.

Therefore, the certification medium manufacturing apparatus according to the present invention is capable of highly accurately and easily identifying the individual person by making the certification medium which integrates the recording member in which the visible information is recorded, the two dimensional photograph of the visible information and the hologram or the holographic stereogram in accordance with the visible information by the certification medium manufacturing means in a condition that the two dimensional photograph and the hologram or the holographic stereogram are visible while satisfying requirements such as low cost, eliminating the need for an exclusive device and the like for certification if it is a simple certification, performing certification at any location, minimizing complicated steps in the certification operation and minimizing oppressive feeling to the individual person to be certified.

Additionally, the certification terminal device according to the present invention is the one for distinguishing an individual person to certify that the person is the right person by using a certification medium made by a certification medium manufacturing apparatus which comprises two dimensional photo printing means for printing visible information which directly distinguishes the individual person, data conversion processing means for converting the visible information into data which can be printed as a hologram or a holographic stereogram, hologram or holographic stereogram manufacturing means for making a hologram or a holographic stereogram in accordance with the data which is converted by the data conversion processing means, information recording means for recording the visible information in a designated recording member which can record various kinds of information, and certification medium manufacturing means for making a certification medium by integrating at least the recording member in which the visible information is recorded by the information recording means, the two dimensional photograph which is obtained by printing by the two dimensional photo printing means and the hologram or the holographic stereogram which is made by the hologram or holographic stereogram manufacturing means in a condition that the two dimensional photograph and the hologram or the holographic stereogram are visible. And the certification terminal device comprises information read-out means for reading out the visible information which is recorded in the recording member by the information recording means and presentation means for presenting the visible information which is read out of the recording member by the information read-out means.

Therefore, at the time when certifying the individual person to be certified who holds the certification medium which integrates the recording member in which the visible information is recorded, the two dimensional photograph of the visible information and the hologram or the holographic stereogram in accordance with the visible information in a condition that the two dimensional photograph and the hologram or the holographic stereogram are visible, the certification terminal device according to the present invention is able to highly accurately and easily distinguish the individual person by reading out the visible information which is recorded in the recording member and presenting it to the certifying judge by the presentation means while satisfying requirements such as low cost, eliminating an exclusive device and the like for certification if it is a simple certification, performing the certification operation at any location, minimizing complicated steps for certification operation and minimizing oppressive feeling to the individual person to be certified.

The invention claimed is:

1. A certification system for identifying an individual person and certifying that the individual person is a right person, comprising:

two dimensional photo printing means for printing visible information for directly distinguishing said individual person as a two dimensional photograph;

data conversion processing means for converting said visible information into data which can be printed as a hologram or a holographic stereogram;

hologram or holographic stereogram manufacturing means for making said holograph or said holographic stereogram in accordance with said data obtained by conversion by said data conversion processing means;

information storage means for storing various kinds of information including at least said visible information;

information recording means for recording connection information to connect to said information storage means and read said visible information stored therein, in a designated recording member which is capable of recording various kinds of information;

certification medium manufacturing means for making a certification medium by integrating at least said recording member having said connection information recorded therein by said information recording means, said two dimensional photograph obtained by printing by said two dimensional photo printing means and said hologram or said holographic stereogram made by said hologram or holographic stereogram manufacturing means in a condition that said two dimensional photograph and said hologram or said holographic stereogram are visible, and presentation means to be connected to said information storage means in accordance with said connection information which is recorded in said recording member by said information recording means and for receiving and presenting said visible information corresponding to said connection information among the information stored in said information storage means.

2. The certification system according to claim 1, wherein said information recording means puts a partial area of a surface of said certification medium which is finally manufactured as said recording member and records said connection information visibly on said recording member.

3. The certification system according to claim 1, wherein said information recording means puts a member whose information is readable by a designated apparatus as said recording member and records said connection information electromagnetically on said recording member.

4. The certification system according to claim 3, further comprising information read-out means functioning as said designated apparatus for reading out said connection information which is recorded in said recording member by said information recording means.

5. The certification system according to claim 4, wherein said presentation means is a portable terminal, and said information read-out means is connected to said portable terminal.

6. The certification system according to claim 3, wherein said information recording means generates key information as a certification key based on encryption for mutual certification between said information storage means and said presentation means and writes said key information in said recording member in said certification medium.

7. The certification system according to claim 6, wherein said presentation means decodes said key information as an encrypted certification key and judges whether or not the key information obtained by decoding is valid.

8. The certification system according to claim 1, further comprising looks image generation means for generating looks image data showing looks of said individual person, and wherein said visible information is said looks image data generated by said looks image generation means.

9. The certification system according to claim 8, wherein said looks image generation means photographs said individual person as an object to generate said looks image data.

10. The certification system according to claim 9, wherein said looks image generation means generates said looks image data by photographing two dimensional image data of said individual person.

11. The certification system according to claim 9, wherein said looks image generation means generates said looks image data by as a plurality of pieces of two dimensional image data by photographing said individual person from a plurality of directions.

12. The certification system according to claim 11, wherein said data conversion processing means converts said looks image data including the plurality pieces of two dimensional image data so that the images of respective directions obtained by photographing said individual person from the plurality of directions are sequentially displayed as reproduced images of said hologram or said holographic stereogram so as to generate three dimensional image data.

13. The certification system according to claim 9, wherein said looks image generation means generates said looks image data as three dimensional image data according to parallax images by photographing said individual person from a range 360° therearound.

14. The certification system according to claim 9, wherein said looks image generation means generates said looks image data as three dimensional image data according to parallax images by photographing said individual person while moving a camera used for photographing in a linear or arc manner.

15. The certification system according to claim 1, wherein said data conversion processing means combines designated image data to be at least one of a foreground and a background onto said visible information to perform processing for converting into three dimensional image data in which information changes in a parallax direction.

16. The certification system according to claim 1, wherein said two dimensional photo printing means picks up a part of image data from three dimensional image data generated by said data conversion processing means by converting into printable data as said hologram or said holographic stereogram to perform processing for converting the picked up data into two dimensional image data.

17. The certification system according to claim 1, wherein said visible information is a signature of said individual person.

18. The certification system according to claim 1, wherein said hologram or holographic stereogram manufacturing means makes said hologram or said holographic stereogram which is capable of expressing a parallax of any one direction of a horizontal direction or a vertical direction, or both of the horizontal and vertical directions.

19. The certification system according to claim 1, wherein
said information recording means records said visible information in said recording member together with said connection information,
said certification medium manufacturing means integrates, at least, said recording member in which said connection information and said visible information is recorded by said information recording means, said two dimensional photograph, and said hologram or said holographic stereogram and makes the certification medium in a condition that said two dimensional photograph and said hologram or said holographic stereogram are visible, and
said presentation means reads out and presents said visible information recorded in said recoding member by said information recording means while presenting said visible information received from said information storage means in accordance with said connection information recorded in said recoding member.

20. A certification method for performing certification to determine if an individual person is a right person, comprising:
a two dimensional photo printing step of printing visible information to directly distinguish said individual person as a two dimensional photograph;
a data conversion processing step of converting said visible information into data which can be printed as a hologram or a holographic stereogram;
a hologram or holographic stereogram manufacturing step of making said hologram or said holographic stereogram in accordance with said data obtained by conversion in said data conversion processing step;
an information storage step of storing various kinds of information including at least said visible information into designated information storage means;
an information recording step of recording in a designated recording member which is capable of recording various kinds of information the connection information for reading said stored visible information by connecting to said information storage means;
a certification medium manufacturing step of making a certification medium by integrating at least said recording member in which said connection information is recorded in said information recording step, said two dimensional photograph which is obtained by printing in said two dimensional photo printing step, and said hologram or said holographic stereogram which is obtained in said hologram or holographic stereogram manufacturing step in a condition that said two dimensional photograph and said hologram or said holographic stereogram are visible; and
a presentation step of connecting to said information storage means in accordance with said connection information which is recorded in said recording member in said information recording step and receiving for presentation said visible information which corresponds to said connection information among information stored in said information storage means.

21. The certification method according to claim 20, wherein
in said information recording step, said visible information is recorded in said recording member together with said connection information,
in said certification medium manufacturing step, at least said recording member in which said connection information and said visible information is recorded by said information recording means, said two dimensional photograph, and said hologram or said holographic stereogram in accordance with the visible information are integrated so that the certification medium is made in a condition that said two dimensional photograph and said hologram or said holographic stereogram are visible, and
in said presentation step, said visible information recorded in said recoding member by said information recording means is read out and presented while said visible information received from said information storage means in accordance with said connection information recorded in said recoding member is presented.

22. A certification system for performing certification to determine if an individual person is a right person, comprising:
two dimensional photo printing means for printing visible information directly distinguishing said individual person as a two dimensional photograph;
data conversion processing means for converting said visible information into data which can be printed as a hologram or a holographic stereogram;
hologram or holographic stereogram manufacturing means for making said hologram or said holographic stereogram in accordance with said data obtained by conversion by said data conversion processing means;
information recording means for recording said visible information in a designated recording member which is capable of recording various kinds of information;
certification medium manufacturing means for making a certification medium by integrating at least said recording member in which said visible information is recorded by said information recording means, said two dimensional photograph which is obtained by printing by said two dimensional photo printing means, and said hologram or said holographic stereogram made by said hologram or holographic stereogram manufacturing means in a condition that said two dimensional photograph and said hologram or said holographic stereogram are visible; and
presentation means for reading and presenting said visible information which is recorded in said recording member by said information recording means.

23. The certification system according to claim 22, further comprising information storage means for storing various kinds of information including at least said visible information.

24. The certification system according to claim 22, wherein said information recording means puts a member whose information is readable by a designated apparatus as said recording member and records said visible information electromagnetically on said recording member.

25. The certification system according to claim 24, further comprising information recording read-out means functioning as said designated apparatus for reading out said visible information which is recorded in said recording member by said information recording means.

26. The certification system according to claim 25, wherein
said presentation means is a portable terminal, and
said information read-out means is connected to said portable terminal.

27. The certification system according to claim 24, wherein said information recording means performs a designated conversion processing for making said visible information suitable to be recorded in said recording member.

28. The certification system according to claim 24, wherein said information recording means picks up a part of or all image data from three dimensional image data generated by said data conversion processing means by converting into printable data as said hologram or said holographic stereogram to record the picked up data in said recording member as said visible information.

29. The certification system according to claim 24, wherein said information recording means generates key information as a certification key based on encryption for performing certification of said certification medium by said presentation means and writes said key information in said recording member in said certification medium.

30. The certification system according to claim 29, wherein said presentation means decodes said key information as an encrypted certification key and judges whether or not the key information obtained by decoding is valid.

31. The certification system according to claim 24, wherein said information recoding means generates an encryption key and a decoding key for encrypting and decoding said visible information and encrypts said visible information using said encryption key to record the information in said recording member.

32. The certification system according to claim 31, wherein said presentation means decodes said encrypted visible information using said decoding key to present said visible information obtained by the decoding.

33. The certification system according to claim 22, further comprising looks image generation means for generating looks image data showing looks of said individual person, and wherein said visible information is said looks image data generated by said looks image generation means.

34. The certification system according to claim 33, wherein said looks image generation means photographs said individual person as an object to generate said looks image data.

35. The certification system according to claim 34, wherein said looks image generation means generates said looks image data by photographing two dimensional image data of said individual person.

36. The certification system according to claim 34, wherein said looks image generation means generates said looks image data by as a plurality of pieces of two dimensional image data by photographing said individual person from a plurality of directions.

37. The certification system according to claim 36, wherein said data conversion processing means converts said looks image data including the plurality pieces of two dimensional image data so that the images of respective directions obtained by photographing said individual person from the plurality of directions are sequentially displayed as reproduced images of said hologram or said holographic stereogram so as to generate three dimensional image data.

38. The certification system according to claim 34, wherein said looks image generation means generates said looks image data as three dimensional image data according to parallax images by photographing said individual person from a range 360° thereabout.

39. The certification system according to claim 34, wherein said looks image generation means generates said looks image data as three dimensional image data according to parallax images by photographing said individual person while moving a camera used for photographing in a linear or arc manner.

40. The certification system according to claim 22, wherein said data conversion processing means combines designated image data to be at least one of a foreground and a background onto said visible information to perform processing for converting into three dimensional image data in which information changes in a parallax direction.

41. The certification system according to claim 22, wherein said two dimensional photo printing means picks up a part of image data from three dimensional image data generated by said data conversion processing means by converting into printable data as said hologram or said holographic stereogram to perform processing for converting the picked up data into two dimensional image data.

42. The certification system according to claim 22, wherein said visible information is a signature of said individual person.

43. The certification system according to claim 22, wherein said hologram or holographic stereogram manufacturing means makes said hologram or said holographic stereogram which is capable of expressing a parallax of any one direction of a horizontal direction or a vertical direction, or both of the horizontal and vertical directions.

44. A certification method for identifying an individual person and certifying if the individual person is a right person, comprising:
a two dimensional photo printing step of printing visible information which directly distinguishing said individual person as a two dimensional photograph;
a data conversion processing step of converting said visible information into data which can be printed as a hologram or a holographic stereogram;
a hologram or holographic stereogram manufacturing step of making said hologram or said holographic stereogram in accordance with said data which is obtained by the conversion in said data conversion processing step;
an information recording step of recording said visible information in a designated recording member in which various kinds of information can be recorded;
a certification medium manufacturing step of making a certification medium by integrating at least said recording member in which said visible information is recorded in said information recording step, said two dimensional photograph which is obtained by printing in said two dimensional photo printing step, and said hologram or said holographic stereogram made in said hologram or holographic stereogram manufacturing step in a condition that said two dimensional photograph and said hologram or said holographic stereogram are visible; and
a presentation step of reading and presenting said visible information which is recorded in said recording member in said information recording step.

45. A certification medium manufacturing apparatus for making a certification medium to be used in a certification system for performing certification if an individual person is a right person, said certification medium manufacturing apparatus comprising:
two dimensional photo printing means for printing visible information which directly distinguishes said individual person as a two dimensional photograph;
data conversion processing means for converting said visible information into data which can be printed as a hologram or a holographic stereogram;
hologram or holographic stereogram manufacturing means for making said hologram or said holographic stereogram in accordance with said data which is obtained by conversion by said data conversion processing means;
information storage means for storing various kinds of information including at least said visible information;
information recording means for recording a connection information to connect to said information storage means to read said stored visible information; and
certification medium manufacturing means for making a certification medium by integrating at least said recording member in which said connection information is recorded by the information recording means, said two dimensional photograph which is obtained by printing by said two dimensional photo printing means, and said hologram or said holographic stereogram made by said hologram or holographic stereogram manufacturing means in a condition that said two dimensional photograph and said hologram or said holographic stereogram are visible.

46. The certification medium manufacturing apparatus according to claim 45, wherein said information recording means puts a partial area of a surface of said certification medium which is finally manufactured as said recording member and records said connection information visibly on said recording member.

47. The certification medium manufacturing apparatus according to claim 45, wherein said information recording means puts a member whose information is readable by a designated apparatus as said recording member and records said connection information electromagnetically on said recording member.

48. The certification medium manufacturing apparatus according to claim 45, further comprising looks image generation means for generating looks image data showing looks of said individual person, and wherein said visible information is said looks image data generated by said looks image generation means.

49. The certification medium manufacturing apparatus according to claim 48, wherein said looks image generation means photographs said individual person as an object to generate said looks image data.

50. The certification medium manufacturing apparatus according to claim 45, wherein said two dimensional photo printing means picks up a part of image data from three dimensional image data generated by said data conversion processing means by converting into printable data as said hologram or said holographic stereogram to perform processing for converting the picked up data into two dimensional image data.

51. The certification system according to claim 45, wherein
said information recording means records said visible information in said recording member together with said connection information, and
said certification medium manufacturing means integrates, at least, said recording member in which said connection information and said visible information is recorded by said information recording means, said two dimensional photograph, and said hologram or said holographic stereogram and makes the certification medium in a condition that said two dimensional photograph and said hologram or said holographic stereogram are visible.

52. A certification terminal device for certifying an individual person and certifying that the individual person is a right person by using a certification medium made by a certification medium manufacturing apparatus including two dimensional photo printing means for printing as a two dimensional photograph visible information which directly distinguishes said individual person, data conversion processing means for converting said visible information into data which can be printed as a hologram or a holographic stereogram, hologram or holographic stereogram manufacturing means for making said hologram or said holographic stereogram in accordance with said data which is obtained by conversion by said data conversion processing means, information storage means for storing various kinds of information including at least said visible information, information recording means for recording connection information to connect to said information storage means and read said stored visible information, in a designated recording member which can record various kinds of information, and certification medium manufacturing means for making the certification medium by integrating at least said recording member in which said connection information is recorded by said information recording means, said two dimensional photograph which is obtained by printing by said two dimension photo printing means and said hologram or said holographic stereogram made by said hologram or holographic stereogram manufacturing means in a condition that said two dimensional photograph and said hologram or said holographic stereogram are visible, said certification terminal device comprising:

information read-out means for reading out connection information which is recorded in said recording member by said information recording means; and presentation means for connecting to said information storage means in accordance with said connection information which is recorded in said recording member by said information recording means for receiving and presenting said visible information corresponding to said connection information among said information stored in said information storage means.

53. The certification terminal device according to claim 52, wherein said presentation means is a portable terminal, and said information read-out means is connected to said portable terminal.

54. The certification terminal device according to claim 52, wherein said information recording means records said visible information in said recording member together with said connection information, said certification medium manufacturing means integrates, at least, said recording member in which said connection information and said visible information is recorded by said information recording means, said two dimensional photograph, and said hologram or said holographic stereogram and makes the certification medium in a condition that said two dimensional photograph and said hologram or said holographic stereogram are visible, and said presentation means reads out and presents said visible information recorded in said recoding member by said information recording means while presenting said visible information received from said information storage means in accordance with said connection information recorded in said recoding member.

55. A certification medium manufacturing apparatus for making a certification medium which is used in a certification system for identifying an individual person and certifying if the individual person is a right person, said certification medium manufacturing apparatus comprising:

two dimensional photo printing means for printing visible information which directly distinguishes said individual person as a two dimensional photograph;

data conversion processing means for converting said visible information into data which can be printed as a hologram or a holographic stereogram;

hologram or holographic stereogram manufacturing means for making said hologram or said holographic stereogram in accordance with said data which is obtained by conversion by said data conversion means;

information recording means for recording said visible information in a designated recording member which can record various kinds of information; and certification medium manufacturing means for making the certification medium by integrating at least said recording member in which said visible information is recorded by said information recording means, said two dimensional photograph which is obtained by printing by said two dimensional photo printing means, and said hologram or said holographic stereogram made by said hologram or holographic stereograph manufacturing means in a condition that said two dimensional photograph and said hologram or said holographic stereogram are visible.

56. The certification medium manufacturing apparatus according to claim 55, further comprising information storage means for storing various kinds of information including at least said visible information.

57. The certification medium manufacturing apparatus according to claim 55, wherein said information recording means puts a member whose information is readable by a designated apparatus as said recording member and records said connection information electromagnetically on said recording member.

58. The certification medium manufacturing apparatus according to claim 55, wherein said information recording means picks up a part of or all image data from three dimensional image data generated by said data conversion processing means by converting into printable data as said hologram or said holographic stereogram to record the picked up data in said recording member as said visible information.

59. The certification medium manufacturing apparatus according to claim 55, further comprising looks image generation means for generating looks image data showing looks of said individual person, and wherein said visible information is said looks image data generated by said looks image generation means.

60. The certification medium manufacturing apparatus according to claim 59, wherein said looks image generation means photographs said individual person as an object to generate said looks image data.

61. The certification medium manufacturing apparatus according to claim 55, wherein said two dimensional photo printing means picks up a part of image data from three dimensional image data generated by said data conversion processing means by converting into printable data as said hologram or said holographic stereogram to perform processing for converting the picked up data into two dimensional image data.

62. A certification terminal device for identifying an individual person and certifying that the individual person is a right person by using a certification medium made by a certification medium manufacturing apparatus including two dimensional photo printing means for printing visible information which directly distinguishes said individual person as a two dimensional photograph, data conversion processing means for converting said visible information into data which can print as a hologram or a holographic stereogram, hologram or holographic stereogram manufacturing means for making said hologram or said holographic stereogram in accordance with said data which is obtained by conversion by said data conversion processing means, information recording means for recording said visible information in a designated recording member which can record various kinds of information, certification medium manufacturing means for making the certification medium by integrating at least said recording member in which said visible information is recorded by said information recording means, said two dimensional photograph which is obtained by printing by said two dimensional photo printing means, and said hologram or said holographic stereogram made by said hologram or holographic stereogram manufacturing means in a condition that said two dimensional photograph and said hologram or said holographic stereogram are visible, said certification terminal device including comprising:

information read-out means for reading out said visible information which is recorded in said recording member by said information recording means; and presentation means for presenting said visible information which is read out of said recording member by said information read-out means.

63. The certification terminal device according to claim 62, wherein said presentation means is a portable terminal, and said information read-out means is connected to said portable terminal.

64. A certification system for identifying an individual person and certifying that the individual person is a right person, comprising:

a two dimensional photo printer configure to print visible information for directly distinguishing said individual person as a two dimensional photograph;

a data converter configured to convert said visible information into data which can be printed as a hologram or a holographic stereogram;

a hologram or holographic stereogram manufacturing device configured to make said holograph or said holographic stereogram in accordance with said data obtained by conversion by said data converter;

a storage configured to store various kinds of information including at least said visible information;

an information recorder configured to record connection information to connect to said storage and read said visible information stored therein, in a designated recording member which is capable of recording various kinds of information;

a certification medium manufacturing device configured to make a certification medium by integrating at least said recording member having said connection information recorded therein by said information recorder, said two dimensional photograph obtained by printing by said two dimensional photo printer and said hologram or said holographic stereogram made by said hologram or holographic stereogram manufacturing device in a condition that said two dimensional photograph and said hologram or said holographic stereogram are visible, and a presentation device configured to be connected to said storage in accordance with said connection information which is recorded in said recording member by said information recorder and for receiving and presenting said visible information corresponding to said connection information among the information stored in said information storage.

65. A certification system for performing certification to determine if an individual person is a right person, comprising:

a two dimensional photo printer configured to print visible information directly distinguishing said individual person as a two dimensional photograph;

a data converter configured to convert said visible information into data which can be printed as a hologram or a holographic stereogram;

a hologram or holographic stereogram manufacturing device configured to said hologram or said holographic stereogram in accordance with said data obtained by conversion by said data converter;

an information recorder configured to record said visible information in a designated recording member which is capable of recording various kinds of information;

a certification medium manufacturing device configured to make a certification medium by integrating at least said recording member in which said visible information is recorded by said information recorder, said two dimensional photograph which is obtained by printing by said two dimensional photo printer, and said hologram or said holographic stereogram made by said hologram or holographic stereogram manufacturing device in a condition that said two dimensional photograph and said hologram or said holographic stereogram are visible; and a presentation device configured to read and present said visible information which is recorded in said recording member by said information recorder.

66. A certification medium manufacturing apparatus for making a certification medium to be used in a certification system for performing certification if an individual person is a right person, said certification medium manufacturing apparatus comprising:

a two dimensional photo printer configured to print visible information which directly distinguishes said individual person as a two dimensional photograph;

a data converter configured to convert said visible information into data which can be printed as a hologram or a holographic stereogram;

a hologram or holographic stereogram manufacturing device configured to make said hologram or said holographic stereogram in accordance with said data which is obtained by conversion by said data converter;

an information storage device configured to store various kinds of information including at least said visible information;

an information recorder configured to record a connection information to connect to said information storage device to read said stored visible information; and a certification medium manufacturing device configured to make a certification medium by integrating at least said recording member in which said connection information is recorded by the information recorder, said two dimensional photograph which is obtained by printing by said two dimensional photo printer, and said hologram or said holographic stereogram made by said hologram or holographic stereogram manufacturing device in a condition that said two dimensional photograph and said hologram or said holographic stereogram are visible.

67. A certification terminal device for certifying an individual person and certifying that the individual person is a right person by using a certification medium made by a certification medium manufacturing apparatus including two dimensional photo printer which prints as a two dimensional photograph visible information which directly distinguishes said individual person, data converter which converts said visible information into data which can be printed as a hologram or a holographic stereogram, hologram or holographic stereogram manufacturing device which makes said hologram or said holographic stereogram in accordance with said data which is obtained by conversion by said data converter which converts, information storage which stores various kinds of information including at least said visible information, information recorder which records connection information to connect to said information storage and read said stored visible information, in a designated recording member which can record various kinds of information, and certification medium manufacturing device which makes the certification medium by integrating at least said recording member in which said connection information is recorded by said information recorder, said two dimensional photograph which is obtained by printing by said two dimension photo printer and said hologram or said holographic stereogram made by said hologram or holographic stereogram manufacturing device in a condition that said two dimensional photograph and said hologram or said holographic stereogram are visible, said certification terminal device comprising:

an information read-out device configured to read out connection information which is recorded in said recording member by said information recorder; and a presentation device configured to connect to said information storage in accordance with said connection information which is recorded in said recording member by said information recorder for receiving and presenting said visible information corresponding to said connection information among said information stored in said information storage.

68. A certification medium manufacturing apparatus for making a certification medium which is used in a certification system for identifying an individual person and certifying if the individual person is a right person, said certification medium manufacturing apparatus comprising:

a two dimensional photo printer configured to print visible information which directly distinguishes said individual person as a two dimensional photograph;

a data converter configured to convert said visible information into data which can be printed as a hologram or a holographic stereogram;

a hologram or holographic stereogram manufacturing device configured to make said hologram or said holographic stereogram in accordance with said data which is obtained by conversion by said data converter;

an information recorder configured to record said visible information in a designated recording member which can record various kinds of information; and a certification medium manufacturing device configured to make the certification medium by integrating at least said recording member in which said visible information is recorded by said information recorder, said two dimensional photograph which is obtained by printing by said two dimensional photo printer, and said hologram or said holographic stereogram made by said hologram or holographic stereograph manufacturing device in a condition that said two dimensional photograph and said hologram or said holographic stereogram are visible.

69. A certification terminal device for identifying an individual person and certifying that the individual person is a right person by using a certification medium made by a certification medium manufacturing apparatus including two dimensional photo printer which prints visible information which directly distinguishes said individual person as a two dimensional photograph, data conversion processing device which converts said visible information into data which can print as a hologram or a holographic stereogram, hologram or holographic stereogram manufacturing device which makes said hologram or said holographic stereogram in accordance with said data which is obtained by conversion by said data converter, information recorder which records said visible information in a designated recording member which can record various kinds of information, certification medium manufacturing device which makes the certification medium by integrating at least said recording member in which said visible information is recorded by said information recorder, said two dimensional photograph which is obtained by printing by said two dimensional photo printer, and said hologram or said holographic stereogram made by said hologram or holographic stereogram manufacturing device in a condition that said two dimensional photograph and said hologram or said holographic stereogram are visible, said certification terminal device comprising:

an information read-out device configured to read out said visible information which is recorded in said recording member by said information recorder; and a presentation device configured to present said visible information which is read out of said recording member by said information read-out device.

* * * * *

UNITED STATES PATENT AND TRADEMARK OFFICE
CERTIFICATE OF CORRECTION

PATENT NO.         : 7,337,957 B2
APPLICATION NO.    : 10/505457
DATED              : March 4, 2008
INVENTOR(S)        : Koji Ashizaki et al.

Page 1 of 1

It is certified that error appears in the above-identified patent and that said Letters Patent is hereby corrected as shown below:

Column 57, line 33, change "distinguishing" to --distinguishes--.
Column 61, line 26, delete "including".
Column 31, line 9, change "these" to --the--.
Column 31, line 10, change "recesses" to --recessed--.
Column 43, line 50, change "judge r" to --judge--.

Signed and Sealed this

Eighteenth Day of November, 2008

JON W. DUDAS
*Director of the United States Patent and Trademark Office*